US012802554B2

(12) United States Patent
Cruver et al.

(10) Patent No.: US 12,802,554 B2
(45) **Date of Patent: *Nov. 17, 2026**

(54) MULTICHANNEL MASS NOTIFICATION SYSTEM

(71) Applicant: Alert Media, Inc., Austin, TX (US)

(72) Inventors: Brian Cruver, Austin, TX (US); Matthew Miller, Austin, TX (US)

(73) Assignee: ALERT MEDIA, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/914,781

(22) Filed: Oct. 14, 2024

(65) Prior Publication Data

US 2025/0037570 A1 Jan. 30, 2025

Related U.S. Application Data

(63) Continuation of application No. 17/716,534, filed on Apr. 8, 2022, now Pat. No. 12,118,872, which is a (Continued)

(51) Int. Cl.
*G08B 25/01* (2006.01)
*G08B 25/10* (2006.01)

(Continued)

(52) U.S. Cl.
CPC .......... *G08B 25/016* (2013.01); *G08B 25/10* (2013.01); *H04M 1/72409* (2021.01);

(Continued)

(58) Field of Classification Search
CPC ........ G16H 10/60; G16H 50/80; G16H 50/70; G16H 50/30; G16H 40/20; G16H 70/60;

(Continued)

(56) References Cited

U.S. PATENT DOCUMENTS 5,579,370 A * 11/1996 Fukushima .......... H04W 24/04 455/566
6,091,328 A * 7/2000 Ichikawa ............ G08B 26/001 340/505

(Continued)

*Primary Examiner* — Daniel Previl
(74) *Attorney, Agent, or Firm* — Dickinson Wright, PLLC

(57) ABSTRACT

Systems and methods for facilitating a response to an event notifying signal. The system includes a network monitoring module, an assessment module, and a resource response module. The network monitoring module is configured for monitoring signals received over a data network for a presence of one or more event notifying signals indicative of a relevant incident within a geographic area. The assessment module is configured for determine that the relevant incident could impact any persons or property of an enterprise or organization within the geographic area. The assessment module is also configured to identify a group of people of the enterprise or organization who could be impacted by the relevant incident. The resource response module is configured to send a response to a computing device associated with each person of the group of people. The response provides an indication of the relevant incident.

20 Claims, 19 Drawing Sheets

Related U.S. Application Data continuation-in-part of application No. 16/866,277, filed on May 4, 2020, now Pat. No. 11,341,839, which is a continuation of application No. 16/236,086, filed on Dec. 28, 2018, now Pat. No. 10,643,457, which is a continuation-in-part of application No. 15/796,291, filed on Oct. 27, 2017, now Pat. No. 10,176,701.

(60) Provisional application No. 63/173,238, filed on Apr. 9, 2021.

(51) Int. Cl.

| | |
|---|---|
| ***H04M 1/72409*** | (2021.01) |
| ***H04M 1/72421*** | (2021.01) |
| ***H04M 1/72424*** | (2021.01) |
| ***H04W 4/02*** | (2018.01) |
| ***H04W 4/90*** | (2018.01) |
| ***H04W 12/08*** | (2021.01) |
| *H04W 88/02* | (2009.01) |

(52) U.S. Cl.

CPC ... *H04M 1/72421* (2021.01); *H04M 1/72424* (2021.01); *H04W 4/02* (2013.01); *H04W 4/90* (2018.02); *H04W 12/08* (2013.01); *H04W 88/02* (2013.01)

(58) Field of Classification Search

CPC ........ G16H 15/00; G16H 20/10; G16H 50/20; H04W 4/90; H04W 4/08; H04W 24/04; H04W 24/06; H04W 4/06; H04W 4/16; H04W 4/18; H04W 56/001; H04W 60/04; H04W 64/006; H04W 84/042; H04W 88/08; H04W 12/08; H04W 4/02; H04W 4/026; H04W 4/027; H04W 4/12; H04W 4/40; H04W 4/46; H04W 52/04; H04W 72/20; H04W 72/30; H04W 76/14; H04W 76/40; H04W 88/02; H04W 4/80; H04W 4/00; H04W 8/00; H04W 12/00; H04W 16/00; H04W 24/00; H04W 28/00; H04W 36/00; H04W 40/00; H04W 48/00; H04W 52/00; H04W 56/00; H04W 60/00; H04W 64/00; H04W 68/00; H04W 72/00; H04W 74/00; H04W 76/00; H04W 80/00; H04W 84/00; H04W 88/00; H04W 92/00; H04W 99/00; Y02A 90/10; G06Q 10/10; G06Q 50/22; G06Q 40/08; G06Q 50/26; G06Q 30/015; G08B 25/016; G08B 25/08; G08B 29/185; G08B 25/005; G08B 25/006; G08B 25/014; G08B 26/001; G08B 21/043; G08B 21/0446; G08B 21/0453; G08B 21/0469; G08B 25/009; G08B 25/10; G08B 25/14; G08B 27/001; G08B 27/005; G08B 7/066; G08B 1/00; G08B 3/00; G08B 5/00; G08B 6/00; G08B 7/00; G08B 9/00; G08B 13/00; G08B 15/00; G08B 17/00; G08B 19/00; G08B 21/00; G08B 23/00; G08B 25/00; G08B 26/00; G08B 27/00; G08B 29/00; G08B 31/00; A61B 5/024; A61B 5/0816; A61B 5/6892; A61B 10/0012; A61B 5/01; A61B 5/02; A61B 5/02405; A61B 5/08; A61B 5/11; A61B 5/4343; A61B 5/4809; A61B 5/4812; A61B 5/6891; A61B 5/7267; A61B 5/7282; A61B 2562/046; A61B 5/1036; A61B 5/1116; A61B 5/1117; A61B 5/1118; A61B 5/112; A61B 5/1123; A61B 5/113; G16B 20/00; G16B 20/20; G16B 40/00; G16B 40/20; F41A 17/063; F42B 5/025; F42B 5/08; H04B 10/25754; G07F 11/24; G07F 11/54; G07F 11/56; G07F 17/32; G07F 17/3297; A62C 37/40; E04H 2005/005; E04H 5/02; E05B 47/0002; G01L 1/225; G05B 19/042; G05B 19/4155; G05B 2219/25011; G05B 2219/2614; G05B 2219/2639; G06F 21/31; G06F 21/552; G06F 21/86; G06F 3/0482; G06N 20/00; G06N 5/02; G08G 1/052; G08G 1/096791; H02S 20/22; H04L 12/1895; H04L 12/28; H04L 12/4641; H04L 51/04; H04L 51/046; H04L 51/10; H04L 63/0421; H04L 63/0428; H04L 63/101; H04L 67/12; H04M 1/72409; H04M 1/72421; H04M 1/72424; H04M 2201/14; H04M 2203/2027; H04M 2242/04; H04M 3/424; H04M 3/5116; H04M 1/72412; H04M 1/00; H04M 3/00; H04M 5/00; H04M 7/00; H04M 9/00; H04M 11/00; H04M 13/00; H04M 15/00; H04M 17/00; H04M 19/00; H04M 99/00; H04M 2201/00; H04M 2203/00; H04M 2207/00; H04M 2215/00; H04M 2242/00; H04M 2250/00; H05K 7/1495; H05K 7/1497; H05K 7/1498; H05K 7/18; H05K 7/183; H05K 7/20209; H05K 7/20745; H05K 7/2079; H05K 7/20836; Y02B 10/10; Y02E 10/50; Y04S 40/20; A01M 1/026; A01M 1/226; A01M 21/046; A01M 2200/011; A01M 3/007; B60K 1/04; B60K 2001/0466; B60K 1/00; B60K 3/00; B60K 5/00; B60K 7/00; B60K 6/00; B60K 8/00; B60K 11/00; B60K 13/00; B60K 15/00; B60K 16/00; B64U 10/13; B64U 10/14; B64U 20/87; B64U 2101/30; B64U 2101/40; B64U 30/20; B64U 50/39; B64U 10/00; B64U 20/00; B64U 30/00; B64U 40/00; B64U 50/00; B64U 60/00; B64U 70/00; B64U 80/00; B64U 2101/00; B64U 2201/00; G02B 26/0833; G02B 1/00; G02B 3/00; G02B 5/00; G02B 6/00; G02B 7/00; G02B 9/00; G02B 13/00; G02B 15/00; G02B 17/00; G02B 19/00; G02B 21/00; G02B 23/00; G02B 25/00; G02B 26/00; G02B 27/00; G02B 30/00; G02B 2207/00; G06T 2207/30196; G06T 7/70; G06T 1/00; G06T 3/00; G06T 5/00; G06T 7/00; G06T 9/00; G06T 11/00; G06T 12/00; G06T 13/00; G06T 15/00; G06T 17/00; G06T 19/00; G06T 2200/00; G06T 2201/00; G06T 2207/00; G06T 2210/00; G06T 2211/00; G06T 2213/00; G06T 2215/00; G06T 2219/00; H01S 5/0071; H01S 1/00; H01S 3/00; H01S 4/00; H01S 5/00; H01S 2301/00; H01S 2302/00; H01S 2303/00; H01S 2304/00

USPC ........ 340/573.1, 539.11, 500, 426.12, 573.4, 340/573.5, 692, 691.7, 825.25, 825.24, 340/7.5, 539.13

See application file for complete search history.

(56) References Cited

U.S. PATENT DOCUMENTS

| | | | | |
|---|---|---|---|---|
| 10,643,457 | B2 * | 5/2020 | Cruver | H04M 1/72421 |
| 12,118,872 | B2 * | 10/2024 | Cruver | H04M 1/72409 |
| 2009/0284348 | A1 * | 11/2009 | Pfeffer | G08B 25/006 340/7.3 |
| 2010/0325107 | A1 * | 12/2010 | Kenton | G06Q 30/00 707/723 |
| 2015/0208220 | A1 * | 7/2015 | Hulan | H04W 4/90 455/404.1 |
| 2015/0358794 | A1 * | 12/2015 | Nokhoudian | G08B 25/016 455/404.1 |
| 2016/0058429 | A1 * | 3/2016 | Shinar | A61B 10/0012 600/551 |
| 2017/0091617 | A1 * | 3/2017 | Baughman | G06N 3/09 |
| 2018/0205751 | A1 * | 7/2018 | Howie | G06F 21/552 |
| 2021/0027229 | A1 * | 1/2021 | Billeter | G06Q 40/06 |

* cited by examiner

2000

2100

MULTICHANNEL MASS NOTIFICATION SYSTEM

CROSS-REFERENCES TO RELATED APPLICATIONS

This application is a continuation of U.S. patent application Ser. No. 17/716,534 filed Apr. 8, 2022, titled "Multichannel Mass Notification System", which claims priority and benefit of U.S. Provisional Ser. No. 63/173,238 filed Apr. 9, 2021, titled "Multichannel Mass Notification System", and is a continuation-in-part of U.S. patent application Ser. No. 16/866,277 filed May 4, 2020, titled "Event-Driven Safety Notification Based on Automated Incident Monitoring" (now U.S. Pat. No. 11,341,839), which is a continuation of U.S. patent application Ser. No. 16/236,086 filed Dec. 28, 2018, titled "Event-Driven Safety Notification Based on Automated Incident Monitoring" (now U.S. Pat. No. 10,643,457), which is a continuation-in-part of U.S. patent application Ser. No. 15/796,291 filed Oct. 27, 2017, titled "Automated Response to Duress in Distress Signals" (now U.S. Pat. No. 10,176,701). All applications are incorporated by reference herein in their entirety.

This application is further related to U.S. Provisional Application No. 62/624,487 filed Jan. 31, 2018, titled "Event-Driven Safety Notification Based on Automated Incident Monitoring," and U.S. patent application Ser. No. 15/252,788 filed Aug. 31, 2016 (now U.S. Pat. No. 9,870,695), which claims priority from and is a continuation of U.S. patent application Ser. No. 15/179,207, filed Jun. 10, 2016 (now U.S. Pat. No. 9,483,931), which claims priority from and is a continuation of U.S. patent application Ser. No. 14/886,552 filed Oct. 19, 2015 (now U.S. Pat. No. 9,390,614), which claims benefit of priority to U.S. Provisional Application No. 62/065,378, filed Oct. 17, 2014, titled "System and Method for Automated Response to Distress Signal." All applications are incorporated by reference herein in their entirety.

TECHNICAL FIELD

This disclosure relates generally to event response, and, more specifically, to enabling response to event notifying signals sent by individuals.

BACKGROUND

Current technology for summoning help in the event of an emergency relies on the ability of a user of the technology to "dial 911," which is to say that a user of the technology must secure access to a telephone, unlock the telephone, correctly enter a telephone number to summon help, and then describe the situation to a dispatch operator on the other end of the call.

In emergencies in the real world, the time and capacity necessary to perform all of these operations are generally not available to persons subject to the emergency during the course of the emergency. Simply put, a user has neither the time nor the concentration to "unlock, dial, and beg for help" while being threatened with violence. In the case of medical emergencies, the user may further lack capacity to "unlock, dial, and beg for help" as he or she teeters on the border of lost consciousness. The paradigm of "unlock, dial, and beg for help" works for some people in some situations, but the real emergencies faced by many people, particularly people field-deployed to dangerous situations, are not well-served.

SUMMARY

The present disclosure provides a system for facilitating a response to an event notifying signal. The system includes, in one embodiment, a network monitoring module, an assessment module, and a resource response module. The network monitoring module is configured to monitoring signals received over a data network for a presence of one or more event notifying signals indicative of a relevant incident within a geographic area. The assessment module is configured to determine that the relevant incident could impact any persons or property of an enterprise or organization within the geographic area. The assessment module is also configured to determine a group of people of the enterprise or organization who could be impacted by the relevant incident. The resource response module is configured to send a response to a computing device associated with each person of the group of people. The response provides an indication of the relevant incident.

The present disclosure also provides a method for facilitating a response to an event notifying signal. The method includes monitoring signals received over a data network for a presence of one or more event notifying signals indicative of a relevant incident within a geographic area. The method also includes determining that the relevant incident could impact any persons or property of an enterprise or organization within the geographic area. The method further includes determining a group of people of the enterprise or organization who could be impacted by the relevant incident. The method also includes sending a response to a computing device associated with each person of the group of people. The response provides an indication of the relevant incident.

The present disclosure further provides a tangible, non-transitory computer-readable storage medium comprising program instructions. The program instructions, when executed, cause one or more processors to monitor signals received over a data network for a presence of one or more event notifying signals indicative of a relevant incident within a geographic area. The program instructions, when executed, also cause the one or more processors to determine that the relevant incident could impact any persons or property of an enterprise or organization within the geographic area. The program instructions, when executed, further cause the one or more processors to determine a group of people of the enterprise or organization who could be impacted by the relevant incident. The program instructions, when executed, also cause the one or more processors to send a response to a computing device associated with each person of the group of people. The response provides an indication of the relevant incident.

Other aspects of the disclosure will become apparent by consideration of the detailed description and accompanying drawings.

DETAILED DESCRIPTION

Figure 1:
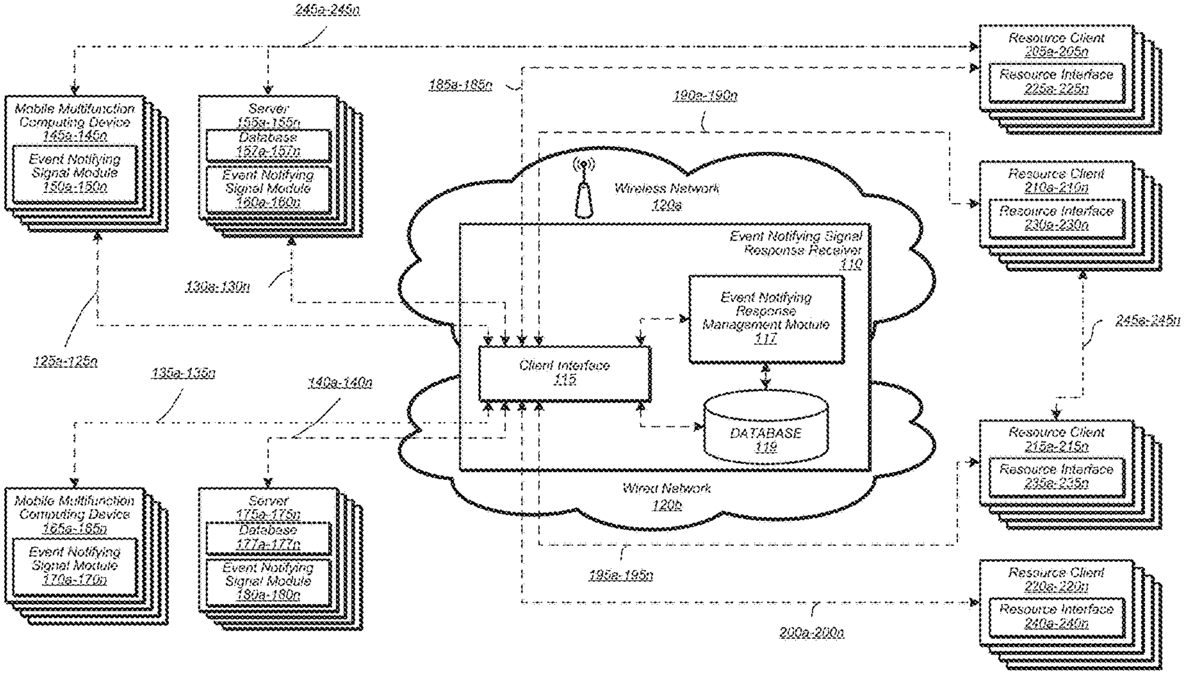
FIG. 1 depicts an ecosystem for facilitating automated response to an event notifying signal, in accordance with some embodiments.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, the disclosure comprises a system for facilitating automated response to an event notifying signal. In some embodiments, the system comprises a network monitoring module, and assessment module, a resource monitoring module, and a resource response module. In some embodiments, the network monitoring module is configured for monitoring signals received over a data network for a presence of one or more event notifying signals indicative of a relevant incident. In some embodiments, the assessment module is configured for assessing a response of the one or more event notifying signals and a resource tasked to the response. In some embodiments, the resource monitoring module is configured for monitoring a status of a resource tasked to the response of the event notifying signal. In some embodiments, the resource response module is configured for communicating the response to the resource tasked to the response.

In some embodiments, the network monitoring module is configured for monitoring signals from social media, news media sources, weather data, government announcements, traffic bulletins, flight schedules, or any other publicly accessible data source. In some embodiments, the network monitoring module is configured for monitoring signals from sources not publicly accessible, such as secure data, sensitive data, or licensed data.

In some embodiments, the assessment module assesses one or more of a source, a frequency, or a transmission medium of an event notifying signal. In some embodiments, the assessment module may estimate a likelihood of a relevant incident based on one or more of these characteristics, for example, event notifying signal from major media outlets may have a higher likelihood of being indicative of a relevant incident. In some embodiments, the assessment module may use the frequency of an event notifying signal to estimate a likelihood of a relevant incident. For example, a high frequency of event notifying signals transmitting from a social media source may be indicative of a relevant incident. In some embodiments, the assessment module assesses the transmission media of event notifying signals. In some embodiments, the transmission medium of an event notifying signal may be used to assess a relevant incident. For example, event notifying signals predominantly transmitting from wired sources may be indicative of a wireless network failure. Event notifying signals predominantly transmitting from wireless sources may be indicative of a power distribution failure. In some embodiments, the event notifying signals may be assessed by assessing more than one characteristic in conjunction. For example, the concurrence of a high frequency of event notifying signals indicating a first relevant incident on one type of transmission medium or a type of source, and a high frequency of event notifying signals indicating the absence of the first relevant incident on a second type of transmission medium or second type of source. Such a disparity or contradiction may indicate that one or more source or transmission medium has been jeopardized. In some embodiments, the assessment module may assess a pattern of event notifying signals over time or location.

In some embodiments, the resource monitoring module is configured for monitoring a status of a resource tasked to the response of the event notifying signal. In some embodiments, the resource monitoring module further monitors a sensor associated with the resource. A resource may be a device, an email address, a phone number, an actuator, a vehicle, or any system configured to receive communication from the resource response module. In some embodiments, a resource is a portable electronic device. In some embodiments, a resource is a mobile phone. In some embodiments, a sensor is a camera, thermometer, microphone, speaker, light sensor, acoustic sensor, accelerometer, magnetometer, GPS module, barometric sensor, or other sensor configured to measure or detect a status of the resource or of the environment of the resource. In some embodiments, a sensor detects a disarticulation of a resource attachment a from a sensor location. In some embodiments, a resource attachment is an emergency rip-cord.

In some embodiments, the system for facilitating automated response to an event notifying signal further comprises a resource sequencing module. In some embodiments, the resource sequencing module is configured for assigning a sequence of resources tasked to the response. In some embodiments, the sequence is based, at least in part, on a status of a resource, a usage pattern of the resource, or an elapsed time. For example, a first resource may be tasked to a response. If a status of said first resource indicates the first resource to be inadequate, a second resource may be tasked to the response. In some embodiments, the system for facilitating automated response to an event notifying signal further comprises a resource association module. In some embodiments, the resource association module associates one or more resources with a user. In some embodiments, a portable electronic device and a desktop computer may be associated with a user. In some embodiments, the resource sequencing module is configured for sequencing the resources associated with a user. For example, a desktop computer associated with a user may be tasked to a response. Based on a usage pattern or elapsed time, the desktop computer may be assessed to be inadequate. The mobile phone associated with the user may then be tasked to the response.

In some embodiments the system for facilitating automated response to an event notifying signal further comprises a third-party association module configured for associating a resource with a third-party. In some embodiments, this association is based, at least in part, on a status of the third-party, a record of proximity of the third-party to the resource, or a record of interaction between the third-party and the resource. In some embodiments, the third-party is a device, an email address, a phone number, an actuator, a vehicle, or any system configured to receive communication. In some embodiments the system for facilitating automated response to an event notifying signal further comprises a third-party response module configured for communicating a response to the third-party associated with the resource tasked to the response. An example might be that a user associated with the resource has a scheduled meeting with a third-party. An event notifying signal indicative of a relevant incident delaying the user might be assessed and a response communicated to the third-party. For another example, a resource may be tasked to a response. Based on a usage pattern or elapsed time, the resource may be assessed to be inadequate. If a third-party has been associated with the resource, the third-party response module may communicate a response to the third-party. Alternatively, if a third-party has not been associated with the resource, a third-party may be associated with the resource and the third-party response module may further communicate a response to the newly associated resource. For example, a resource tasked to a response may be associated with a user and a third-party. If the resource is tasked to communicate a response to the user, but is assessed to be inadequate, the third-party may be contacted to communicate a response to the user. In some embodiments, the system for facilitating an automated response may associate a third-party based, at least in part, on a characteristic of the other third-parties associated with a resource. For example, if a plurality of similar establishments, such as banks or Italian restaurants, is associated with a resource, an additional bank or Italian restaurant may be assessed as a likely association and associated with the resource.

In some embodiments, the system for facilitating automated response to an event notifying signal further comprises a real-time communication module. In some embodiments, the real-time communication module is configured for communicating a response condition description indication. In some embodiments, the response condition description information is communicated to a user of a resource in response to the event notifying signal. In some embodiments, the real-time communication module is configured for receiving a condition description indication. In some embodiments, the condition description indication is received from the user of the resource. In some embodiments, the condition description indication is received for transmission with the event notifying signal. For example, the system for facilitating automated response may send a user health status inquiry to a resource associated with the user. The user may then response to the inquiry with their health status. This may be selected from a list of responses or the user may compose their own. If the user fails to respond within a time frame, the resource may respond. The system for facilitating automated response may then transmit the user or resource response with the event notifying signal. For example, the system may send a health status inquiry to a resource associated with a soldier in response to an event notifying signal indicative of a relevant danger event. The soldier could then respond with their status. The soldier's response may then be transmitted with the event notifying signal to the soldier's squad or other military unit. In some embodiments, a condition description indication is received not in response to the communication of a response condition description indication. For example, a journalist associated with a resource may pull an emergency ripcord. This action would be detected by a sensor associated with the resource. The system for facilitating automated response would then receive a condition description indication. Said condition description indication could then be transmitted with an event notifying signal.

In some embodiments, the disclosure comprises a method for facilitating automated response to an event notifying signal. In some embodiments, the method for facilitating automated response comprises monitoring signals received over a data network, assessing a response to the one or more event notifying signal, monitoring a status of a resource, and communicating the response to the resource. In some embodiments, the signals are monitored for a presence of one or more event notifying signals indicative of a relevant incident. In some embodiments, assessing a response of the one or more event notifying signals further comprises assessing a resource tasked to the response. In some embodiments, monitoring a status of a resource further comprises monitoring a status of a resource tasked to the response of the event notifying signal.

In some embodiments, the method for facilitating automated response further comprises assessing one or more of a source, a frequency, or a transmission medium of an event notifying signal. In some embodiments, a frequency of an event notifying signal is a quantity of event notifying signals averaged over a period of time. In some embodiments, a frequency of an event notifying signal is a quantity of event notifying signals averaged over a geographic location. In some embodiments, a source of an event notifying signal is a portable electronic device. In some embodiments, a source may be social media, news media sources, weather data, government announcements, traffic bulletins, flight schedules, or any other publicly accessible data source. In some embodiments, a source may not be publicly accessible, such as secure data source, sensitive data source, or licensed data source.

In some embodiments, the monitoring a status of a resource tasked to respond further comprises monitoring a sensor associated with the resource. A resource may be a device, an email address, a phone number, an actuator, a vehicle, or any system configured to receive a response. In some embodiments, a resource is a portable electronic device. In some embodiments, a resource is a mobile phone. In some embodiments, a sensor is a camera, thermometer, microphone, speaker, light sensor, acoustic sensor, accelerometer, magnetometer, GPS module, barometric sensor, or other sensor configured to measure or detect a status of the resource or of the environment of the resource. In some embodiments, a sensor detects a disarticulation of a resource attachment from a sensor location. In some embodiments, a resource attachment is an emergency rip-cord.

In some embodiments, the method for facilitating automated further comprises assigning a sequence of resources tasked to the response. In some embodiments, the sequence is based, at least in part, on a status of a resource, a usage pattern of the resource, or an elapsed time. For example, a first resource a may be tasked to a response. If a status of said first resource indicates the first resource to be inadequate, a second resource may be tasked to the response. In some embodiments, the method for facilitating automated response further comprises associating one or more resources with a user. In some embodiments, a portable electronic device and a desktop computer may be associated with a user. In some embodiments, the method sequences resources associated with a user. For example, a desktop computer associated with a user may be tasked to a response. Based on a usage pattern or elapsed time, the desktop computer may be assessed to be inadequate. The mobile phone associated with the user may then be tasked to the response.

In some embodiments, the method for facilitating automated response further comprises associating one or more resources with a third-party. In some embodiments, the associating is based, at least in part, on a status of the third-party, a record of proximity of the third-party to a resource, or a record of interaction between the third-party and a resource. In some embodiments, the third-party is a device, an email address, a phone number, an actuator, a vehicle, or any system configured to receive public communication. In some embodiments, the method for facilitating automated response further comprises communicating a response to the third-party associated with the resource tasked to the response. In some embodiments, resource associations may be prioritized.

In some embodiments, the method for facilitating automated response further comprises communicating a response condition description indication. In some embodiments, this response condition description indication is communicated to a user of a resource in response to the event notifying signal. In some embodiments, the method for facilitating automated response further comprises receiving a condition description indication from the user of the resource for transmission with the event notifying signal.

In some embodiments, the disclosure comprises non-transitory computer-readable storage medium comprising program instructions. In some embodiments, the program instructions are executable by one or more processors of a network-connected computing device. In some embodiments, the program instructions are by a processor to implement a network monitoring module. In some embodiments, a network monitoring module is configured for monitoring signals received over a data network. In some embodiments, the network monitoring module monitors signals for a presence of one or more event notifying signals indicative of a relevant incident. In some embodiments, the program instructions are executable by a processor to implement an assessment module. In some embodiments, an assessment module is configured for assessing a response of the one or more event notifying signals. In some embodiments, an assessment module is configured for assessing a resource tasked to the response. In some embodiments, the program instructions are executable by a processor to implement a resource monitoring module. In some embodiments, a resource monitoring module is configured for monitoring a status of a resource. In some embodiments, the resource monitoring module is configured for monitoring a status of a resource tasked to the response of the event notifying signal. In some embodiments, the program instructions are executable by a processor to implement a resource response module configured for communicating a response. In some embodiments, the resource response module is configured for communicating a response to the resource tasked to the response.

In some embodiments, the non-transitory computer-readable storage medium further comprises program instructions executable by the one or more processor to implement an event priority module. In some embodiments, an event priority module is configured for assessing one or more of a source, a frequency, or a transmission medium of an event notifying signal. In some embodiments, an event priority module is configured for modifying an event priority in based, at least in part, on a condition description indication from a resource.

In some embodiments, the non-transitory computer-readable storage medium further comprises program instructions executable by the one or more processors to implement a resource sequencing module. In some embodiments, a resource sequencing module is configured for assigning a sequence of resources tasked to the response. In some embodiments, the sequence is based, at least in part, on a status of a resource, a usage pattern of the resource, or an elapsed time.

In some embodiments, the non-transitory computer-readable storage medium further comprises program instructions executable by the one or more processors to implement a resource association module. In some embodiments, a resource association module is configured for associating one or more resources with a user.

In some embodiments, the non-transitory computer-readable storage medium further comprises program instructions executable by the one or more processors to implement a third-party association module. In some embodiments, a third-party association module is configured for associating one or more resources with a third-party based, at least in part, on a status of the third-party, a record of proximity of the third-party to a resource, or a record of interaction between the third-party and a resource. In some embodiments, the non-transitory computer-readable storage medium further comprises program instructions executable by the one or more processors to implements a third-party response module. In some embodiments, a third-party response module is configured for communicating a response to the third-party associated with the resource tasked to the response.

In some embodiments, the non-transitory computer-readable storage medium further comprises program instructions executable by the one or more processors to implement a real-time communication module. In some embodiments, the real-time communication module is configured for communicating a response condition description indication. In some embodiments, the real-time communication module is configured for communicating a response condition description indication to a user of a resource in response to the event notifying signal. In some embodiments, the real-time communication module is configured for receiving a condition description indication from the user of the resource for transmission with the event notifying signal.

Various embodiments of a system and method for facilitating automated response to an event notifying signal are disclosed. Some embodiments include a peripheral device for use in causing a multifunction mobile computing device to facilitate automated response to an event notifying signal includes an attachment for a multifunction mobile computing device. In some embodiments, the attachment removably articulates to a sensor location coupled to the housing of the multifunction mobile computing device. In some embodiments, the attachment removably articulates to a sensor location in a manner detectable to a sensor housed at the sensor location. In some embodiments, the peripheral device includes a tether for removably articulating the attachment to a user of the multifunction mobile computing device. In some embodiments, upon application of force to the tether in a direction away from the sensor location, the sensor housed at the sensor location detects removal of the attachment and causes the multifunction mobile computing device to transmit an event notifying signal.

In some embodiments, the sensor location includes an audio output connector coupled to a housing of the multifunction mobile computing device, and the attachment includes an articulating component dimensioned for removable articulation to the audio output connector.

In some embodiments, the sensor location includes an audio output connector coupled to a housing of the multifunction mobile computing device, and the attachment includes an electrically-conductive articulating component dimensioned for removable articulation to the audio output connector.

In some embodiments, the sensor location includes a digital data connector coupled to a housing of the multifunction mobile computing device, and the attachment includes an articulating component dimensioned for removable articulation to the digital data connector.

In some embodiments, the sensor location includes a magnetic peripheral articulation connector coupled to a housing of the multifunction mobile computing device, and the attachment includes an articulating component polarized for magnetic removable articulation to the magnetic peripheral articulation connector.

In some embodiments, the sensor location includes an electric power transmission connector coupled to a housing of the multifunction mobile computing device, and the attachment includes an articulating component dimensioned for removable articulation to the electric power transmission connector.

In some embodiments, the sensor location includes a radio frequency antennae coupled to a housing of the multifunction mobile computing device, the attachment includes an electronic device having a data connection to the sensor location via a radio frequency channel between the attachment and the multifunction mobile computing device, and the disarticulation includes an attenuation of the data connection.

In some embodiments, the sensor location includes a radio frequency antennae coupled to a housing of the multifunction mobile computing device, the attachment includes an electronic device having a data connection to the sensor location via a radio frequency channel between the attachment and the multifunction mobile computing device, and the disarticulation includes a loss of the data connection.

Various embodiments of a system and method for facilitating automated response to an event notifying signal are disclosed. In some embodiments, a system for facilitating automated response to an event notifying signal includes an attachment for a multifunction mobile computing device. In some embodiments, the attachment removably articulates to a sensor location coupled to a housing of the multifunction mobile computing device. In some embodiments, the system includes a computer program product in a non-transitory computer-readable medium. In some embodiments, the program instructions are computer-executable by the multifunction mobile computing device to implement detecting a disarticulation of the attachment from the sensor location on the multifunction mobile computing device, and, responsive to the detecting the disarticulation of the attachment from the sensor location on the multifunction mobile computing device, transmitting to an event notifying signal response receiver over a radio-frequency network from a radio-frequency transmitter located within a housing of the multifunction mobile computing device the event notifying signal.

Some embodiments present a toggle control to allow a user to prevent the transmission of an event notifying signal after detachment of the attachment or to cause transmission of an 'all clear' to cancel an event notifying signal. In some embodiments, the program instructions are further computer-executable to implement, responsive to the detecting the disarticulation of the attachment from the sensor location on the multifunction mobile computing device, presenting an event notifying signal control interface capable of receiving an order from a user of the multifunction mobile computing device to prevent transmission of the event notifying signal, and, responsive to the order from a user of the multifunction mobile computing device to prevent transmission of the event notifying signal, preventing transmission of the event notifying signal or broadcasting an all-clear signal.

Some embodiments include the ability to transmit or block transmission of an event notifying signal on a multifunction mobile computing device in spite of the 'locked screen' condition of on the multifunction mobile computing device. In some embodiments, the program instructions are further computer-executable to implement, responsive to the detecting the disarticulation of the attachment from the sensor location on the multifunction mobile computing device, over-riding a locked screen condition of the multifunction mobile computing device, and presenting an event notifying signal control interface capable of receiving an order from a user of the multifunction mobile computing device to control parameters of transmission of the event notifying signal.

Some embodiments present a data-entry interface. In some embodiments, wherein the program instructions are further computer-executable to implement, responsive to the detecting the disarticulation of the attachment from the sensor location on the multifunction mobile computing device, over-riding a locked screen condition of the multifunction mobile computing device, and presenting an event notifying signal data input interface capable of receiving condition description indications from a user of the multifunction mobile computing device for transmission with the event notifying signal.

Some embodiments support user entry of duress codes. In some embodiments, the program instructions are further computer-executable to implement, responsive to the detecting the disarticulation of the attachment from the sensor location on the multifunction mobile computing device, presenting an event notifying signal control interface capable of receiving an order from a user of the multifunction mobile computing device to prevent transmission of the event notifying signal. In some embodiments, the presenting the event notifying signal control interface capable of receiving the order from a user of the multifunction mobile computing device to prevent transmission of the event notifying signal further includes presenting an event notifying signal control interface capable of receiving a duress indication order from the user of the multifunction mobile computing device. In some embodiments, the program instructions are further computer-executable to implement, responsive to receiving the duress indication order from the user of the multifunction mobile computing device, indicating over a user interface of the multifunction mobile computing device prevention of transmission of the event notifying signal, and transmitting the event notifying signal with a duress indicator.

Some embodiments capture sensor data for transmission in conjunction with the transmission of event notifying signals. Non-limiting examples of such data include location data, audio, video, movement information, vital sign information, and information from third-party sensor devices associated with a multifunction mobile computing device. In some embodiments, the program instructions are further computer-executable to implement, responsive to the detecting the disarticulation of the attachment from the sensor location on the multifunction mobile computing device, capturing input data received from one or more sensors of the multifunction mobile computing device, and transmitting to the event notifying signal response receiver over the radio-frequency network from the radio-frequency transmitter located within the housing of the multifunction mobile computing device the input data received from the one or more sensors of the multifunction mobile computing device.

In some embodiments, the program instructions are further computer-executable to implement, responsive to the detecting the disarticulation of the attachment from the sensor location on the multifunction mobile computing device, capturing location data describing a location of the multifunction mobile computing device, and transmitting to the event notifying signal response receiver over the radio-frequency network from the radio-frequency transmitter located within the housing of the multifunction mobile computing device the location data describing the location of the multifunction mobile computing device.

In some embodiments, the program instructions are further computer-executable to implement, responsive to the detecting the disarticulation of the attachment from the sensor location on the multifunction mobile computing device, capturing input data received from one or more external sensors associated with the multifunction mobile computing device, and transmitting to the event notifying signal response receiver over the radio-frequency network from the radio-frequency transmitter located within the housing of the multifunction mobile computing device the input data received from the one or more external sensors associated with the multifunction mobile computing device.

In some embodiments, the program instructions are further computer-executable to implement, responsive to the detecting the disarticulation of the attachment from the sensor location on the multifunction mobile computing device, capturing audio input data received from one or more audio sensors of the multifunction mobile computing device, and transmitting to the event notifying signal response receiver over the radio-frequency network from the radio-frequency transmitter located within the housing of the multifunction mobile computing device the audio input data received from the one or more audio sensors of the multifunction mobile computing device.

In some embodiments, the program instructions are further computer-executable to implement, responsive to the detecting the disarticulation of the attachment from the sensor location on the multifunction mobile computing device, capturing video input data received from one or more video sensors of the multifunction mobile computing device, and transmitting to the event notifying signal response receiver over the radio-frequency network from the radio-frequency transmitter located within the housing of the multifunction mobile computing device the video input data received from the one or more video sensors of the multifunction mobile computing device.

In some embodiments, the program instructions are further computer-executable to implement, responsive to the detecting the disarticulation of the attachment from the sensor location on the multifunction mobile computing device, capturing motion input data received from one or more motion sensors of the multifunction mobile computing device, and transmitting to the event notifying signal response receiver over the radio-frequency network from the radio-frequency transmitter located within the housing of the multifunction mobile computing device the motion input data received from the one or more motion sensors of the multifunction mobile computing device.

In some embodiments, the program instructions are further computer-executable to implement, responsive to the detecting the disarticulation of the attachment from the sensor from one or more vital sign sensors reporting to the multifunction mobile computing device, and transmitting to the event notifying signal response receiver over the radio-frequency network from the radio-frequency transmitter located within the housing of the multifunction mobile computing device the vital sign input data received from the one or more vital sign sensors reporting to the multifunction mobile computing device.

Various embodiments allow for the attachment to connect to the sensor location of the multifunction mobile computing device in different ways without departing from the scope of the present disclosure. In some embodiments, the sensor location includes an audio output connector coupled to a housing of the multifunction mobile computing device, and the attachment includes an articulating component dimensioned for removable articulation to the audio output connector. In some embodiments, the sensor location includes an audio output connector coupled to a housing of the multifunction mobile computing device, and the attachment includes an electrically-conductive articulating component dimensioned for removable articulation to the audio output connector.

In some embodiments, the sensor location includes a digital data connector coupled to a housing of the multifunction mobile computing device, and the attachment includes an articulating component dimensioned for removable articulation to the digital data connector.

In some embodiments, the sensor location includes a magnetic peripheral articulation connector coupled to a housing of the multifunction mobile computing device, and the attachment includes an articulating component polarized for magnetic removable articulation to the magnetic peripheral articulation connector.

In some embodiments, the sensor location includes an electric power transmission connector coupled to a housing of the multifunction mobile computing device, and the attachment includes an articulating component dimensioned for removable articulation to the electric power transmission connector.

In some embodiments, the sensor location includes a radio frequency antennae coupled to a housing of the multifunction mobile computing device, the attachment includes an electronic device having a data connection to the sensor location via a radio frequency channel between the attachment and the multifunction mobile computing device, and the disarticulation includes an attenuation of the data connection.

In some embodiments, the sensor location includes a radio frequency antennae coupled to a housing of the multifunction mobile computing device, the attachment includes an electronic device having a data connection to the sensor location via a radio frequency channel between the attachment and the multifunction mobile computing device, the disarticulation includes a loss of the data connection.

In some embodiments, the sensor location includes a radio frequency antennae coupled to a housing of the multifunction mobile computing device, the attachment includes an electronic device having a data connection to the sensor location via a radio frequency channel between the attachment and the multifunction mobile computing device, and the disarticulation includes an increase in a distance between the sensor location and the attachment.

Some embodiments support the transmission of an event notifying signal in a ‘silent alarm’ mode that allows for transmission of the event notifying signal without notification of persons in the vicinity of the multifunction mobile computing device. In some embodiments, the program instructions computer-executable to implement transmitting to an event notifying signal response receiver over a radio-frequency network from a radio-frequency transmitter located within a housing of the multifunction mobile computing device the event notifying signal further include program instructions computer-executable to implement transmitting to an event notifying signal response receiver over a radio-frequency network from a radio-frequency transmitter located within a housing of the multifunction mobile computing device the event notifying signal without presenting any visible or audible indication of the transmission of the event notifying signal.

Some embodiments support the transmission of an event notifying signal in a ‘local alert’ mode that allows for transmission of the event notifying signal without notification of persons in the vicinity of the multifunction mobile computing device. In some embodiments, the program instructions are further computer-executable to implement, responsive to the detecting the disarticulation of the attachment from the sensor location on the multifunction mobile computing device, providing an audible indication of the transmission of the event notifying signal.

In some embodiments, the program instructions are further computer-executable to implement, responsive to the detecting the disarticulation of the attachment from the sensor location on the multifunction mobile computing device, providing a vibration as an indication of the transmission of the event notifying signal.

In some embodiments, the program instructions are further computer-executable to implement, responsive to the detecting the disarticulation of the attachment from the sensor location on the multifunction mobile computing device, providing light from a visible light source as an indication of the transmission of the event notifying signal.

Some embodiments include a method for facilitating automated response to an event notifying signal. In some embodiments, the method includes detecting a disarticulation from a sensor location on a multifunction mobile computing device of an attachment removably articulated to the sensor location, and, responsive to the detecting the disarticulation of the attachment from the sensor location on the multifunction mobile computing device, transmitting to an event notifying signal response receiver over a radio-frequency network from a radio-frequency transmitter located within a housing of the multifunction mobile computing device the event notifying signal.

In some embodiments, the method further includes responsive to the detecting the disarticulation from the sensor location on the multifunction mobile computing device of the attachment, presenting an event notifying signal control interface capable of receiving an order from a user of the multifunction mobile computing device to prevent transmission of the event notifying signal, and responsive to the order from a user of the multifunction mobile computing device to prevent transmission of the event notifying signal, transmitting an all-clear signal.

In some embodiments, the method further includes, responsive to the detecting the disarticulation of the attachment from the sensor location on the multifunction mobile computing device, over-riding a locked screen condition of the multifunction mobile computing device, and presenting an event notifying signal control interface capable of receiving an order from a user of the multifunction mobile computing device to control parameters of transmission of the event notifying signal.

In some embodiments, the method further includes, responsive to the detecting the disarticulation of the attachment from the sensor location on the multifunction mobile computing device, over-riding a locked screen condition of the multifunction mobile computing device, and presenting an event notifying signal data input interface capable of receiving an condition description indications from a user of the multifunction mobile computing device for transmission with the event notifying signal.

In some embodiments, the method further includes, responsive to the detecting the disarticulation of the attachment from the sensor location on the multifunction mobile computing device, presenting an event notifying signal control interface capable of receiving an order from a user of the multifunction mobile computing device to present transmission of the event notifying signal. In some embodiments, the presenting the event notifying signal control interface capable of receiving the order from a user of the multifunction mobile computing device to prevent transmission of the event notifying signal further includes presenting an event notifying signal control interface capable of receiving a duress indication order from the user of the multifunction mobile computing device. In some embodiments, the method further includes responsive to receiving the duress indication order from the user of the multifunction mobile computing device, indicating over a user interface of the multifunction mobile computing device prevention of transmission of the event notifying signal, and transmitting the event notifying signal with a duress indicator.

In some embodiments, the method further includes, responsive to the detecting the disarticulation of the attachment from the sensor location on the multifunction mobile computing device, capturing input data received from one or more sensors of the multifunction mobile computing device, and transmitting to the event notifying signal response receiver over the radio-frequency network from the radio-frequency transmitter located within the housing of the multifunction mobile computing device the input data received from the one or more sensors of the multifunction mobile computing device.

In some embodiments, the method further includes, responsive to the detecting the disarticulation of the attachment from the sensor location on the multifunction mobile computing device, capturing location data describing a location of the multifunction mobile computing device, and transmitting to the event notifying signal response receiver over the radio-frequency network from the radio-frequency transmitter located within the housing of the multifunction mobile computing device the location data describing the location of the multifunction mobile computing device.

In some embodiments, the method further includes responsive to the detecting the disarticulation of the attachment from the sensor location on the multifunction mobile computing device, capturing input data received from one or more external sensors associated with the multifunction mobile computing device, and transmitting to the event notifying signal response receiver over the radio-frequency network from the radio-frequency transmitter located within the housing of the multifunction mobile computing device the input data received from the one or more external sensors associated with the multifunction mobile computing device.

In some embodiments, the method further includes, responsive to the detecting the disarticulation of the attachment from the sensor location on the multifunction mobile computing device, capturing audio input data received from one or more audio sensors of the multifunction mobile computing device, and transmitting to the event notifying signal response receiver over the radio-frequency network from the radio-frequency transmitter located within the housing of the multifunction mobile computing device the audio input data received from the one or more audio sensors of the multifunction mobile computing device.

In some embodiments, the method further includes, responsive to the detecting the disarticulation of the attachment from the sensor location on the multifunction mobile computing device, capturing video input data received from one or more video sensors of the multifunction mobile computing device, and transmitting to the event notifying signal response receiver over the radio-frequency network from the radio-frequency transmitter located within the housing of the multifunction mobile computing device the video input data received from the one or more video sensors of the multifunction mobile computing device.

In some embodiments, the method further includes, responsive to the detecting the disarticulation of the attachment from the sensor location on the multifunction mobile computing device, capturing motion input data received from one or more motion sensors of the multifunction mobile computing device, and transmitting to the event notifying signal response receiver over the radio-frequency network from the radio-frequency transmitter located within the housing of the multifunction mobile computing device the motion input data received from the one or more motion sensors of the multifunction mobile computing device.

In some embodiments, the method further includes, responsive to the detecting the disarticulation of the attachment from the sensor location on the multifunction mobile computing device, capturing vital sign input data received from one or more vital sign sensors reporting to the multifunction mobile computing device, and transmitting to the event notifying signal response receiver over the radio-frequency network from the radio-frequency transmitter located within the housing of the multifunction mobile computing device the vital sign input data received from the one or more vital sign sensors reporting to the multifunction mobile computing device.

In some embodiments, the transmitting to an event notifying signal response receiver over a radio-frequency network from a radio-frequency transmitter located within a housing of the multifunction mobile computing device the event notifying signal further includes transmitting to an event notifying signal response receiver over a radio-frequency network from a radio-frequency transmitter located within a housing of the multifunction mobile computing device the event notifying signal without presenting any visible or audible indication of the transmission of the event notifying signal.

In some embodiments, the method further includes, responsive to the detecting the disarticulation of the attachment from the sensor location on the multifunction mobile computing device, providing an audible indication of the transmission of the event notifying signal.

In some embodiments, the method further includes, responsive to the detecting the disarticulation of the attachment from the sensor location on the multifunction mobile computing device, providing a vibration as an indication of the transmission of the event notifying signal.

In some embodiments, the method further includes responsive to the detecting the disarticulation of the attachment from the sensor location on the multifunction mobile computing device, providing light from a visible light source as an indication of the transmission of the event notifying signal.

Some embodiments include a non-transitory computer-readable storage medium including program instructions. In some embodiments, the program instructions are executable by one or more processors of a multifunction mobile computing device to cause the multifunction mobile computing device to implement detecting a disarticulation from a sensor location on a multifunction mobile computing device of an attachment removably articulated to the sensor location, and responsive to the detecting the disarticulation of the attachment from the sensor location on the multifunction mobile computing device, transmitting to an event notifying signal response receiver over a radio-frequency network from a radio-frequency transmitter located within a housing of the multifunction mobile computing device the event notifying signal.

In some embodiments, the program instructions are executable by one or more processors of a multifunction mobile computing device to cause the multifunction mobile computing device to implement responsive to the detecting the disarticulation from the sensor location on the multifunction mobile computing device of the attachment, presenting an event notifying signal control interface capable of receiving an order from a user of the multifunction mobile computing device to prevent transmission of the event notifying signal, and responsive to the order from a user of the multifunction mobile computing device to prevent transmission of the event notifying signal, preventing transmission of the event notifying signal.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, over-riding a locked screen condition of the multifunction mobile computing device, and presenting an event notifying signal control interface capable of receiving an order from a user of the multifunction mobile computing device to control parameters of transmission of the event notifying signal.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, over-riding a locked screen condition of the multifunction mobile computing device, and presenting an event notifying signal data input interface capable of receiving an condition description indications from a user of the multifunction mobile computing device for transmission with the event notifying signal.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, presenting an event notifying signal control interface capable of receiving an order from a user of the multifunction mobile computing device to present transmission of the event notifying signal. In some embodiments, the program instructions executable by the one or more processors of the multifunction mobile computing device to cause the multifunction mobile computing device to implement presenting the event notifying signal control interface capable of receiving the order from a user of the multifunction mobile computing device to prevent transmission of the event notifying signal further include program instructions executable by the one or more processors of the multifunction mobile computing device to cause the multifunction mobile computing device to implement presenting an event notifying signal control interface capable of receiving a duress indication order from the user of the multifunction mobile computing device. In some embodiments, the program instructions are executable by one or more processors of a multifunction mobile computing device to cause the multifunction mobile computing device to implement, responsive to receiving the duress indication order from the user of the multifunction mobile computing device, indicating over a user interface of the multifunction mobile computing device prevention of transmission of the event notifying signal, and transmitting the event notifying signal with a duress indicator.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, capturing input data received from one or more sensors of the multifunction mobile computing device, and transmitting to the event notifying signal response receiver over the radio-frequency network from the radio-frequency transmitter located within the housing of the multifunction mobile computing device the input data received from the one or more sensors of the multifunction mobile computing device.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, capturing location data describing a location of the multifunction mobile computing device, and transmitting to the event notifying signal response receiver over the radio-frequency network from the radio-frequency transmitter located within the housing of the multifunction mobile computing device the location data describing the location of the multifunction mobile computing device.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, capturing input data received from one or more external sensors associated with the multifunction mobile computing device, and transmitting to the event notifying signal response receiver over the radio-frequency network from the radio-frequency transmitter located within the housing of the multifunction mobile computing device the input data received from the one or more external sensors associated with the multifunction mobile computing device.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, capturing audio input data received from one or more audio sensors of the multifunction mobile computing device, and transmitting to the event notifying signal response receiver over the radio-frequency network from the radio-frequency transmitter located within the housing of the multifunction mobile computing device the audio input data received from the one or more audio sensors of the multifunction mobile computing device.

In some embodiments, the program instructions are executable by one or more processors of a multifunction mobile computing device to cause the multifunction mobile computing device to implement responsive to the detecting the disarticulation of the attachment from the sensor location on the multifunction mobile computing device, capturing video input data received from one or more video sensors of the multifunction mobile computing device, and transmitting to the event notifying signal response receiver over the radio-frequency network from the radio-frequency transmitter located within the housing of the multifunction mobile computing device the video input data received from the one or more video sensors of the multifunction mobile computing device.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, capturing motion input data received from one or more motion sensors of the multifunction mobile computing device, and transmitting to the event notifying signal response receiver over the radio-frequency network from the radio-frequency transmitter located within the housing of the multifunction mobile computing device the motion input data received from the one or more motion sensors of the multifunction mobile computing device.

In some embodiments, the program instructions are executable by one or more processors of a multifunction mobile computing device to cause the multifunction mobile computing device to implement, responsive to the detecting the disarticulation of the attachment from the sensor from one or more vital sign sensors reporting to the multifunction mobile computing device, and transmitting to the event notifying signal response receiver over the radio-frequency network from the radio-frequency transmitter located within the housing of the multifunction mobile computing device the vital sign input data received from the one or more vital sign sensors reporting to the multifunction mobile computing device.

In some embodiments, the program instructions executable by the one or more processors of the multifunction mobile computing device to cause the multifunction mobile computing device to implement transmitting to an event notifying signal response receiver over a radio-frequency network from a radio-frequency transmitter located within a housing of the multifunction mobile computing device the event notifying signal further include program instructions executable by the one or more processors of the multifunction mobile computing device to cause the multifunction mobile computing device to implement transmitting to an event notifying signal response receiver over a radio-frequency network from a radio-frequency transmitter located within a housing of the multifunction mobile computing device the event notifying signal without presenting any visible or audible indication of the transmission of the event notifying signal.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, providing an audible indication of the transmission of the event notifying signal.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, providing haptic feedback as an indication of the transmission of the event notifying signal.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, providing a vibration as an indication of the transmission of the event notifying signal.

In some embodiments, the program instructions are executable by one or more processors of a multifunction mobile computing device to cause the multifunction mobile computing device to implement, responsive to the detecting the disarticulation of the attachment from the sensor location on the multifunction mobile computing device, providing light from a visible light source as an indication of the transmission of the event notifying signal.

Some embodiments include a system for facilitating automated response to an event notifying signal. In some embodiments, the system includes a network monitoring module configured for monitoring signals received over a data network for a presence of one or more event notifying signals transmitted over a radio-frequency network from a radio-frequency transmitter located within a housing of a multifunction mobile computing device responsive to detecting a disarticulation of an attachment from a sensor location on a multifunction mobile computing device, and an assessment module configured for assessing priority of the one or more event notifying signals transmitted over the radio-frequency network from the radio-frequency transmitter located within the housing of a multifunction mobile computing device responsive to detecting the disarticulation of an attachment from the sensor location on the multifunction mobile computing device, and a resource response module configured for communicating the event notifying signals to resources tasked to respond to the event notifying signals.

In some embodiments, the system includes a logging module configured for receiving condition description indications from a user of the multifunction mobile computing device for transmission with the event notifying signal. In some embodiments, the system includes a real-time communication module configured for communicating response condition description indications to a user of the multifunction mobile computing device in response to the event notifying signal, and receiving condition description indications from a user of the multifunction mobile computing device for transmission with the event notifying signal.

In some embodiments, the system includes a response instruction communication module configured for communicating response instructions to a user of the multifunction mobile computing device in response to the event notifying signal. In some embodiments, the system includes a responder update diffusion module configured for communicating to the resources tasked to respond to the event notifying signals sensor information gathered from the multifunction mobile computing device in response to the event notifying signal.

In some embodiments, the system includes an assessment module configured for assessing patterns in multiple event notifying signals and selecting appropriate responses to one or more event notifying signals. In some embodiments, the system includes a responder instruction module configured for communicating to the resources tasked to respond to the event notifying signals automated instructions selected based on sensor information gathered from the multifunction mobile computing device in response to the event notifying signal.

Some embodiments include a method for facilitating automated response to an event notifying signal. In some embodiments, the method includes monitoring signals received over a data network for a presence of one or more event notifying signals transmitted over a radio-frequency network from a radio-frequency transmitter located within a housing of a multifunction mobile computing device responsive to detecting a disarticulation of an attachment from a sensor location on a multifunction mobile computing device, assessing priority of the one or more event notifying signals transmitted over the radio-frequency network from the radio-frequency transmitter located within the housing of a multifunction mobile computing device responsive to detecting the disarticulation of an attachment from the sensor location on the multifunction mobile computing device, and communicating the event notifying signals to resources tasked to respond to the event notifying signals.

In some embodiments, the method further includes receiving condition description indications from a user of the multifunction mobile computing device for transmission with the event notifying signal.

In some embodiments, the method further includes communicating response condition description indications to a user of the multifunction mobile computing device in response to the event notifying signal, and receiving condition description indications from a user of the multifunction mobile computing device for transmission with the event notifying signal.

In some embodiments, the method further includes communicating response instructions to a user of the multifunction mobile computing device in response to the event notifying signal.

In some embodiments, the method further includes communicating to the resources tasked to respond to the event notifying signals sensor information gathered from the multifunction mobile computing device in response to the event notifying signal. In some embodiments, the method further includes assessing patterns in multiple event notifying signals and selecting appropriate responses to one or more event notifying signals.

In some embodiments, the method further includes communicating to the resources tasked to respond to the event notifying signals automated instructions selected based on sensor information gathered from the multifunction mobile computing device in response to the event notifying signal.

Some embodiments include a non-transitory computer-readable storage medium including program instructions. In some embodiments, the program instructions are executable by one or more processors of a network-connected computing device to implement a network monitoring module monitoring signals received over a data network for a presence of one or more event notifying signals transmitted over a radio-frequency network from a radio-frequency transmitter located within a housing of a multifunction mobile computing device responsive to detecting a disarticulation of an attachment from a sensor location on a multifunction mobile computing device. In some embodiments, the program instructions are executable by one or more processors of a network-connected computing device to implement an assessment module assessing priority of the one or more event notifying signals transmitted over the radio-frequency network from the radio-frequency transmitter located within the housing of a multifunction mobile computing device responsive to detecting the disarticulation of an attachment from the sensor location on the multifunction mobile computing device. In some embodiments, the program instructions are executable by one or more processors of a network-connected computing device to implement a resource response module communicating the event notifying signals to resources tasked to respond to the event notifying signals.

In some embodiments, the program instructions are executable by one or more processors of a network-connected computing device to implement a logging module receiving condition description indications from a user of the multifunction mobile computing device for transmission with the event notifying signal.

In some embodiments, the program instructions are executable by one or more processors of a network-connected computing device to implement a real-time communication module communicating response condition description indications to a user of the multifunction mobile computing device in response to the event notifying signal, and receiving condition description indications from a user of the multifunction mobile computing device for transmission with the event notifying signal.

In some embodiments, the program instructions are executable by one or more processors of a network-connected computing device to implement a response instruction communication module communicating response instructions to a user of the multifunction mobile computing device in response to the event notifying signal.

In some embodiments, the program instructions are executable by one or more processors of a network-connected computing device to implement a responder update diffusion module communicating to the resources tasked to respond to the event notifying signals sensor information gathered from the multifunction mobile computing device in response to the event notifying signal.

In some embodiments, the program instructions are executable by one or more processors of a network-connected computing device to implement an assessment module assessing patterns in multiple event notifying signals and selecting appropriate responses to one or more event notifying signals.

In some embodiments, the program instructions are executable by one or more processors of a network-connected computing device to implement a responder instruction module communicating to the resources tasked to respond to the event notifying signals automated instructions selected based on sensor information gathered from the multifunction mobile computing device in response to the event notifying signal.

Some embodiments include a system for facilitating automated response to an event notifying signal. In some embodiments, the system includes a housing, a sensor location coupled to the housing, a processor located within the housing, a non-transitory computer-readable storage medium, a radio-frequency transmitter located within the housing, and an attachment for the multifunction mobile computing device. In some embodiments, the attachment removably articulates to the sensor location coupled to the housing of the multifunction mobile computing device. Some embodiments include a computer program product in the non-transitory computer-readable medium of the multifunction mobile computing device, wherein the program instructions are computer-executable to implement detecting a disarticulation of the attachment from the sensor location on the multifunction mobile computing device, and responsive to the detecting the disarticulation of the attachment from the sensor location on the multifunction mobile computing device, transmitting to an event notifying signal response receiver over a radio-frequency network from the radio-frequency transmitter located within the housing of the multifunction mobile computing device the event notifying signal.

In some embodiments, the program instructions are further computer-executable to implement, responsive to the detecting the disarticulation of the attachment from the sensor location on the multifunction mobile computing device, presenting an event notifying signal control interface capable of receiving an order from a user of the multifunction mobile computing device to prevent transmission of the event notifying signal, and, responsive to the order from a user of the multifunction mobile computing device to prevent transmission of the event notifying signal, preventing transmission of the event notifying signal.

In some embodiments, the program instructions are further computer-executable to implement, responsive to the detecting the disarticulation of the attachment from the sensor location on the multifunction mobile computing device, over-riding a locked screen condition of the multifunction mobile computing device and presenting an event notifying signal control interface capable of receiving an order from a user of the multifunction mobile computing device to control parameters of transmission of the event notifying signal.

In some embodiments, the program instructions are further computer-executable to implement, responsive to the detecting the disarticulation of the attachment from the sensor location on the multifunction mobile computing device, over-riding a locked screen condition of the multifunction mobile computing device, and presenting an event notifying signal data input interface capable of receiving condition description indications from a user of the multifunction mobile computing device for transmission with the event notifying signal.

In some embodiments, the program instructions are further computer-executable to implement, responsive to the detecting the disarticulation of the attachment from the sensor location on the multifunction mobile computing device, and presenting an event notifying signal control interface capable of receiving an order from a user of the multifunction mobile computing device to prevent transmission of the event notifying signal. In some embodiments, the presenting the event notifying signal control interface capable of receiving the order from a user of the multifunction mobile computing device to prevent transmission of the event notifying signal further includes presenting an event notifying signal control interface capable of receiving a duress indication order from the user of the multifunction mobile computing device. In some embodiments, the program instructions are further computer-executable to implement, responsive to receiving the duress indication order from the user of the multifunction mobile computing device, indicating over a user interface of the multifunction mobile computing device prevention of transmission of the event notifying signal, and transmitting the event notifying signal with a duress indicator.

In some embodiments, the program instructions are further computer-executable to implement, responsive to the detecting the disarticulation of the attachment from the sensor location on the multifunction mobile computing device, capturing input data received from one or more sensors of the multifunction mobile computing device, and transmitting to the event notifying signal response receiver over the radio-frequency network from the radio-frequency transmitter located within the housing of the multifunction mobile computing device the input data received from the one or more sensors of the multifunction mobile computing device.

In some embodiments, the program instructions are further computer-executable to implement, responsive to the detecting the disarticulation of the attachment from the sensor location on the multifunction mobile computing device, capturing location data describing a location of the multifunction mobile computing device, and transmitting to the event notifying signal response receiver over the radio-frequency network from the radio-frequency transmitter located within the housing of the multifunction mobile computing device the location data describing the location of the multifunction mobile computing device.

In some embodiments, the program instructions are further computer-executable to implement responsive to the detecting the disarticulation of the attachment from the sensor location on the multifunction mobile computing device, capturing input data received from one or more external sensors associated with the multifunction mobile computing device, and transmitting to the event notifying signal response receiver over the radio-frequency network from the radio-frequency transmitter located within the housing of the multifunction mobile computing device the input data received from the one or more external sensors associated with the multifunction mobile computing device.

In some embodiments, the program instructions are further computer-executable to implement, responsive to the detecting the disarticulation of the attachment from the sensor location on the multifunction mobile computing device, capturing audio input data received from one or more audio sensors of the multifunction mobile computing device, and transmitting to the event notifying signal response receiver over the radio-frequency network from the radio-frequency transmitter located within the housing of the multifunction mobile computing device the audio input data received from the one or more audio sensors of the multifunction mobile computing device.

In some embodiments, the program instructions are further computer-executable to implement, responsive to the detecting the disarticulation of the attachment from the sensor location on the multifunction mobile computing device, capturing video input data received from one or more video sensors of the multifunction mobile computing device, and transmitting to the event notifying signal response receiver over the radio-frequency network from the radio-frequency transmitter located within the housing of the multifunction mobile computing device the video input data received from the one or more video sensors of the multifunction mobile computing device.

In some embodiments, the program instructions are further computer-executable to implement, responsive to the detecting the disarticulation of the attachment from the sensor location on the multifunction mobile computing device, capturing motion input data received from one or more motion sensors of the multifunction mobile computing device, and transmitting to the event notifying signal response receiver over the radio-frequency network from the radio-frequency transmitter located within the housing of the multifunction mobile computing device the motion input data received from the one or more motion sensors of the multifunction mobile computing device.

In some embodiments, the program instructions are further computer-executable to implement, responsive to the detecting the disarticulation of the attachment from the sensor location on the multifunction mobile computing device, capturing vital sign input data received from one or more vital sign sensors reporting to the multifunction mobile computing device, and transmitting to the event notifying signal response receiver over the radio-frequency network from the radio-frequency transmitter located within the housing of the multifunction mobile computing device the vital sign input data received from the one or more vital sign sensors reporting to the multifunction mobile computing device.

In some embodiments, the sensor location includes an audio output connector coupled to a housing of the multifunction mobile computing device, and the attachment includes an articulating component dimensioned for removable articulation to the audio output connector.

In some embodiments, the sensor location includes an audio output connector coupled to a housing of the multifunction mobile computing device, and the attachment includes an electrically-conductive articulating component dimensioned for removable articulation to the audio output connector.

In some embodiments, the sensor location includes a digital data connector coupled to a housing of the multifunction mobile computing device, and the attachment includes an articulating component dimensioned for removable articulation to the digital data connector.

In some embodiments, the sensor location includes a magnetic peripheral articulation connector coupled to a housing of the multifunction mobile computing device, and the attachment includes an articulating component polarized for magnetic removable articulation to the magnetic peripheral articulation connector.

In some embodiments, the sensor location includes an electric power transmission connector coupled to a housing of the multifunction mobile computing device, the attachment includes an articulating component dimensioned for removable articulation to the electric power transmission connector.

In some embodiments, the program instructions are further computer-executable to implement transmitting to an event notifying signal response receiver over a radio-frequency network from a radio-frequency transmitter located within a housing of the multifunction mobile computing device the event notifying signal further include program instructions computer-executable to implement transmitting to an event notifying signal response receiver over a radio-frequency network from a radio-frequency transmitter located within a housing of the multifunction mobile computing device the event notifying signal without presenting any visible or audible indication of the transmission of the event notifying signal.

In some embodiments, the program instructions are further computer-executable to implement, responsive to the detecting the disarticulation of the attachment from the sensor location on the multifunction mobile computing device, providing an audible indication of the transmission of the event notifying signal.

In some embodiments, the program instructions are further computer-executable to implement, responsive to the detecting the disarticulation of the attachment from the sensor location on the multifunction mobile computing device, providing haptic feedback as an indication of the transmission of the event notifying signal.

In some embodiments, the program instructions are further computer-executable to implement, responsive to the detecting the disarticulation of the attachment from the sensor location on the multifunction mobile computing device, providing a vibration as an indication of the transmission of the event notifying signal.

In some embodiments, the program instructions are further computer-executable to implement, responsive to the detecting the disarticulation of the attachment from the sensor location on the multifunction mobile computing device, providing light from a visible light source as an indication of the transmission of the event notifying signal.

In some embodiments, a system for facilitating a response to an event notifying signal. The system comprises: a network monitoring module configured for monitoring signals received over a data network for a presence of one or more event notifying signals indicative of a relevant incident within a geographic area; an assessment module configured for: determining if the relevant incident could impact any persons or property of an enterprise or organization within the geographic area; and identifying a first group of people of the enterprise or organization who could be impacted by the relevant incident; and a resource response module configured for communicating a response to a computing device associated with each person of the first group of people, the response providing indication of the relevant incident.

In some embodiments, the assessment module is further configured for: identifying specific property of the enterprise or organization that could be impacted by the relevant incident; identifying a second group of people of the enterprise or organization who can secure the specific property before the relevant incident impacts the specific property. The resource response module is further configured for communicating a response to a computing device associated with each person of the second group of people, the response providing indication of the relevant incident and the specific property.

In some embodiments, the property is within in a threshold distance from the relevant incident.

In some embodiments, the first group of people is within in a threshold distance from the relevant incident.

In some embodiments, the resource response module is further configured for: receiving a status update from a person of the first group of people; and requesting a status update from the remaining people of the first group of people.

In some embodiments, the resource response module is further configured for: providing a status update on the relevant incident the computing device associated with each person of the first group of people.

In some embodiments, the relevant incident is a security related issue or an environmental related issue.

In some embodiments, a method for facilitating automated response to an event notifying signal comprises: monitoring signals received over a data network for a presence of one or more event notifying signals indicative of a relevant incident within a geographic area; determining if the relevant incident could impact any persons or property of an enterprise or organization within the geographic area; and identifying a first group of people of the enterprise or organization who could be impacted by the relevant incident; and communicating a response to a computing device associated with each person of the first group of people, the response providing indication of the relevant incident.

In some embodiments, the method further comprising: identifying specific property of the enterprise or organization that could be impacted by the relevant incident; identifying a second group of people of the enterprise or organization who can secure the specific property before the relevant incident impacts the specific property; and communicating a response to a computing device associated with each person of the second group of people, the response providing indication of the relevant incident and the specific property.

In some embodiments, the property is within in a threshold distance from the relevant incident.

In some embodiments, the first group of people is within in a threshold distance from the relevant incident.

In some embodiments, the method further comprises: receiving a status update from a person of the first group of people; and requesting a status update from the remaining people of the first group of people.

In some embodiments, the method further comprises: providing a status update on the relevant incident the computing device associated with each person of the first group of people.

In some embodiments, the relevant incident is a security related issue or an environmental related issue.

In some embodiments, a non-transitory computer-readable storage medium comprises program instructions. The program instructions are executable by one or more processors of a network-connected computing device to implement: monitoring signals received over a data network for a presence of one or more event notifying signals indicative of a relevant incident within a geographic area; determining if the relevant incident could impact any persons or property of an enterprise or organization within the geographic area; identifying a first group of people of the enterprise or organization who could be impacted by the relevant incident; and communicating a response to a computing device associated with each person of the first group of people, the response providing indication of the relevant incident.

In some embodiments, the non-transitory computer-readable storage medium further comprises program instructions executable by the one or more processors of the network-connected computing device to implement: identifying specific property of the enterprise or organization that could be impacted by the relevant incident; identifying a second group of people of the enterprise or organization who can secure the specific property before the relevant incident impacts the specific property; and communicating a response to a computing device associated with each person of the second group of people, the response providing indication of the relevant incident and the specific property.

In some embodiments, the property is within in a threshold distance from the relevant incident.

In some embodiments, the first group of people is within in a threshold distance from the relevant incident.

The non-transitory computer-readable storage further comprises program instructions executable by the one or more processors of the network-connected computing device to implement: receiving a status update from a person of the first group of people; and requesting a status update from the remaining people of the first group of people.

The non-transitory computer-readable storage medium further comprises program instructions executable by the one or more processors of the network-connected computing device to implement: providing a status update on the relevant incident the computing device associated with each person of the first group of people.

FIG. 1 depicts an ecosystem for facilitating automated response to an event notifying signal, in accordance with some embodiments. An event notifying signal response receiver 110 included a client interface 115, an event notifying response management module 117, and a database 119. In some embodiments, the event notifying signal response receiver 110 maintains logs of event notifying signals and metadata, such as source, time, frequency, location, or transmission links of the event notifying signals in the database 119. The event notifying signal response receiver 110 receives at the client interface 115 event notifying signals over one or more networks, for example, a wireless network 120*a* or a wired network 120*b*. In some embodiments, the event notifying signal response receiver 110 receives event notifying signals over one or more combination wired/wireless networks. The event notifying signals are received at the client interface 115 over a plurality of wireless communication links 125*a* through 125*n*, 130*a* through 130*n*, and wired communication links 135*a* through 135*n*, 140*a* through 140*n* from a plurality of sources.

In the illustrated embodiment, a first set of sources includes Mobile Multifunction Computing Devices (MMCDs) 145*a* through 145*n*, also referred to as portable electronic devices, which communicate with the event notifying signal response receiver 110 over the first set of wireless communication links 125*a* through 125*n*. In some embodiments, an MMCD comprise mobile phones, tablet computers, personal digital assistants, or laptop computers. The MMCDs 145*a* through 145*n* each include a respective event notifying signal module 150*a* through 150*n*, for example electronic circuitry or program instructions executable to cause the MMCD 145*a* through 145*n* to transmit an event notifying signal to the client interface 115. In the illustrated embodiment, a second set of sources includes servers 155*a* through 155*n*, which communicate with the event notifying signal response receiver 110 over the second set of wireless communication links 130*a* through 130*n*. The servers 155*a* through 155*n* each include a respective event notifying signal module 160*a* through 160*n*, for example electronic circuitry or program instructions executable to cause the server 155*a* through 155*n* to transmit an event notifying signal to the client interface 115. In some embodiments, the servers 155*a* through 155*n* include respective databases 157*a* through 157*n*.

In some embodiments, the wireless communication links 125*a* through 125*n* correspond to respective MMCDs 145*a* through 145*n*. In other embodiments, more than one of the MMCDs 145*a* through 145*n* communicate over less than a corresponding number of wireless communication links 125*a* through 125*n*. For example, MMCD's may utilize multiple access methods such as TDMA, CDMA, Power Data Communications Protocols, and the like. In some embodiments, one or more MMCDs 145*a* through 145*n* communicates over more than a corresponding number of wireless communication links 125*a* through 125*n*. For example, an MMCD 145 may utilize multiple-input, multiple-output orthogonal frequency division multiplexing (MIMO-OFDM), or other protocols or configurations which take advantage of multiple antennas, wireless communication links 125*a* through 125*n*, and the like.

In some embodiments, the wireless communication links 130*a* through 130*n* correspond to respective servers 155*a* through 155*n*. In other embodiments, more than one server 155*a* through 155*n* communicates over less than a corresponding number of wireless communication links 130*a* through 130*n*. For example, servers may utilize multiple access methods such as TDMA, CDMA, Power Data Communications Protocols, and the like. In some embodiments, one or more servers 155*a* through 155*n* communicates over more than a corresponding number of wireless communication links 130*a* through 130*n*. For example, a server 155*a* may utilize multiple-input, multiple-output orthogonal frequency division multiplexing (MIMO-OFDM), or other protocols or configurations which take advantage of multiple antennas, wireless communication links 130*a* through 130*n*, and the like.

In the illustrated embodiment, a third set of sources includes MMCD's 165*a* through 165*n*, which communicate with the event notifying signal response receiver 110 over the first set of wired communication links 135*a* through 135*n*. The MMCD's 165*a* through 165*n* each include a respective event notifying signal module 170*a* through 170*n*, for example electronic circuitry or program instructions executable to cause the MMCDs 145*a* through 145*n* to transmit an event notifying signal to the client interface 115. In the illustrated embodiment, a fourth set of sources includes servers 175*a* through 175*n* which communicate with the event notifying signal response receiver 110 over the second set of wired communication links 140*a* through 140*n*. The servers 175*a* through 175*n* each include a respective event notifying signal module 180*a* through 180*n*, for example electronic circuitry or program instructions executable to cause the server 175*a* through 175*n* to transmit an event notifying signal to the client interface 115. In some embodiments, the wired communication links 135*a* through 135*n* correspond to respective MMCD's 165*a* through 165*n*. In other embodiments, the MMCD's 165*a* through 165*n* may communicate over more or less than a corresponding number of respective wired communication links 135*a* through 135*n*. In some embodiments, the wired communication links 140*a* through 140*n* correspond to respective servers 175*a* through 175*n*. In other embodiments, servers 175*a* through 175*n* communicate over more or less than a corresponding number of respective wired communication links 140*a* through 140*n*. In some embodiments, the servers 175*a* through 175*n* include respective databases 177*a* through 177*n*.

Further, the client interface 115 is configured to transmit over a plurality of wireless transmission links 185*a* through 185*n*, 190*a* through 190*n*, and wired transmission links 195*a* through 195*n*, 200*a* through 200*n* to a plurality of resource clients 205*a* through 205*n*, 210*a* through 210*n*, 215*a* through 215*n*, and 220*a* through 220*n*, also referred to as resources. In some embodiments, a resource comprises mobile phones, tablet computers, personal digital assistants, special-purpose emergency responder radio devices, laptop computers, and the like. In the illustrated embodiment, a first set of resources includes resource clients 205*a* through 205*n*, which communicate with the event notifying signal response receiver 110 over the first set of wireless transmission links 185*a* through 185*n*. Communications from the event notifying signal response receiver 110 are received at a respective resource interface 225*a* through 225*n* of each resource client 205*a* through 205*n*, for example electronic circuitry or program instructions executable to configure the resource client 205*a* through 205*n* for reception of an event notifying signal from the client interface 115. In some embodiments, a resource client 205 includes more than one resource interface 225. In some embodiments, a resource interface 225 is configured for reception and transmission of event notifying signals.

In the illustrated embodiment, a second set of resources includes resource clients 210*a* through 210*n*, which communicate with the event notifying signal response receiver 110 over the second set of wireless transmission links 190*a* through 190*n*. Communications from the event notifying signal response receiver 110 are received at a respective resource interface 230*a* through 230*n* of each resource client 210*a* through 210*n*, for example electronic circuitry or program instructions executable to configure the resource client 210*a* through 210*n* for reception of an event notifying signal from the client interface 115. In some embodiments, a resource client 210 includes more than one resource interface 230. In some embodiments, a resource interface 230 is configured for reception and transmission of event notifying signals.

In the illustrated embodiment, a third set of resources includes resource clients 215*a* through 215*n*, which communicate with the event notifying signal response receiver 110 over the first set of wired transmission links 195*a* through 195*n*. Communications from the event notifying signal response receiver 110 are received at a respective resource interface 235*a* through 235*n* of each resource client 215*a* through 215*n*, for example electronic circuitry or program instructions executable to configure the resource client 215*a* through 215*n* for reception of an event notifying signal from the client interface 115. In some embodiments, a resource client 215 includes more than one resource interface 235. In some embodiments, a resource interface 235 is configured for reception and transmission of event notifying signals.

In the illustrated embodiment, a fourth set of resources includes resource clients 220*a* through 220*n*, which communicate with the event notifying signal response receiver 110 over the second set of wired transmission links 200*a* through 200*n*. Communications from the event notifying signal response receiver 110 are received at a respective resource interface 240*a* through 240*n* of each resource client 220*a* through 220*n*, for example electronic circuitry or program instructions executable to configure the resource client 220*a* through 220*n* for reception of an event notifying signal from the client interface 115. In some embodiments, a resource client 220 includes more than one resource interface 240. In some embodiments, a resource interface 240 is configured for reception and transmission of event notifying signals.

Further, in some embodiments, one or more MMCDs 145*a* through 145*n* and servers 155*a* through 155*n* are configured for direct communication with resource clients 205*a* through 205*n* over a direct communication link 245, for example, a wireless or wired network. Accordingly, event notifying signals, or data embodying event notifying signals, may be communicated directly between the MMCD 145 or the server 155 and the resource client 205.

Although the foregoing system has described various elements individually, for example, MMCDs 145*a* through 145*n* and resource clients 210*a* through 210*n*, this is not intending to be limiting. For example, the functions of one or more of the MMCDs 145*a* through 145*n*, 165*a* through 165*n* or servers 155*a* through 155*n*, 175*a* and 175*n* and the functions of one or more resource clients 205, 210, 215, 220 may be embodied in the same device. That is to say, in some embodiments, an MMCD 145*a* includes an event notifying signal module 150*a* for transmitting an event notifying signal to the client interface 115. The MMCD 145*a* further corresponds to a resource client 210*a*, including a resource interface 230*a* for reception of an event notifying signal from the client interface 115.

Figure 2:
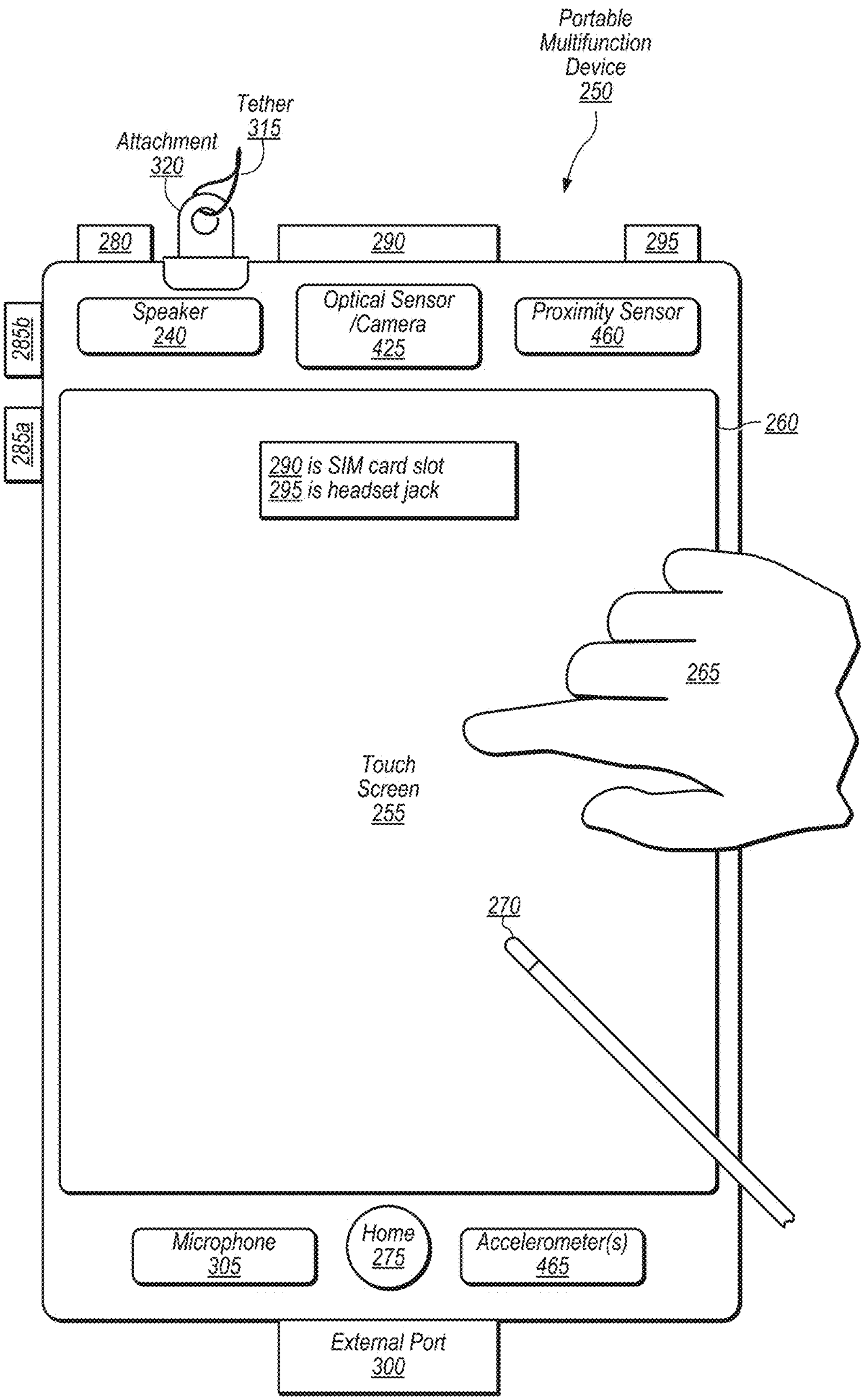
FIG. 2 illustrates a block diagram of a multifunction mobile computing device facilitating automated response to an event notifying signal, in accordance with some embodiments.

FIG. 2 illustrates an example of a portable multifunction device 250, or telephone, in accordance with some embodiments, which may embody one or more functions of the MMCDs 145*a* through 145*n*, 165*a* through 165*n*, or resource clients 205, 210, 215, 220, as previously described. Accordingly, in some embodiments, the portable multifunction device 250 comprises mobile phones, tablet computers, personal digital assistants, special-purpose emergency responder radio devices, laptop computers, smartwatches, and the like. In the illustrated embodiment, the touch screen 255 of the portable multifunction device 250 displays one or more graphics within a user interface 260 (UI). In this embodiment, as well as others described below, a user may select one or more of the graphics by making a gesture on the graphics, for example, with one or more fingers 265 (not drawn to scale in the figure) or one or more styluses 270 (not drawn to scale in the figure).

The portable multifunction device 250 may also include one or more physical buttons, such as “home” or menu button 275. As described below, the menu button 275 may be used to navigate to any application in a set of applications that may be executed on the portable multifunction device 250. Alternatively, in some embodiments, the menu button 275 is implemented as a soft key in the user interface 260 displayed on touch screen 255.

In one embodiment, the portable multifunction device 250 includes the touch screen 255, the menu button 275, a push button 280 for powering the device on/off and locking the device, volume adjustment button(s) 285, Subscriber Identity Module (SIM) card slot 290, headset or audio jack 295, and an external port 300 (such as a docking/charging port). Push button 280 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process.

In an alternative embodiment, the portable multifunction device 250 also may accept verbal input for activation or deactivation of some functions through microphone 305.

In some embodiments, the portable multifunction device 250 is equipped with a peripheral device 310 (or an attachment device) (e.g., a tether 315 coupled to an attachment 320 that is inserted into the audio jack 295 of the portable multifunction device 250) for use in causing the portable multifunction device 250 to facilitate automated response to an event notifying signal by transmitting an event notifying signal from the portable multifunction device 250.

In some embodiments, the peripheral device 310 includes a tether 315 (or strap) and an attachment 320 configured for removably articulating the attachment to the portable multifunction device 250. In the example embodiment, the attachment 320 removably articulates to a sensor location 325 coupled to the housing of the portable multifunction device 250, such as the audio jack 295, or a data port, or the external port 300. In some embodiments, the attachment 320 removably articulates to a sensor location 325 in a manner detectable to a sensor housed at the sensor location 325.

Upon becoming alarmed at circumstances in a user’s local area, the user of the portable multifunction device 250 pulls the tether 315 to cause separation of the portable multifunction device 250 from the peripheral device 310 (e.g., the attachment 320 is removed from the audio jack of the portable multifunction device 250). In some embodiments, upon application of force to the tether 315 in a direction away from the sensor location 325, the sensor housed at the sensor location 325 detects removal of the attachment 320 and causes the portable multifunction device 250 to transmit an event notifying signal to event notifying signal response receiver 110 over wireless communication link 125*a* or directly to the resource client 205*a* over the communication channel 245*a*. Thus, in some embodiments, the act of connecting or disconnecting the attachment 320 itself triggers certain functions of the portable multifunction device 250, such as transmission of an event notifying signal. In some embodiments, the act of connecting or disconnecting the attachment 320 itself triggers certain functions of the portable multifunction device 250, such as transmission of an event notifying signal, even if the touch screen 255 of the portable multifunction device 250 (e.g., of the phone) is in a locked condition and incapable of receiving standard touchscreen input.

As an example of use of one embodiment, a jogger who gets attacked in the park while jogging pulls a tether 315 attached to an attachment 320 that is inserted into the audio jack of the portable multifunction device 250 (her phone). In some embodiments, the act of pulling the strap and thereby removing the attachment 320 from the audio jack causes transmission of an event notifying signal to event notifying signal response receiver 110 over wireless communication link 125*a* for routing of the event notifying signal by the event notifying signal response receiver 110 over the wireless transmission link 185*a* to a resource client 205*a* in the squad-car of a local policeman. Accordingly, the resource client 205*a* may be said to be the resource tasked to respond to the event notifying signal.

As example of use of another embodiment, a jogger who gets attacked in the park while jogging pulls a tether 315 attached to an attachment 320 that is inserted into the audio jack of the portable multifunction device 250 (his smartwatch). In some embodiments, the act of pulling the tether 315 and thereby removing the attachment 320 from the audio jack 295 causes transmission of an event notifying signal directly to a user-pre-selected resource client 205*a*

(e.g., a fellow jogger on the trail, for example by sending email, text messages, or an audio message) over communication channel 245*a*.

As example of use of another embodiment, a jogger who gets attacked in the park while jogging pulls a tether 315 attached to an attachment 320 that is inserted into the audio jack 295 of the portable multifunction device 250 (his smartwatch). In some embodiments, the act of pulling the tether 315 and removing the attachment 320 from the audio jack 295 causes transmission of an event notifying signal directly to a user-pre-selected resource client 205*a* (e.g., a fellow jogger on the trail, for example by sending email, text messages, or an audio message) over communication channels 245*a* and transmission of an event notifying signal to event notifying signal response receiver 110 over wireless communication link 125*a* for routing of the event notifying signal by the event notifying signal response receiver 110 over communication channel 185*b* to a resource client 205*b* in the squad-car of a local policeman. In some embodiments, the event notifying signal transmitted to resource clients 205*a* and 205*b* can include details such as a map pointing to the location of portable multifunction device 250 and any sensor data (e.g., audio or video, position, vital signs picked up from a personal fitness sensor coupled to the portable multifunction device 250 by a radio-frequency link) received from portable multifunction device 250.

As example of use of another embodiment, a Marine who gets attacked in a combat zone pulls a tether 315 attached to an attachment 320 that is inserted into the power input jack of the portable multifunction device 250 (his combat radio). In some embodiments, the act of pulling the tether 315 and removing the attachment 320 from the audio jack 295 causes transmission of an event notifying signal directly to a user-pre-selected resource client 205*a* (e.g., one or more Marines in his platoon, for example by sending email, text messages, or an audio message) over communication channels 245*a* and transmission of an event notifying signal to event notifying signal response receiver 110 (e.g., a combat intelligence management server) over wireless communication link 125*a* for routing of the event notifying signal by the event notifying signal response receiver 110 over communication channel 185*b* to a resource client 205*b* in a nearby tank. In some embodiments, the event notifying signal transmitted to resource clients 205*a* through 205*b* can include details such as a map pointing to the location of portable multifunction device 250 and any sensor data (e.g., audio or video, position, vital signs picked up from a personal health sensor coupled to the portable multifunction device 250 by a radio-frequency link) received from the portable multifunction device 250.

Figure 3A:
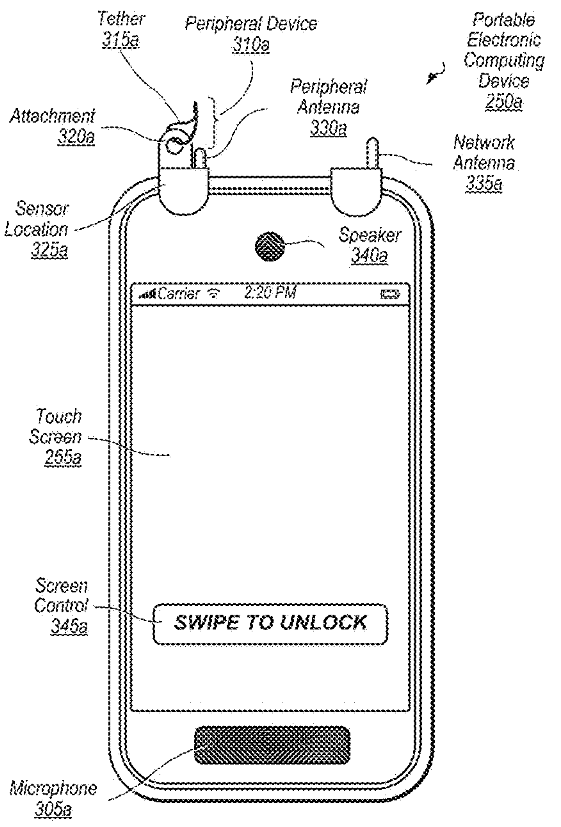
FIG. 3A illustrates a multifunction mobile computing device equipped with an attachment for facilitating automated response to an event notifying signal, in accordance with some embodiments.

FIG. 3A illustrates the portable electronic computing device 250*a* equipped with an attachment or peripheral device 310*a* for facilitating automated response to an event notifying signal, in accordance with some embodiments. The portable electronic computing device 250*a* is coupled to the peripheral device 310*a* including a tether 315*a* and an attachment 320*a* connected to a sensor location 325. The portable electronic computing device 250*a* includes a peripheral antenna 330*a*, which, in some embodiments, may be used for communication with either remote sensors or wearable computing or sensor devices (smartwatches, computing goggles) or, in some embodiments, with peripheral device 310*a*. The portable electronic computing device 250*a* further includes a network antenna 335*a* for communicating with a data network, such as wireless network 120*a* of FIG. 1. The portable electronic computing device 250*a* further includes a speaker 340*a*, the touch screen 255*a* showing a screen control 345, and the microphone 305. Functions of various components of portable electronic computing device 250*a* are discussed below with respect to FIGS. 1, 2, and 4.

In some embodiments, peripheral device 310*a* is used in and configured for use in causing the portable electronic computing device 250*a* to facilitate automated response to event notifying signals. As shown, peripheral device 310*a* includes an attachment 320*a* for a portable electronic computing device 250*a*. In some embodiments, the attachment 320*a* removably articulates to a sensor location 325*a* coupled to the housing of the portable electronic computing device 250*a*. In some embodiments, the attachment 320*a* removably articulates to a sensor location 325*a* in a manner detectable to a sensor housed at the sensor location 325. In some embodiments, the peripheral device 310*a* includes a tether 315*a* for removably articulating the attachment 320*a* to a user of the portable electronic computing device 250*a*. In some embodiments, upon application of force to the tether 315*a* in a direction away from the sensor location 325, the sensor housed at the sensor location 325*a* detects removal of the attachment 320*a* and causes the multifunction mobile computing device to transmit an event notifying signal from the network antenna 335*a* or to a nearby cooperating multifunction mobile computing device from the peripheral antenna 330*a*.

In some embodiments, the sensor location 325*a* includes an audio output connector (not visible) coupled to a housing of the portable electronic computing device 250*a*, and the attachment 320*a* includes an articulating component (not visible) dimensioned for removable articulation to the audio output connector (not visible).

In some embodiments, the sensor location 325*a* includes an audio output connector (not visible) coupled to a housing of the portable electronic computing device 250*a*, and the attachment 320*a* includes an electrically-conductive articulating component (not visible) dimensioned for removable articulation to the audio output connector (not visible).

In some embodiments, the sensor location 325*a* includes a digital data connector (not visible) coupled to a housing of the portable electronic computing device 250*a*, and the attachment 320*a* includes an articulating component (not visible) dimensioned for removable articulation to the digital data connector (not visible).

In some embodiments, the sensor location 325*a* includes a magnetic peripheral articulation connector (not visible) coupled to a housing of the portable electronic computing device 250*a*, and the attachment 320*a* includes an articulating component polarized for magnetic removable articulation to the magnetic peripheral articulation connector.

In some embodiments, the sensor location 325*a* includes an electric power transmission connector (not visible), for example, the external port 300, coupled to a housing of the portable electronic computing device 250*a*, and the attachment 320*a* includes an articulating component dimensioned for removable articulation to the electric power transmission connector (not visible).

In some embodiments, the sensor location includes 325*a* a radio frequency antennae, such as peripheral antenna 330*a* coupled to a housing of the portable electronic computing device 250*a*, the attachment 320*a* includes an electronic device having a data connection to the sensor location 325*a* via a radio frequency channel between the attachment 320*a* and the portable electronic computing device 250*a* over peripheral antenna 330*a* (e.g., via near field communication or Bluetooth), and the disarticulation includes an attenuation of the data connection. Thus, in some embodiments, a physical attachment to the portable electronic computing device 250*a* is not required for operation as described herein of the peripheral device 310*a*. In some embodiments, the peripheral device 310*a* signals the portable electronic computing device 250*a* in response to a detachment of attachment from a housing, causing transmission of an event notifying signal as described herein.

In some embodiments, the sensor location includes 325*a* a radio frequency antennae, such as peripheral antenna 330*a* coupled to a housing of the portable electronic computing device 250*a*, the attachment 320*a* includes an electronic device having a data connection to the sensor location via a radio frequency channel between the attachment 320*a* and the portable electronic computing device 250*a* over peripheral antenna 330*a* (e.g., via near field communication or Bluetooth), and the disarticulation includes a loss of the data connection. Thus, in some embodiments, a physical attachment to the portable electronic computing device 250*a* is not required for operation as described herein of the peripheral device 310*a*. In some embodiments, the peripheral device 310*a* signals the portable electronic computing device 250*a* in response to a detachment of attachment from a housing, causing transmission of an event notifying signal as described herein.

FIG. 2B depicts the portable electronic computing device 250*b* equipped with an attachment or peripheral device 310*b* for facilitating automated response to an event notifying signal, in accordance with some embodiments. A portable electronic computing device 250*b* is decoupled from a peripheral device 310*b* including a tether 315*b* and an attachment 320*b* for connection to a sensor location 325*b*. The portable electronic computing device 250*b* includes a peripheral antenna 330*b*, which, in some embodiments, may be used for communication with cither remote sensors or wearable computing or sensor devices (smartwatches, computing goggles) or, in some embodiments, with peripheral device 310*b*. The portable electronic computing device 250*b* further includes a network antenna 335*b* for communicating with a data network, such as wireless network 120*a* of FIG. 1. The portable electronic computing device 250*b* further includes a speaker 340*b*, a touch screen 255*b*, and a microphone 305*b*. Touch screen 255*b* shows an override control 350*b*, a screen unlock control 345*b*, a toolbar 355*b*, a configuration control 360*b*, and response instructions 365*b*. Examples of response instructions 365*b* to a user can include, in the event of a medical emergency, treatment instructions. Examples of response instructions 365*b* to a user can include, in the event of a security emergency, descriptions of a suspect. Examples of response instructions 365*b* to a user can include, in the event of a public emergency, directions to the locations of other users also affected by the public emergency. In the event of a security emergency, an example of response instructions 365*b* to a user can include directions to a police station. Functions of various components of portable electronic computing device 250*b* are discussed below with respect to FIGS. 1, 2, and 4.

In some embodiments, peripheral device 310*b* is used in and configured for use in causing the portable electronic computing device 250*b* to facilitate automated response to event notifying signals. As shown, peripheral device 310*b* includes an attachment 320*b* for a portable electronic computing device 250*b*. In some embodiments, the attachment 320*b* removably articulates using a plug 370*b* to a sensor location 325*b* coupled to the housing of the portable electronic computing device 250*b*. In some embodiments, the attachment 320*b* removably articulates to a sensor location 325*b* in a manner detectable to a sensor housed at the sensor location 325*b*. In some embodiments, the peripheral device 310*b* includes a tether 315*b* for removably articulating the attachment 320*b* to a user of the portable electronic computing device 250*b*. In some embodiments, upon application of force to the tether 315*b* in a direction away from the sensor location 325*b*, the sensor housed at the sensor location 325*b* detects removal of the attachment 320*b* and causes the portable multifunction device 250 to transmit an event notifying signal from the network antenna 335*b* or to a nearby cooperating portable electronic device from the peripheral antenna 330*b*.

In some embodiments, the sensor location 325*b* includes an audio output connector (not visible) coupled to a housing of the portable electronic computing device 250*b*, and the attachment 320*b* includes a plug 370*b* (such as an articulating plug) dimensioned for removable articulation to the audio output connector (not visible).

In some embodiments, the sensor location 325*b* includes an audio output connector (not visible) coupled to a housing of the portable electronic computing device 250*b*, and the attachment 320*b* includes a plug 370*b* (such as an electrically-conductive articulating plug) dimensioned for removable articulation to the audio output connector (not visible).

In some embodiments, the sensor location 325*b* includes a digital data connector (not visible) coupled to a housing of the portable electronic computing device 250*b*, and the attachment 320*b* includes a plug 370*b* (such as an articulating plug) dimensioned for removable articulation to the digital data connector (not visible).

In some embodiments, the sensor location 325*b* includes a magnetic peripheral articulation connector (not visible) coupled to a housing of the portable electronic computing device 250*b*, and the attachment 320*b* includes an articulating component polarized for magnetic removable articulation to the magnetic peripheral articulation connector.

In some embodiments, the sensor location 325*b* includes an electric power transmission connector (not visible), for example, the external port 300, coupled to a housing of the portable electronic computing device 250*b*, and the attachment 320*b* includes a plug 370*b* (such as an articulating plug) dimensioned for removable articulation to the electric power transmission connector (not visible).

In some embodiments, the sensor location includes 325*b* a radio frequency antennae, such as peripheral antenna 330*b* coupled to a housing of the portable electronic computing device 250*b*, the attachment 320*b* includes an electronic device having a data connection to the sensor location via a radio frequency channel between the attachment 320*b* and the portable electronic computing device 250*b* over peripheral antenna 330*b* (e.g., via near field communication or Bluetooth), and the disarticulation includes an attenuation of the data connection. Thus, in some embodiments, a physical attachment to the portable electronic computing device 250*b* is not required for operation as described herein of the peripheral device 310*b*. In some embodiments, the peripheral device 310*b* signals the portable electronic computing device 250*b* in response to a detachment of the attachment 320*b* from a housing, causing transmission of an event notifying signal as described herein.

In some embodiments, the sensor location includes 325*b* a radio frequency antennae, such as peripheral antenna 330*b* coupled to a housing of the portable electronic computing device 250*b*, the attachment 320*b* includes an electronic device having a data connection to the sensor location 325*b* via a radio frequency channel between the attachment 320*a* and the portable electronic computing device 250*b* over peripheral antenna 330*b* (e.g., via near field communication or Bluetooth), and the disarticulation includes a loss of the data connection. Thus, in some embodiments, a physical attachment to the portable electronic computing device 250*b* is not required for operation as described herein of the peripheral device 310*b*. In some embodiments, the peripheral device 310*b* signals the portable electronic computing device 250*b* in response to a detachment of the attachment 320*b* from a housing, causing transmission of an event notifying signal as described herein.

Figure 4:
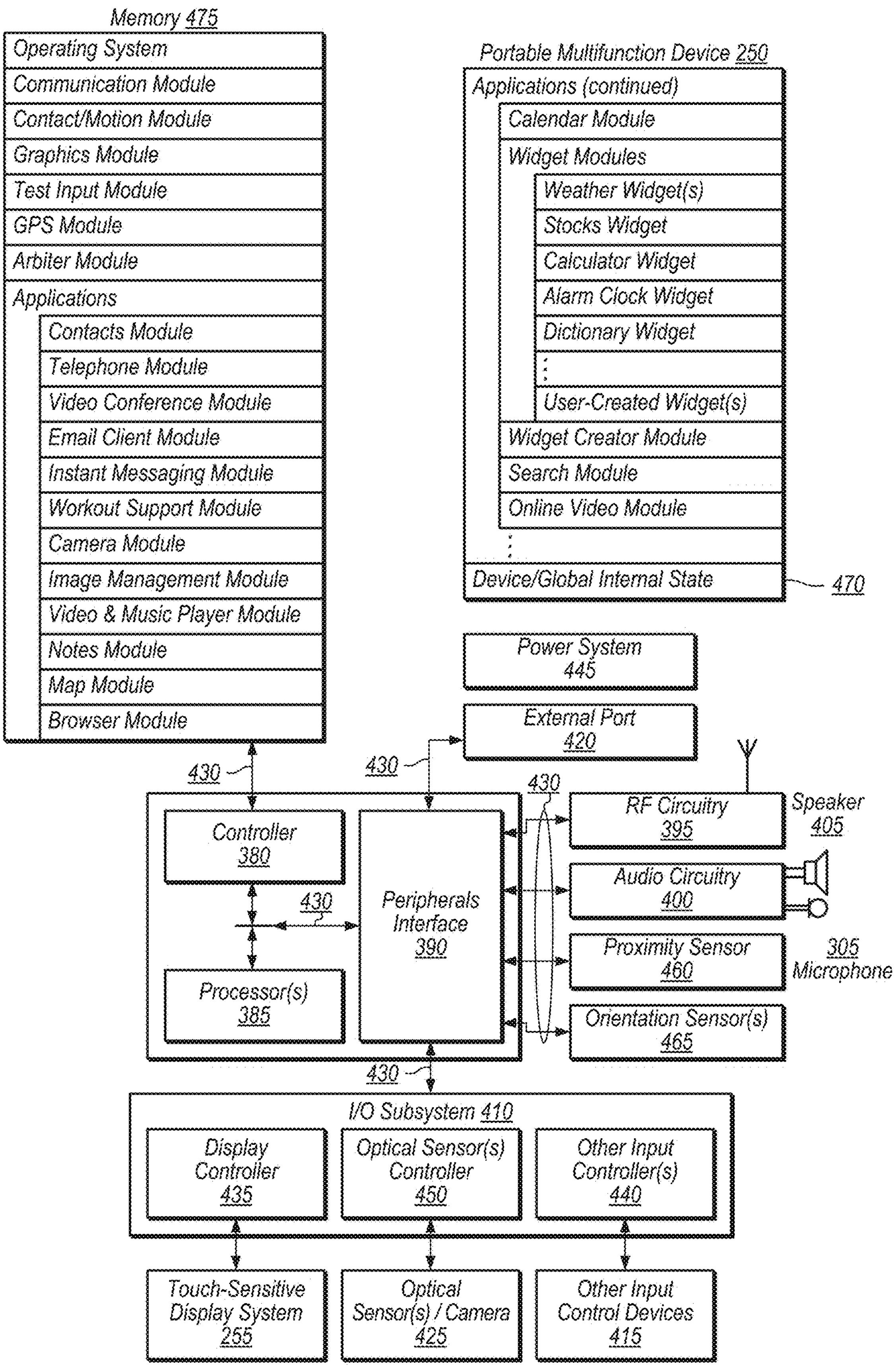
FIG. 4 illustrates a block diagram of a multifunction mobile computing device facilitating automated response to an event notifying signal, in accordance with some embodiments.

Attention is now directed toward embodiments of portable multifunction devices 250. FIG. 4 is a block diagram illustrating a portable multifunction device 250 with the touch screen 255 in accordance with some embodiments. The touch screen 255 may also be known as or called a touch-sensitive display system. The portable multifunction device 250 may include memory 375 (which may include one or more computer readable storage mediums), memory controller 380, processor(s) 385 (such as a CPU), peripherals interface 390, RF circuitry 395, audio circuitry 400, speaker 340, microphone 305, input/output (I/O) subsystem 410, other input control devices 415, and external port 420. The portable multifunction device 250 may include optical sensor(s) 425. These components may communicate over one or more communication buses or signal lines 430.

It should be appreciated that the portable multifunction device 250 is only one example of such a device, and that the portable multifunction device 250 may have more or fewer components than shown, may combine two or more components, or may have a different configuration or arrangement of the components. The various components shown in FIG. 4 may be implemented in hardware, software, or a combination of hardware and software, including one or more signal processing and/or application specific integrated circuits.

Memory 375 may include high-speed random access memory and may also include non-volatile memory, such as one or more magnetic disk storage devices, flash memory devices, or other non-volatile solid-state memory devices. Access to memory 375 by other components of the portable multifunction device 250, such as processor(s) 385 and the peripherals interface 390, may be controlled by memory controller 380.

Peripherals interface 390 can be used to couple input and output peripherals of the device to the processor(s) 385 and memory 375. The processor(s) 385 run or execute various software programs and/or sets of instructions stored in memory 375 to perform various functions for the portable multifunction device 250 and to process data.

In some embodiments, peripherals interface 390, the processor(s) 385, and memory controller 380 may be implemented on a single chip. In some other embodiments, they may be implemented on separate chips.

Radio frequency (RF) circuitry 395 receives and sends RF signals, also called electromagnetic signals. RF circuitry 395 converts electrical signals to/from electromagnetic signals and communicates with communications networks and other communications devices via the electromagnetic signals. RF circuitry 395 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 395 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.1919a, IEEE 802.1919b, IEEE 802.1919g and/or IEEE 802.1919n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Figure 3B:
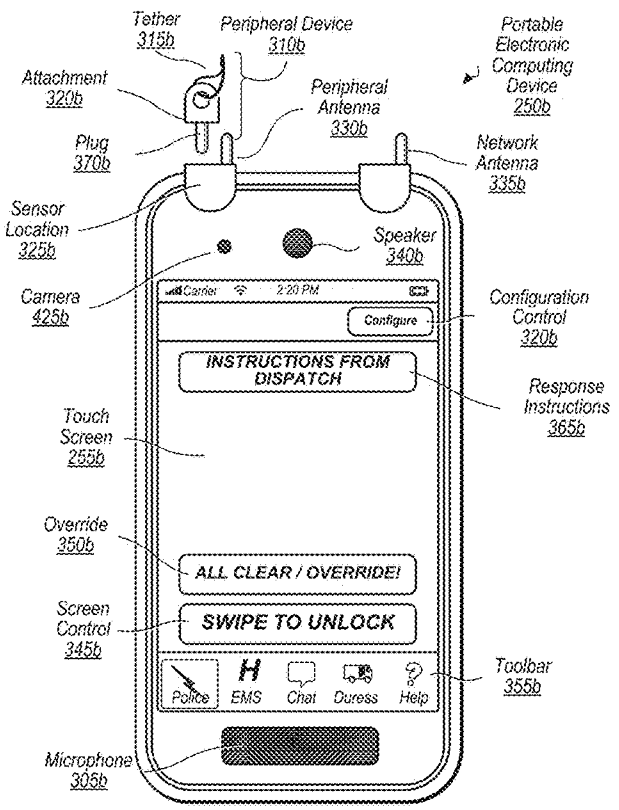
FIG. 3B illustrates a multifunction mobile computing device equipped with an attachment for facilitating automated response to an event notifying signal, in accordance with some embodiments.

Audio circuitry 400, speaker 340, and microphone 305 provide an audio interface between a user and the portable multifunction device 250. Audio circuitry 400 receives audio data from peripherals interface 390, converts the audio data to an electrical signal, and transmits the electrical signal to speaker 340. Speaker 340 converts the electrical signal to human-audible sound waves. Audio circuitry 400 also receives electrical signals converted by microphone 305 from sound waves. Audio circuitry 400 converts the electrical signal to audio data and transmits the audio data to peripherals interface 390 for processing. Audio data may be retrieved from and/or transmitted to memory 375 and/or RF circuitry 395 by peripherals interface 390. In some embodiments, audio circuitry 400 also includes a headset jack (e.g., 295, FIG. 3). The headset jack provides an interface between audio circuitry 400 and removable audio I/O peripherals, such as output-only headphones or a headset with both output (e.g., a headphone for one or both cars) and input (e.g., a microphone).

I/O subsystem 410 couples the I/O peripherals on portable multifunction device 250, such as touch screen 255 and other input control devices 415, to peripherals interface 390. The I/O subsystem 410 may include display controller 435 and the other input controller(s) 440 for other input or control devices. The other input controller(s) 440 receive/send electrical signals from/to other input control devices 415. The other input control devices 415 may include physical buttons (e.g., push buttons, rocker buttons, etc.), dials, slider switches, joysticks, click wheels, and so forth. In some alternate embodiments, the other input controller(s) 440 may be coupled to any (or none) of the following: a keyboard, infrared port, USB port, and a pointer device such as a mouse. The one or more buttons (e.g., 285, FIG. 2) may include an up/down button for volume control of speaker 340 and/or microphone 305. The one or more buttons may include a push button (e.g., 280, FIG. 2).

The touch screen 255 provides an input interface and an output interface between the device and a user. Display controller 435 receives and/or sends electrical signals from/to touch screen 255. Touch screen 255 displays visual output to the user. The visual output may include graphics, text, icons, video, and any combination thereof (collectively termed "graphics"). In some embodiments, some or all of the visual output may correspond to user-interface objects.

Touch screen 255 has a touch-sensitive surface sensor or set of sensors that accepts input from the user based on haptic and/or tactile contact. Touch screen 255 and display controller 435 (along with any associated modules and/or sets of instructions in memory 375) detect contact (and any movement or breaking of the contact) on touch screen 255 and converts the detected contact into interaction with user-interface objects (e.g., one or more soft keys, icons, web pages or images) that are displayed on touch screen 255. In an exemplary embodiment, a point of contact between touch screen 255 and the user corresponds to a finger of the user.

Touch screen 255 may use LCD (liquid crystal display) technology, LPD (light emitting polymer display) technology, or LED (light emitting diode) technology, although other display technologies may be used in other embodiments. Touch screen 255 and display controller 435 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 255. In an exemplary embodiment, projected mutual capacitance sensing technology is used, such as that found in the iPhone®, iPod Touch®, and iPad® from Apple Inc. of Cupertino, California.

The user may make contact with touch screen 255 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the portable multifunction device 250 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 255 or an extension of the touch-sensitive surface formed by the touch screen.

Portable multifunction device 250 also includes power system 445 for powering the various components. Power system 445 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The portable multifunction device 250 may also include optical sensor(s) 425. FIG. 4 shows optical sensor(s) 425 coupled to optical sensor controller(s) 450 in the I/O subsystem 410. The optical sensor(s) 425 may include charge-coupled device (CCD) or complementary metal-oxide semiconductor (CMOS) phototransistors. The optical sensor(s) 425 receive light from the environment, projected through one or more lens, and converts the light to data representing an image. In conjunction with imaging camera module; the optical sensor(s) 425 may capture still images or video. In some embodiments, an optical sensor is located on the back of the portable multifunction device 250, opposite the touch screen 255 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

The portable multifunction device 250 may also include a proximity sensor 460. FIG. 4 shows proximity sensor 460 coupled to peripherals interface 390. Alternately, proximity sensor 460 may be coupled to the other input controller(s) 440 in the I/O subsystem 410. In some embodiments, the proximity sensor turns off and disables the touch screen 255 when the multifunction device is placed near the user's car (e.g., when the user is making a phone call).

The portable multifunction device 250 includes one or more orientation sensors 465. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of the portable multifunction device 250. In some embodiments, the one or more orientation sensors include any combination of orientation/rotation sensors. FIG. 4 shows the one or more orientation sensors 465 coupled to peripherals interface 390. Alternately, the one or more orientation sensors 465 may be coupled to the other input controller(s) 440 in the I/O subsystem 410. In some embodiments, information is displayed on the touch screen display in a portrait view or a landscape view based on an analysis of data received from the one or more orientation sensors 465.

In some embodiments, the software components stored in memory 475 include an operating system, a communication module (or set of instructions), contact/motion module (or set of instructions), graphics module (or set of instructions), text input module (or set of instructions), Global Positioning System (GPS) module (or set of instructions), and applications (or sets of instructions). Device/global internal state 470 includes one or more of: active application state, indicating which applications, if any, are currently active; display state, indicating what applications, views or other information occupy various regions of touch screen 255; sensor state, including information obtained from the device's various sensors and input control devices 415; state information that indicates which processes control output of shared audio or visual resource of a vehicle; ownership transition conditions of the shared audio or visual resource; and location information concerning the device's location and/or attitude.

In conjunction with touch screen 255, display controller 435, contact module, graphics module, and text input module, contacts module may be used to manage an address book or contact list (e.g., stored in device/global internal state 470 of contacts module in memory 475), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

In conjunction with RF circuitry 395, audio circuitry 400, speaker 340, microphone 305, touch screen 255, display controller 435, contact module, graphics module, and text input module, telephone module may be used to enter a sequence of characters corresponding to a telephone number, access one or more telephone numbers in address book, modify a telephone number that has been entered, dial a respective telephone number, conduct a conversation and disconnect or hang up when the conversation is completed. As noted above, the wireless communication may use any of a variety of communications standards, protocols, and technologies.

In conjunction with the RF circuitry 395, the audio circuitry 400, the speaker 340, the microphone 305, the touch screen 255, the display controller 435, the optical sensor(s) 425, contact module, graphics module, text input module, contact list, and telephone module, videoconferencing module includes executable instructions to initiate, conduct, and terminate a video conference between a user and one or more other participants in accordance with user instructions.

In conjunction with RF circuitry 395, touch screen 255, display controller 435, contact module, graphics module, and text input module, e-mail client module includes executable instructions to create, send, receive, and manage e-mail in response to user instructions. In conjunction with image management module, e-mail client module makes it very easy to create and send e-mails with still or video images taken with camera module.

In conjunction with RF circuitry 395, touch screen 255, display controller 435, contact module, graphics module, and text input module, the instant messaging module includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files, and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with touch screen 255, display controller 435, optical sensor(s) 425, optical sensor controller(s) 450, contact module, graphics module, and image management module, camera module includes executable instructions to capture still images or video (including a video stream) and store them into memory 475, modify characteristics of a still image or video, or delete a still image or video from memory 475.

In conjunction with touch screen 255, display controller 435, contact module, graphics module, text input module, and camera module, image management module includes executable instructions to arrange, modify (e.g., edit), or otherwise manipulate, label, delete, present (e.g., in a digital slide show or album), and store still and/or video images.

In conjunction with RF circuitry 395, touch screen 255, display controller 435, contact module, graphics module, and text input module, browser module includes executable instructions to browse the Internet in accordance with user instructions, including searching, linking to, receiving, and displaying web pages or portions thereof, as well as attachments and other files linked to web pages.

In conjunction with RF circuitry 395, touch screen 255, display controller 435, contact module, graphics module, text input module, e-mail client module, and browser module, calendar module includes executable instructions to create, display, modify, and store calendars and data associated with calendars (e.g., calendar entries, to do lists, etc.) in accordance with user instructions.

In conjunction with touch screen 255, display controller 435, contact module, graphics module, and text input module, notes module includes executable instructions to create and manage notes, to do lists, and the like in accordance with user instructions.

In conjunction with RF circuitry 395, touch screen 255, display controller 435, contact module, graphics module, text input module, GPS module, and browser module, map module may be used to receive, display, modify, and store maps and data associated with maps (e.g., driving directions; data on stores and other points of interest at or near a particular location; and other location-based data) in accordance with user instructions.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures, or modules, and thus various subsets of these modules may be combined or otherwise rearranged in various embodiments. In some embodiments, memory 475 may store a subset of the modules and data structures identified above. Furthermore, memory 475 may store additional modules and data structures not described above.

In some embodiments, the portable multifunction device 250 is a device where operation of a predefined set of functions on the device is performed exclusively through a touch screen and/or a touchpad. By using a touch screen and/or a touchpad as the primary input control device for operation of the portable multifunction device 250, the number of physical input control devices (such as push buttons, dials, and the like) on the portable multifunction device 250 may be reduced.

The predefined set of functions that may be performed exclusively through a touch screen and/or a touchpad include navigation between user interfaces. In some embodiments, the touchpad, when touched by the user, navigates the portable multifunction device 250 to a main, home, or root menu from any user interface that may be displayed on the portable multifunction device 250. In such embodiments, the touchpad may be referred to as a "menu button." In some other embodiments, the menu button may be a physical push button or other physical input control device instead of a touchpad.

While a portable or mobile computing device is shown as one embodiment of a multifunction device, one of skill in the art will readily realize in light of having read the current disclosure that a desktop computer or other computing device may also perform many of the functions described herein without departing from the scope and intent of the present disclosure. Likewise, while touch screen devices are shown as one embodiment of a multifunction device, one of skill in the art will readily realize in light of having read the current disclosure that a desktop computer or other computing device without a touch screen may also perform many of the functions described herein without departing from the scope and intent of the present disclosure.

Example Computer System

Figure 5:
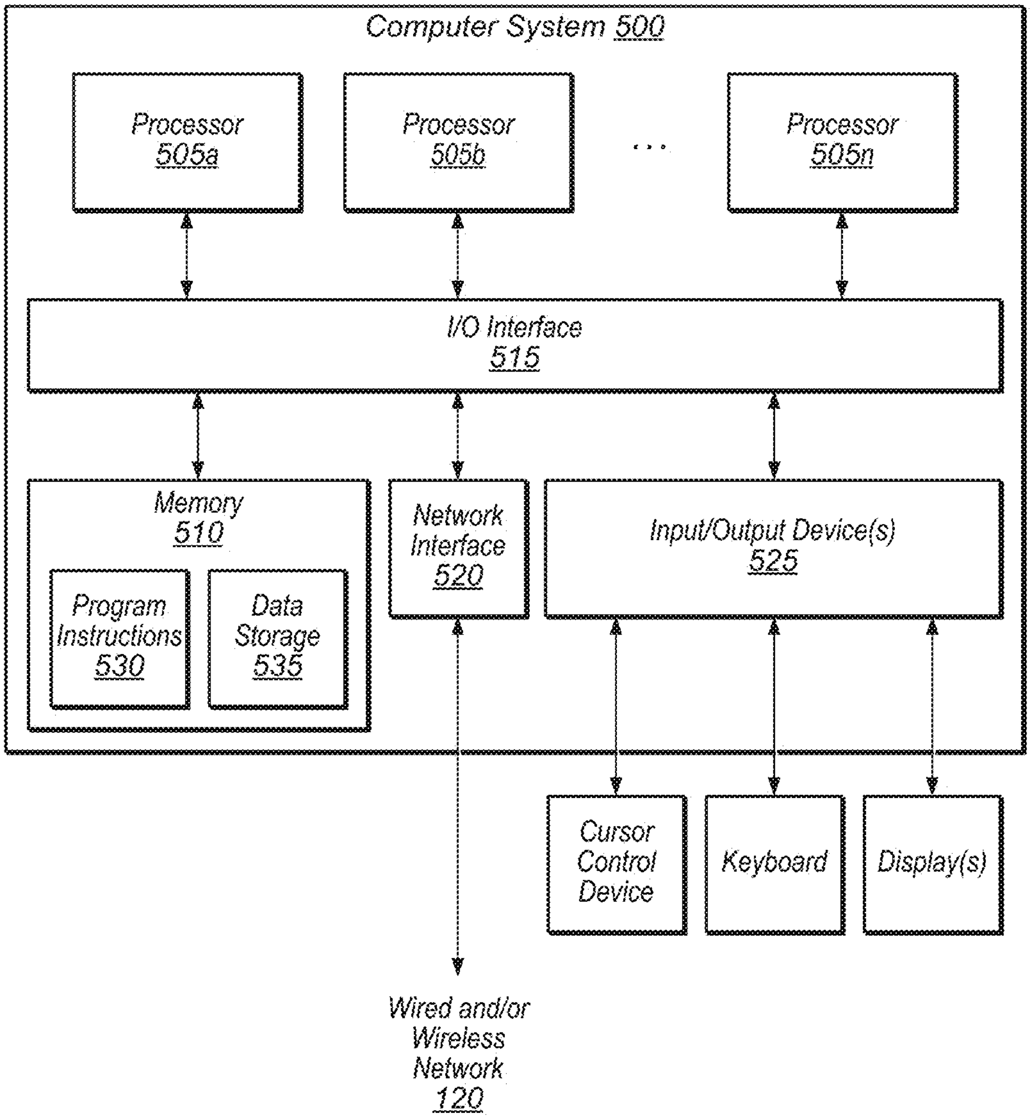
FIG. 5 illustrates an example computer system configured to implement aspects of the system and method for facilitating automated response to an event notifying signal, in accordance with some embodiments.

FIG. 5 illustrates an example computer system configured to implement aspects of the system and method for facilitating automated response to an event notifying, in accordance with some embodiments. FIG. 5 illustrates computer system 500 that is configured to execute any or all of the embodiments described above. In different embodiments, computer system 500 may be any of various types of devices, including, but not limited to, a computer embedded in a vehicle, a computer embedded in an appliance, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for negotiating control of a shared audio or visual resource, as described herein, may be executed on the computer system 500, which may interact with various other devices. Note that any component, action, or functionality described above with respect to FIGS. 1 through 4 may be implemented on one or more computers configured as computer system 500 of FIG. 5, according to various embodiments. In the illustrated embodiment, computer system 500 includes one or more processors 505*a* through 505*n* coupled to a memory 510 via an I/O interface 515. Computer system 500 further includes a network interface 520 coupled to I/O interface 515, and input/output device(s) 525, such as cursor control device, keyboard, and display(s). In some cases, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

In various embodiments, computer system 500 may be a uniprocessor system including one processor, or a multiprocessor system including several processors 505*a* through 505*n* (e.g., two, four, eight, or another suitable number). The processors 505*a* through 505*n* may be any suitable processor capable of executing instructions. For example, in various embodiments, the processors 505*a* through 505*n* may be general-purpose or embedded processors implementing any of a variety of instruction set architectures (ISAs), such as the x86, PowerPC, SPARC, or MIPS ISAs, or any other suitable ISA. In multiprocessor systems, each of processors 505*a* through 505*n* may commonly, but not necessarily, implement the same ISA.

Memory 510 may be configured to store program instructions 530 and/or existing state information and ownership transition condition data in data storage 535 accessible by one of more of the processors 505*a* through 505*n*. In various embodiments, memory 510 may be implemented using any suitable memory technology, such as static random access memory (SRAM), synchronous dynamic RAM (SDRAM), nonvolatile/Flash-type memory, or any other type of memory. In the illustrated embodiment, program instructions 530 may be configured to implement a system for facilitating automated response to an event notifying signal incorporating any of the functionality described above. In some embodiments, program instructions and/or data may be received, sent, or stored upon different types of computer-accessible media or on similar media separate from memory 510 or computer system 500. While computer system 500 is described as implementing the functionality of functional blocks of previous Figures, any of the functionality described herein may be implemented via such a computer system.

In one embodiment, I/O interface 515 may be configured to coordinate I/O traffic between the processors 505*a* through 505*n*, memory 510, and any peripheral devices in the device, including network interface 520 or other peripheral interfaces, such as input/output device(s) 525. In some embodiments, I/O interface 515 may perform any necessary protocol, timing or other data transformations to convert data signals from one component (e.g., memory 510) into a format suitable for use by another component (e.g., processor 505). In some embodiments, I/O interface 515 may include support for devices attached through various types of peripheral buses, such as a variant of the Peripheral Component Interconnect (PCI) bus standard or the Universal Serial Bus (USB) standard, for example. In some embodiments, the function of I/O interface 515 may be split into two or more separate components, such as a north bridge and a south bridge, for example. Also, in some embodiments some or all of the functionality of I/O interface 515, such as an interface to memory 510, may be incorporated directly into processor 505.

Network interface 520 may be configured to allow data to be exchanged between computer system 500 and other devices attached to a network (e.g., carrier or agent devices) or between nodes of computer system 500. The network may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 520 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output device(s) 525 may, in some embodiments, include one or more display terminals, keyboards, keypads, touchpads, scanning devices, voice, or optical recognition devices, or any other devices suitable for entering or accessing data by the computer system 500. Multiple input/output device(s) 525 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 520.

As shown in FIG. 5, memory 510 may include program instructions 530, which may be processor-executable to implement any element or action described above. In one embodiment, the program instructions may implement the methods described above, such as the methods illustrated by FIGS. 24 through 30. In other embodiments, different elements and data may be included. Note that data storage 535 may include any data or information described above.

Those skilled in the art will appreciate that computer system 500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described below. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Figure 6:
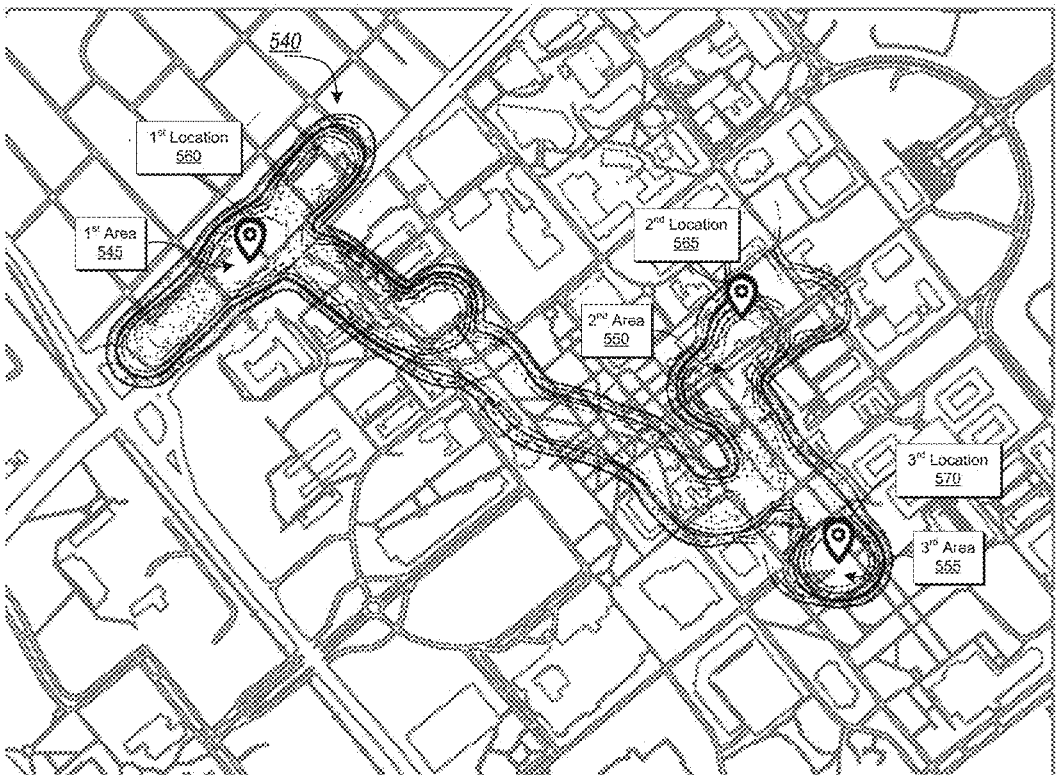
FIG. 6 illustrates an example heat map of a multifunction mobile computing device facilitating automated response to an event notifying signal, in accordance with some embodiments.

FIG. 6 illustrates an example of a heat map 540 of a multifunction mobile computing device, for example, MMCD 145. The heat map 540 is generated from a duration of MMCD 145 at a geographic area, but this is by no means limiting. In some embodiments, a heat map, or record of device use, is generated based on data communication. In some embodiments, a heat map is generated based on energy consumption. In other embodiments, a heat map is generated based on one or more other factors, for example, data from the optical sensor(s) 425, the proximity sensor 460, and the orientation sensors 465. In some embodiments, a heat map is generated based on a pattern of user interaction, for example, eye tracking. The heat map 540 includes a first geographic area 545, a second area 550, and a third area 555. Proximate the first geographic area 545 is a first location 560, such as a building, structure, or postal address. Accordingly, based at least in part on the record of duration of MMCD 145 in the first geographic area 545 proximate the first location 560, the MMCD 145 may be associated with the first location 560. In some embodiments, the MMCD 145 is further associate with one or more resources (e.g., 205) associated with the first location 560.

By way of example, a pair of students at a university may frequency an establishment (e.g., first location 560) proximate the first geographic area 545. Accordingly, the first student's phone (e.g., MMCD 145*a*) and the second student's phone (e.g., MMCD 145*b*) have a record of duration in the first geographic area 545. The second student's phone, embodying one or more functions of a resource client 205*b*, may further be the resource tasked to respond to an event notifying signal originating from the first student's phone. Thus, in the event that the first student and second student have been separated and the first student transmits an event notifying signal, the second student may be tasked to respond and assist the first student. However, in the event that the second student's phone, or a communication link (e.g., 185*b*, 245*b*), is unresponsive, an event notifying signal may not reach the second student. Accordingly, the second student's phone and/or the second student may be associated with the first location 560 proximate the first geographic area 545. That is to say, in the even that a first resource tasked to respond (e.g., the second student's phone) cannot be reliable reached, the event notifying signal response receiver 110 may task a third-party resource (e.g., a phone of the establishment corresponding to the first location) to the response, the third-party resource associate with a prior resource tasked to the response.

Further, an MMCD 145 and/or resource client 205 may be associated with a plurality of locations, such as, for example, the second location 565, or the third location 570. In some embodiments, a user may be associated with one or more MMCDs 145*a* through 145*n* or resource clients 205*a* through 205*n* based, at least in part, on a pattern of interaction. For example, a first MMCD 145*c* (e.g., a phone) and a second MMCD 145*d* (e.g., a laptop) may have coincident patterns of duration at the third location 570 (e.g., a dorm) and the second location (e.g., a library). For example, the first MMCD 145*c* may have a pattern of duration independent of the second MMCD 145*d*, but the opposite may not be true. That is to say, although the first MMCD 145*c* may have a pattern of duration at the second location with and without the second MMCD 145*d*, the second MMCD 145*d* may not have a pattern of duration at the second location 565 independent of the first MMCD 145*c*. Accordingly, the first and second MMCD's 145*c*-145*d* may be associated with a singular user. In some embodiments, an MMCD 145 or a resource client 205 is associated with more than one person.

Figure 7:
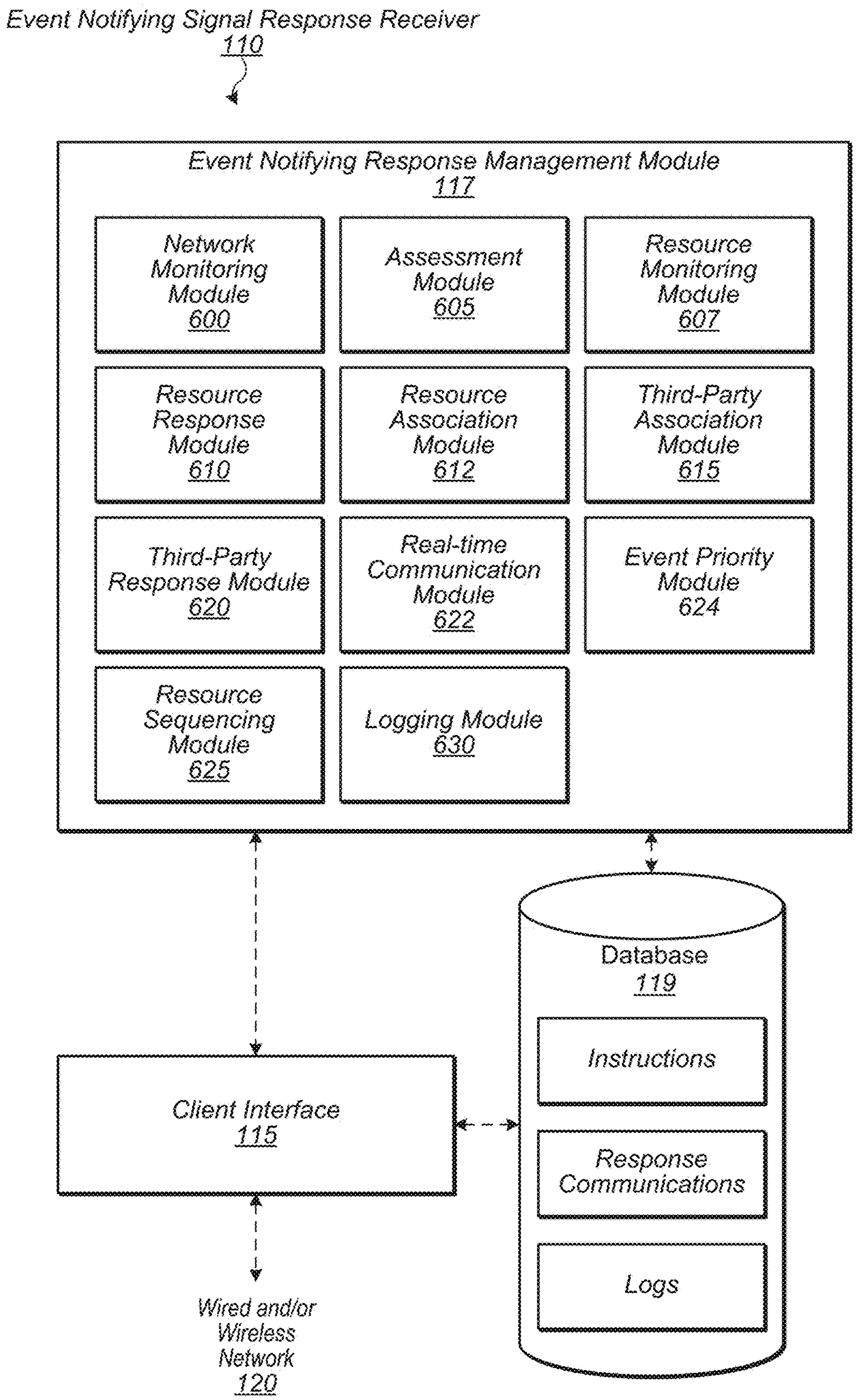
FIG. 7 illustrates a server module for facilitating automated response to an event notifying signal, in accordance with some embodiments.

FIG. 7 illustrates a server module for facilitating automated response to an event notifying signal, in accordance with some embodiments. Some embodiments include a system, such as an event notifying response management module 117, for facilitating automated response to one or more event notifying signals. In some embodiments, the system includes a network monitoring module 600 configured for monitoring signals received over a data network for a presence of one or more event notifying signals transmitted over a radio-frequency network, an optical network, or an electrical network. In some embodiments, event notifying response management module 117 includes an assessment module 605 configured for assessing priority of the one or more event notifying signals transmitted over the radio-frequency, optical, or electrical network. In some embodiments, event notifying response management module 117 includes a resource response module 610 configured for communicating the event notifying signals as response communications to resources tasked to respond to the event notifying signals.

In some embodiments, the system includes a logging module configured for receiving condition description indications from a user of a resource tasked to respond to an event notifying signal for transmission with the event notifying signal and generating logs for storage in the database 119. In some embodiments, the system includes a real-time communication module configured for communicating response condition description indications as response communications to a user of the resource tasked to respond in response to the event notifying signal, and receiving condition description indications from a user of the resource tasked to respond for transmission with the event notifying signal.

In some embodiments, the system includes a response instruction communication module configured for communicating response instructions to a user of the resource tasked to respond in response to the event notifying signal. In some embodiments, the system includes a resource update diffusion module configured for communicating to the resources tasked to respond to the event notifying signals sensor information gathered from resources tasked to respond or other resources in response to the event notifying signal.

In some embodiments, the system includes an assessment module 605 configured for assessing patterns in multiple event notifying signals and selecting appropriate responses to one or more event notifying signals. In some embodiments, the system includes a resource instruction module configured for communicating instructions to the resources tasked to respond to the event notifying signals automated instructions selected based on sensor information gathered from the resources tasked to respond or other resources in response to the event notifying signal. Examples of instructions to the resources tasked to respond to the event notifying signals automated instructions selected based on sensor information gathered from the resources tasked to respond or other resources in response to the event notifying signal can include maps to the location of the user or visual data relating nearby conditions. In some embodiments, the event notifying response management module 117 receives user input through a user interface.

In some embodiments the system includes a third-party association module 615 configured for associating a resource with a third-party. In some embodiments, this association is based, at least in part, on a status of the third-party, a record of proximity of the third-party to a resource, or a record of interaction between the third-party and a resource. In some embodiments, the third-party is a device, an email address, a phone number, an actuator, a vehicle, or any system configured to receive communication. In some embodiments the system includes a third-party response module 620 configured for communicating a response to the third-party associated with a resource tasked to a response.

As an example of use of one embodiment, a user associated with a resource 205*a* has a scheduled meeting with a third-party. Third-party association module 615 then associates the third-party with the user of the resource. An event notifying signal indicative of a relevant incident delaying the user might be assessed by assessment module 605 and a communication of the user's delay communicated to the third-party by third-party response module 620.

As an example of use of another embodiment, the resource client 205*a* (an example of a "first resource client"). may be tasked to a response. If the resource does not have a sufficient pattern of recent use, a resource sequencing module 625 may task the resource client 205*b* (an example of a "second resource client") to the response. Alternatively, resource sequencing module 625 may task the resource client 205*b* to the response if the resource client 205*a* fails to respond within a desired communication timeframe. If a third-party has been associated with the resource client 205*a* by third-party association module 615, the third-party response module 620 may communicate a response to the third-party. Alternatively, if a third-party has not been associated with the resource, a third-party may be associated with the resource client 205*a* and the third-party response module 620 may then communicate a response to the newly associated resource client 205*a*.

Figure 8:
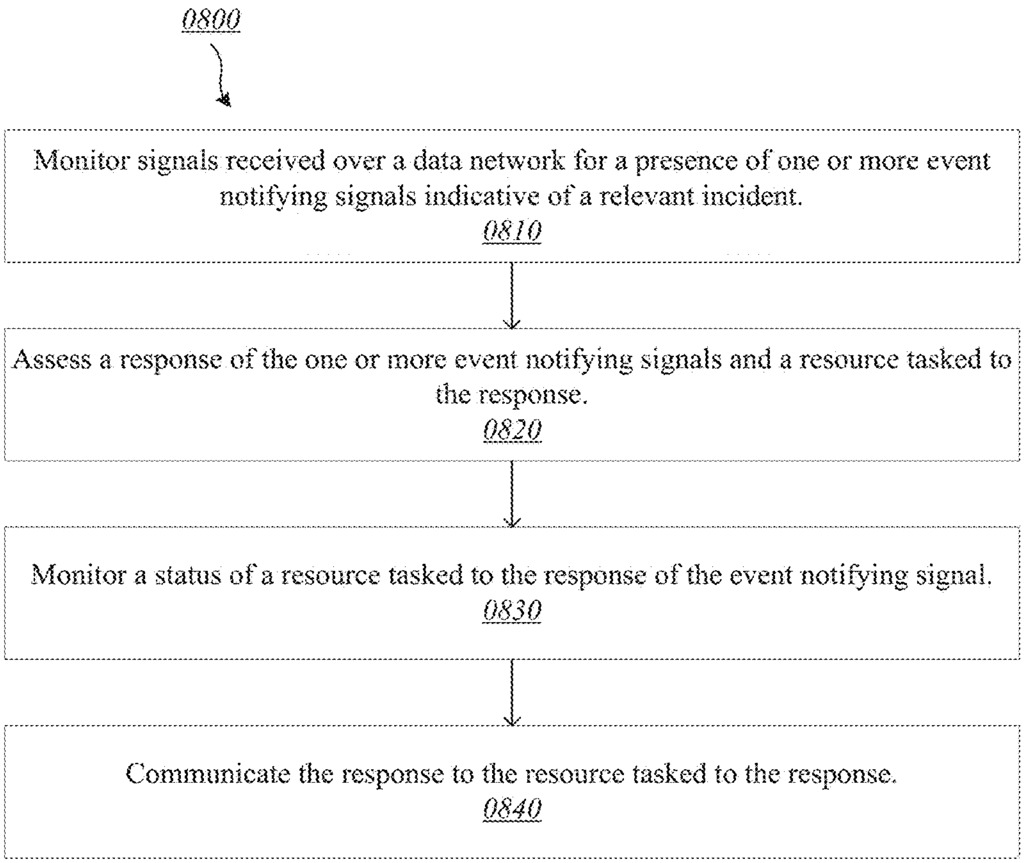
FIG. 8 is a flow diagram illustrating one embodiment of a method for facilitating automated response to an event notifying signal, in accordance with some embodiments.

FIG. 8 is a flow diagram illustrating one embodiment of a method for facilitating automated response to an event notifying signal, in accordance with some embodiments. Signals received over a data network are monitored for a presence of one or more event notifying signals indicative of a relevant incident (block 810). Responsive to the presence of one or more event notifying signals, a response of the one or more event notifying signals and a resource tasked to the response are assessed (block 820). A status of a resource tasked to the response of the event notifying signal is monitored (block 830). The response of the one or more event notifying signals is communicated to the resource tasked to the response (840).

Figure 9:
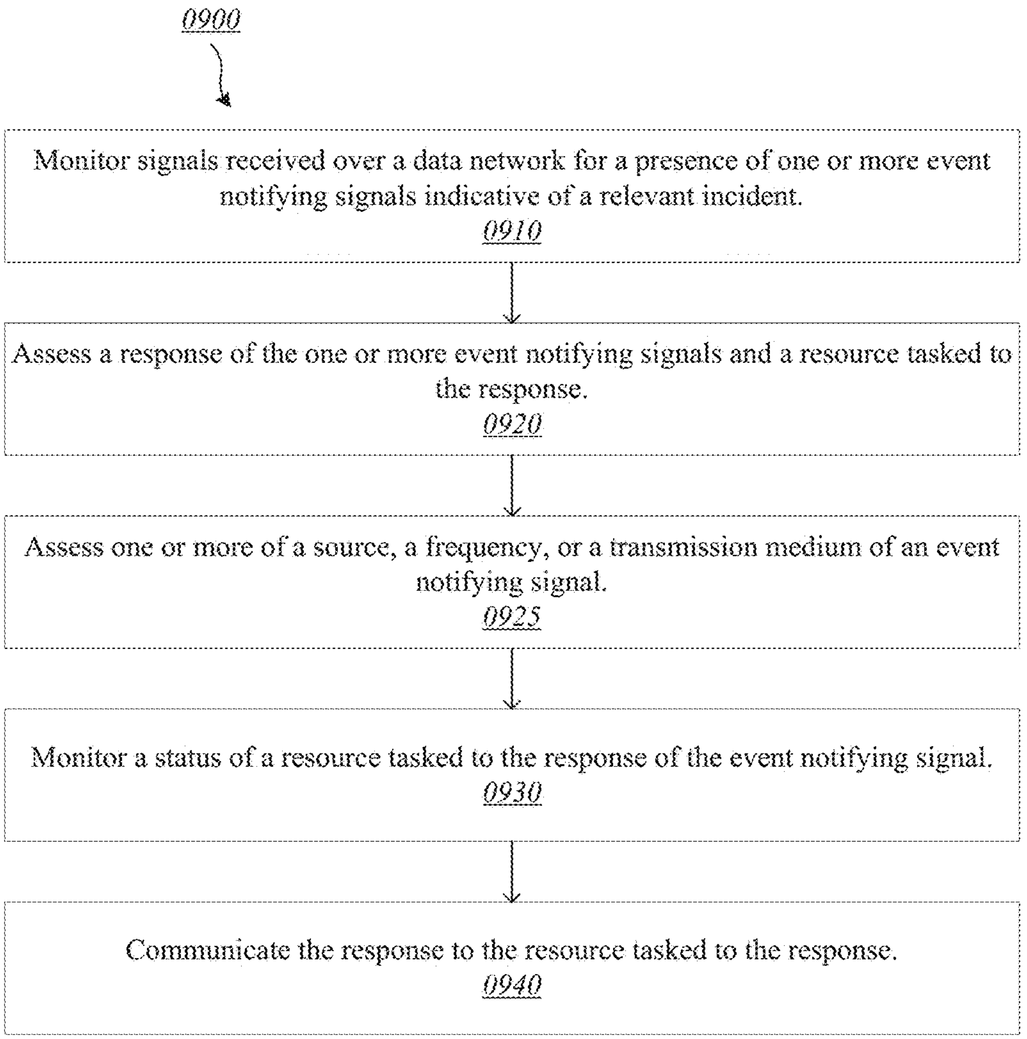
FIG. 9 is a flow diagram illustrating one embodiment of a method for facilitating automated response to an event notifying signal, in accordance with some embodiments.

FIG. 9 is a flow diagram illustrating one embodiment of a method for facilitating automated response to an event notifying signal, in accordance with some embodiments. Signals received over a data network are monitored for a presence of one or more event notifying signals indicative of a relevant incident (block 910). Responsive to the presence of one or more event notifying signals, a response of the one or more event notifying signals and a resource tasked to the response are assessed (block 920). One or more of a source, a frequency, or a transmission medium of an event notifying signal is assessed (block 925). A status of a resource tasked to the response of the event notifying signal is monitored (block 930). The response of the one or more event notifying signals is communicated to the resource tasked to the response (940).

Figure 10:
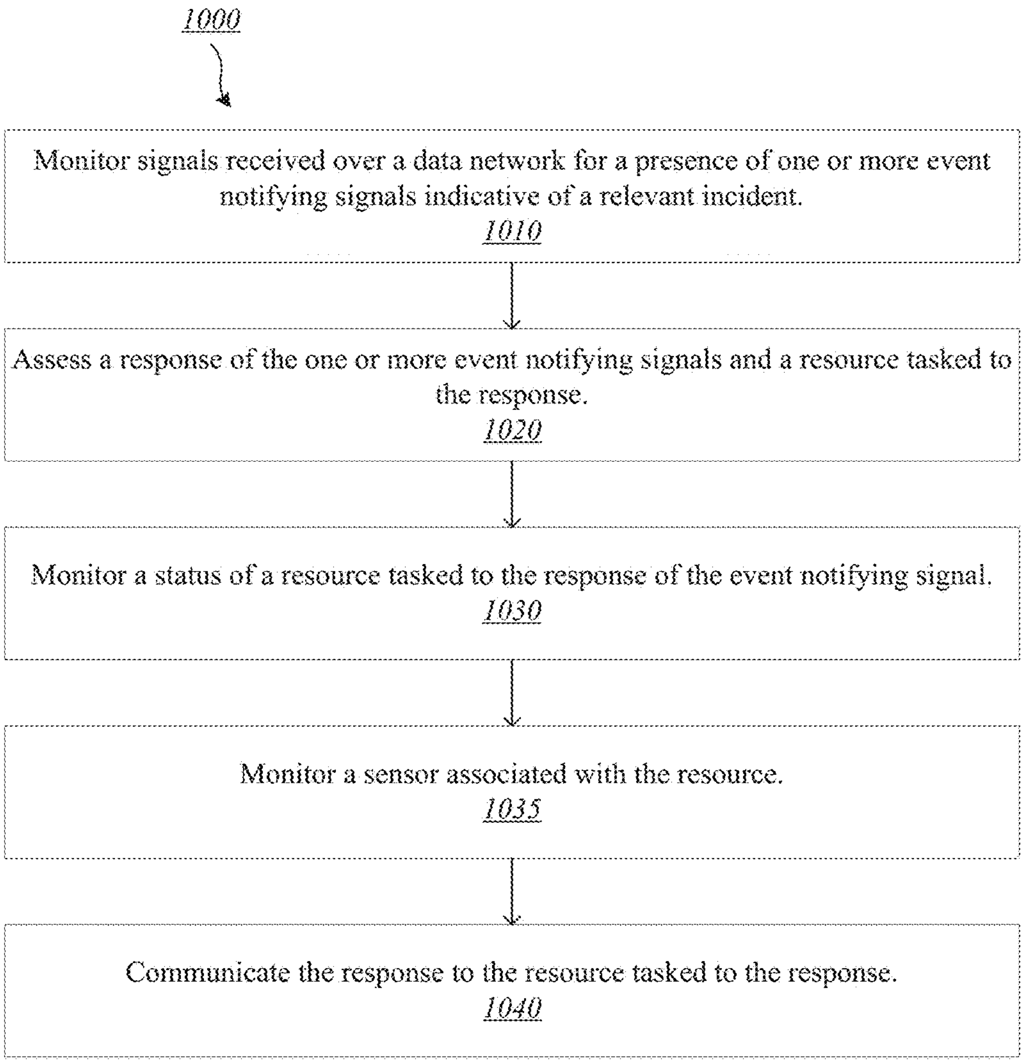
FIG. 10 is a flow diagram illustrating one embodiment of a method for facilitating automated response to an event notifying signal, in accordance with some embodiments.

FIG. 10 is a flow diagram illustrating one embodiment of a method for facilitating automated response to an event notifying signal, in accordance with some embodiments. Signals received over a data network are monitored for a presence of one or more event notifying signals indicative of a relevant incident (block 1010). Responsive to the presence of one or more event notifying signals, a response of the one or more event notifying signals and a resource tasked to the response are assessed (block 1020). A status of a resource tasked to the response of the event notifying signal is monitored (block 1030). A sensor associated with the resource is monitored (block 1035). The response of the one or more event notifying signals is communicated to the resource tasked to the response (1040).

Figure 11:
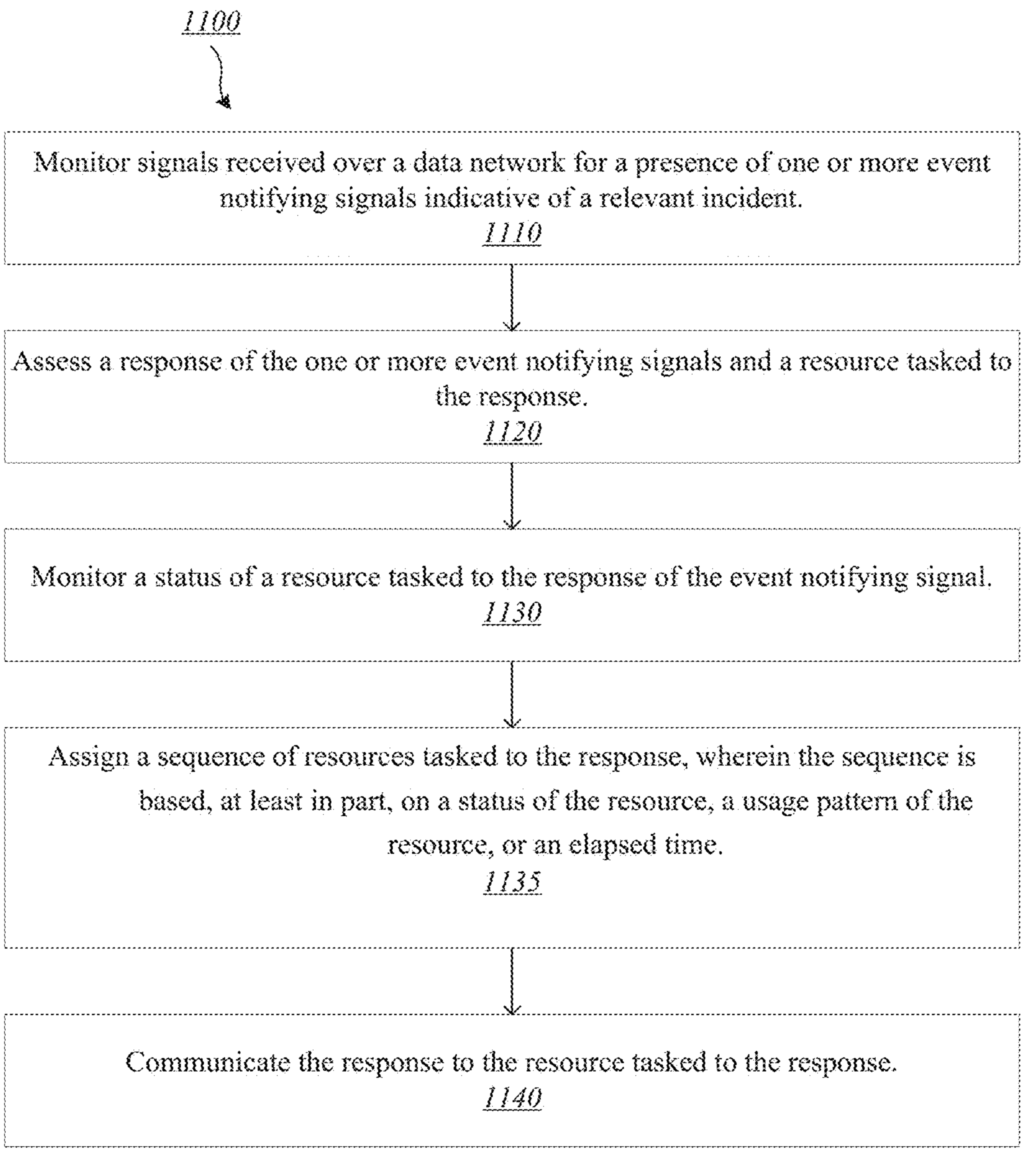
FIG. 11 is a flow diagram illustrating one embodiment of a method for facilitating automated response to an event notifying signal, in accordance with some embodiments.

FIG. 11 is a flow diagram illustrating one embodiment of a method for facilitating automated response to an event notifying signal, in accordance with some embodiments. Signals received over a data network are monitored for a presence of one or more event notifying signals indicative of a relevant incident (block 1110). Responsive to the presence of one or more event notifying signals, a response of the one or more event notifying signals and a resource tasked to the response are assessed (block 1120). A status of a resource tasked to the response of the event notifying signal is monitored (block 1130). A sequence of resources tasked to the response, wherein the sequence is based, at least in part, on a status of the resource, a usage pattern of the resource, or an elapsed time (block 1135). The response of the one or more event notifying signals is communicated to the resource tasked to the response (1140).

Figure 12:
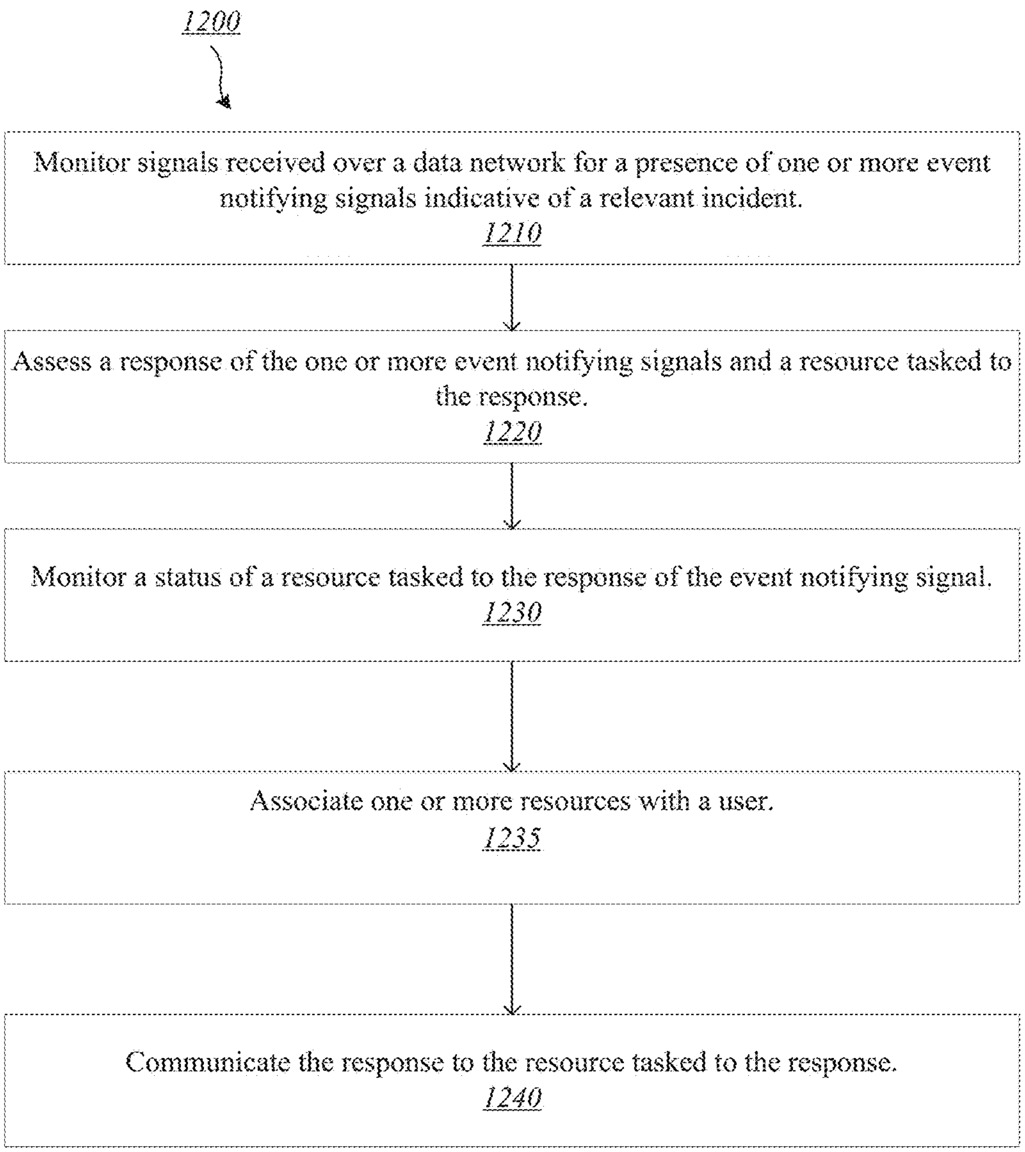
FIG. 12 is a flow diagram illustrating one embodiment of a method for facilitating automated response to an event notifying signal, in accordance with some embodiments.

FIG. 12 is a flow diagram illustrating one embodiment of a method for facilitating automated response to an event notifying signal, in accordance with some embodiments. Signals received over a data network are monitored for a presence of one or more event notifying signals indicative of a relevant incident (block 1210). Responsive to the presence of one or more event notifying signals, a response of the one or more event notifying signals and a resource tasked to the response are assessed (block 1220). A status of a resource tasked to the response of the event notifying signal is monitored (block 1230). One or more resources are associated with a user (block 1235). The response of the one or more event notifying signals is communicated to the resource tasked to the response (1240).

Figure 13:
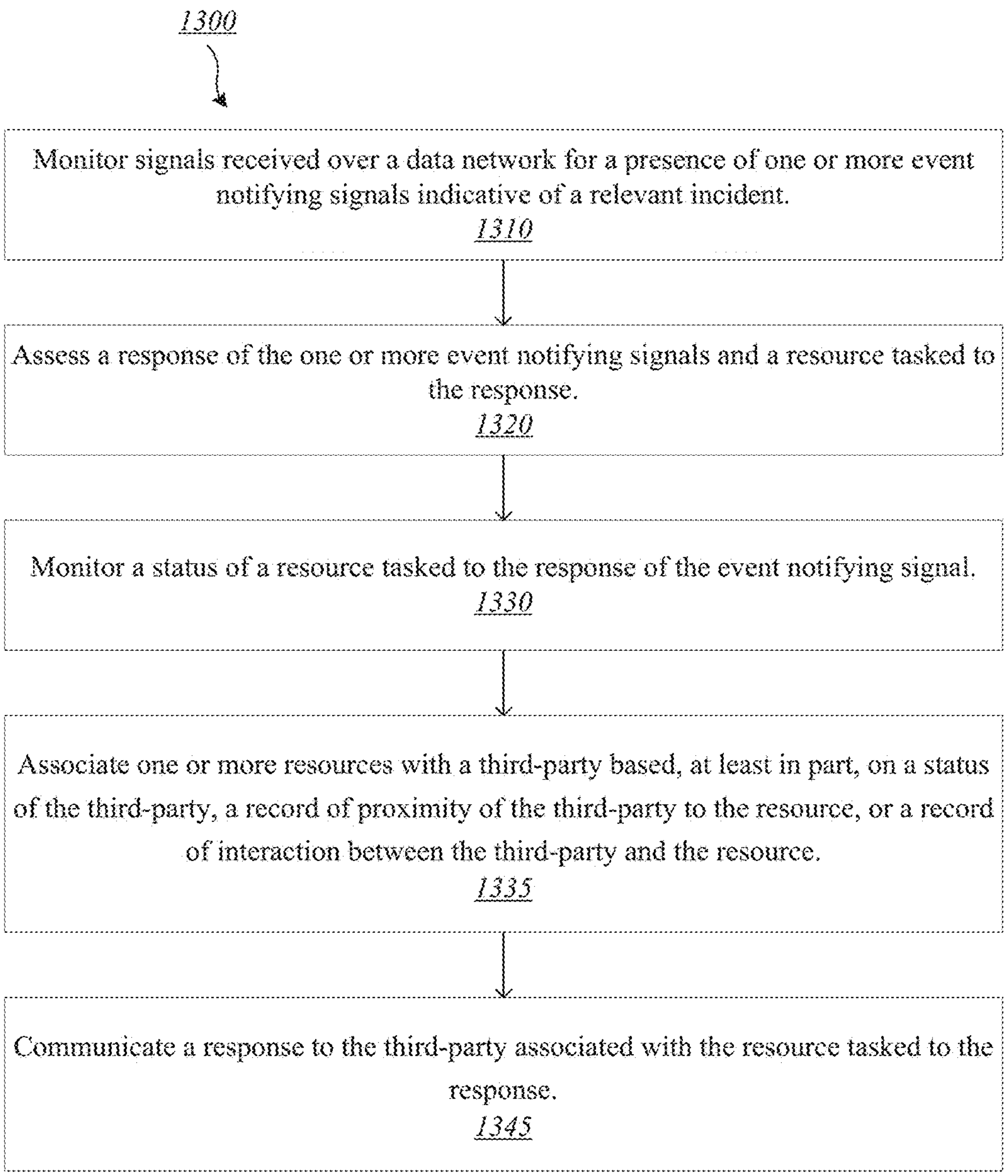
FIG. 13 is a flow diagram illustrating one embodiment of a method for facilitating automated response to an event notifying signal, in accordance with some embodiments.

FIG. 13 is a flow diagram illustrating one embodiment of a method for facilitating automated response to an event notifying signal, in accordance with some embodiments. Signals received over a data network are monitored for a presence of one or more event notifying signals indicative of a relevant incident (block 1310). Responsive to the presence of one or more event notifying signals, a response of the one or more event notifying signals and a resource tasked to the response are assessed (block 1320). A status of a resource tasked to the response of the event notifying signal is monitored (block 1330). One or more resources are associated with a third-party based, at least in part, by a status of the third-party, a record of proximity of the third-party to the resource, or a record of interaction between the third-party and the resource (block 1335). The response of the one or more event notifying signals is communicated to the third-party associated with the resource tasked to the response (1340).

Figure 14:
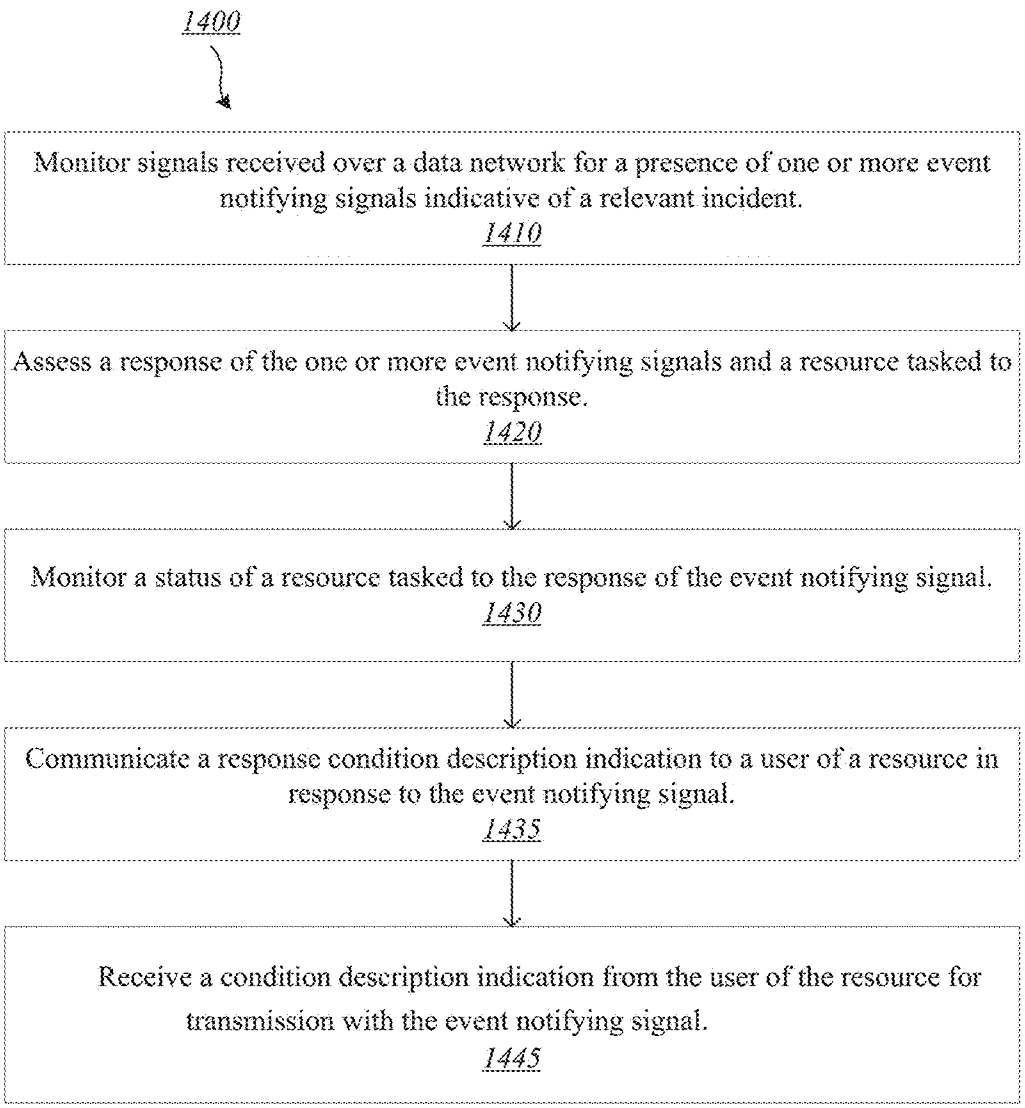
FIG. 14 is a flow diagram illustrating one embodiment of a method for facilitating automated response to an event notifying signal, in accordance with some embodiments.

FIG. 14 is a flow diagram illustrating one embodiment of a method for facilitating automated response to an event notifying signal, in accordance with some embodiments. Signals received over a data network are monitored for a presence of one or more event notifying signals indicative of a relevant incident (block 1410). Responsive to the presence of one or more event notifying signals, a response of the one or more event notifying signals and a resource tasked to the response are assessed (block 1420). A status of a resource tasked to the response of the event notifying signal is monitored (block 1430). Responsive to the event notifying signal, a response condition description indication is communicated to a user of the resource (block 1435). A condition description indication from the user of the resource is received for transmission with the event notifying signal (block 1445).

Embodiments described herein may offer a multichannel mass notification system (also referred to as an event notifying response management module) that is cloud-based software as a service solution (SaaS). For example, a user or customer may access the two-way multichannel mass notification system without installing any software locally on-premises to make the multichannel mass notification system operate. In some embodiments, an account is set up for the user and the user can log in to the account to access the multichannel mass notification system. In some embodiments, the user may access the multichannel mass notification system through a web browser. In some embodiments, in which the user is ambulant and not in front of a stationary computing device, the user may access the multichannel mass notification system through a mobile application (such as mobile applications available on iOS and Android computing devices).

Figure 15:
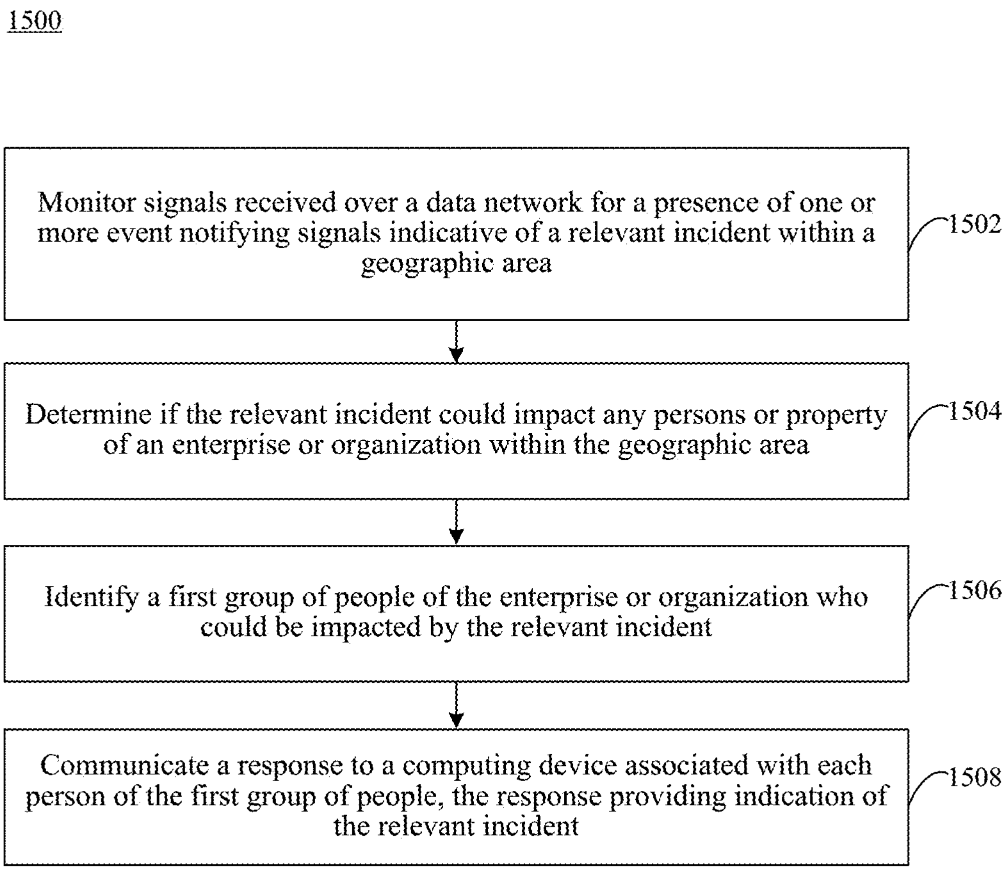
FIG. 15 is a flow diagram illustrating one embodiment of a method for facilitating automated response to an event notifying signal, in accordance with some embodiments.

FIG. 15 is a flow diagram illustrating one embodiment of a method 1500 for facilitating a response to an event notifying signal. The method 1500 is performed by processing logic that may include hardware (circuitry, dedicated logic, etc.), software (such as is run on a general purpose computer system or a dedicated machine), or a combination of both. The method 1500 and/or each of their individual functions, routines, subroutines, or operations may be performed by one or more processors of a computing device. In certain implementations, the method 1500 may be performed by a single processing thread. Alternatively, the method 1500 may be performed by two or more processing threads, each thread implementing one or more individual functions, routines, subroutines, or operations of the methods.

For simplicity of explanation, the method 1500 is depicted and described as a series of operations. However, operations in accordance with this disclosure can occur in various orders and/or concurrently, and with other operations not presented and described herein. For example, the operations depicted in the method 1500 may occur in combination with any other operation of any other method disclosed herein. Furthermore, not all illustrated operations may be required to implement the method 1500 in accordance with the disclosed subject matter. In addition, those skilled in the art will understand and appreciate that the method 1500 could alternatively be represented as a series of interrelated states via a state diagram or events.

In some embodiments, a network monitoring module is configured for monitoring signals received over a data network for a presence of one or more event notifying signals indicative of a relevant incident within a geographic area (block 1502). To help illustrate, and with reference to FIG. 7, event notifying response management module 117 includes network monitoring module 600. Network monitoring module 600 is configured for monitoring signals received over a data network for a presence of one or more event notifying signals indicative of a relevant incident within a geographic area.

Further, in FIG. 15, an assessment module is configured for determining if the relevant incident could impact any persons or property of an enterprise or organization within the geographic area (block 1504) and identifying a first group of people of the enterprise or organization who could be impacted by the relevant incident (1506). To help illustrate, and with continued reference to FIG. 7, event notifying response management module 117 includes an assessment module 605 configured for determining if the relevant incident could impact any persons or property of an enterprise or organization within the geographic area and identifying a first group of people of the enterprise or organization who could be impacted by the relevant incident.

Returning to FIG. 15, a resource response module is configured for communicating a response to a computing device associated with each person of the first group of people, where the response provides an indication of the relevant incident (1508). To help illustrate, and with continued reference to FIG. 7, event notifying response management module 117 includes a resource response module 610 configured for communicating a response to a computing device associated with each person of the first group of people, where the response providing indication of the relevant incident.

Figure 16:
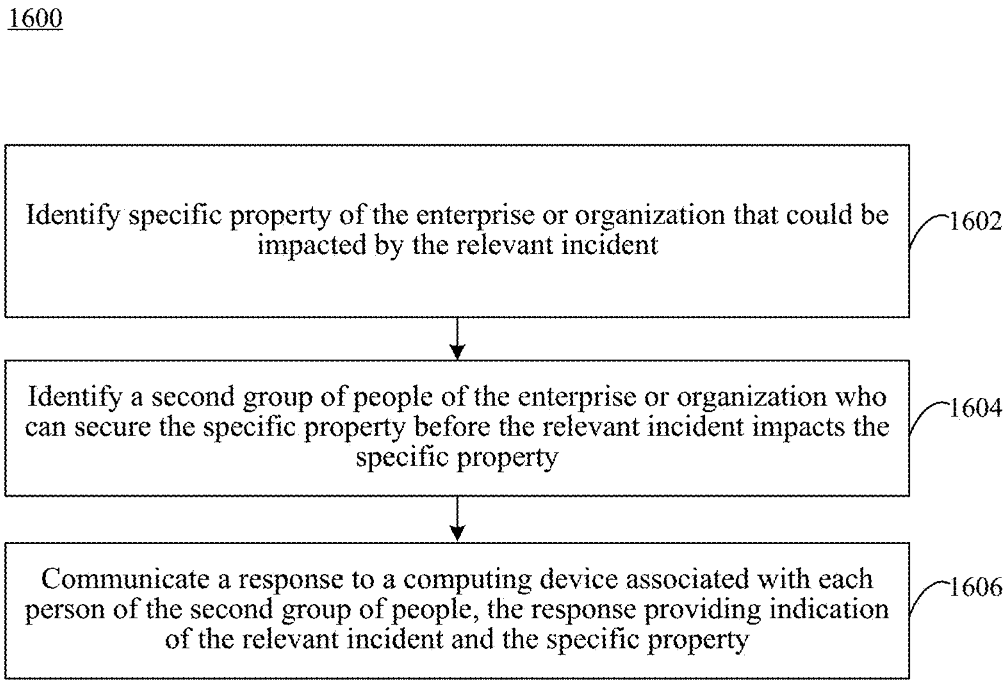
FIG. 16 is a flow diagram illustrating one embodiment of a method for facilitating automated response to an event notifying signal, in accordance with some embodiments.

FIG. 16 is a flow diagram illustrating one embodiment of a method 1600 for facilitating a response to an event notifying signal. Method 1600 may be performed by one or more processing devices in a similar manner as method 1500. In some embodiments, the assessment module is further configured for identifying a specific property of the enterprise or organization that could be impacted by the relevant incident (1602) and identifying a second group of people of the enterprise or organization who can secure the specific property before the relevant incident impacts the specific property (1604). To help illustrate, and with continued reference to FIG. 7, event notifying response management module 117 includes an assessment module 605 configured for identifying specific property of the enterprise or organization that could be impacted by the relevant incident and identifying a second group of people of the enterprise or organization who can secure the specific property before the relevant incident impacts the specific property.

Further, in FIG. 16, a resource response module is configured for communicating a response to a computing device associated with each person of the second group of people, where the response provides an indication of the relevant incident and the specific property (1606). To help illustrate, and with continued reference to FIG. 7, event notifying response management module 117 includes a resource response module 610 configured for communicating a response to a computing device associated with each person of the second group of people, where the response is providing indication of the relevant incident and the specific property.

Figure 17:
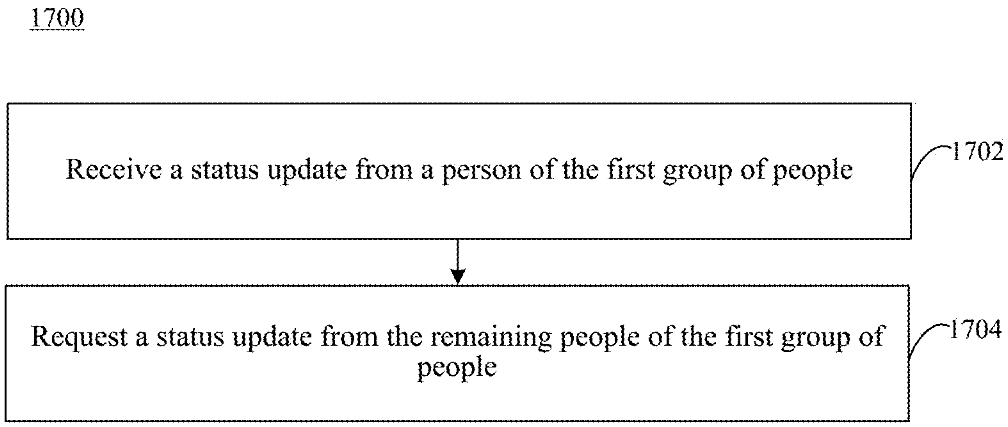
FIG. 17 is a flow diagram illustrating one embodiment of a method for facilitating automated response to an event notifying signal, in accordance with some embodiments.

FIG. 17 is a flow diagram illustrating one embodiment of a method 1700 for facilitating a response to an event notifying signal. For example, the resource response module is further configured for receiving a status update from a person of the first group of people (1702) and requesting a status update from the remaining people of the first group of people (1704). To help illustrate, and with continued reference to FIG. 7, event notifying response management module 117 includes a resource response module 610 configured for receiving a status update from a person of the first group of people and requesting a status update from the remaining people of the first group of people.

Figure 18:
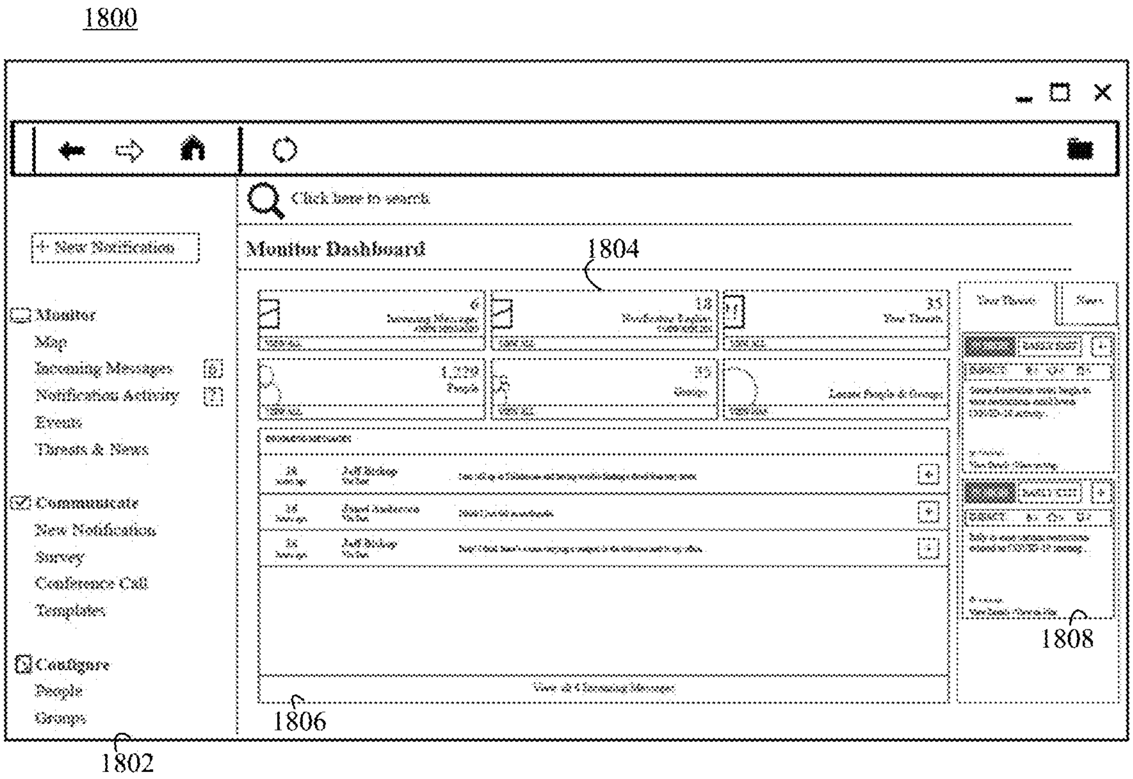
FIG. 18 provides an exemplary embodiment of a user interface that a user may use to engage with a multichannel mass notification system, in accordance with some embodiments.

FIG. 18 provides an exemplary embodiment of a user interface 1800 that a user may use to engage with the multichannel mass notification system (such as event notifying response management module 117 shown in FIGS. 1 and 7). For example, with reference to FIG. 2, touch screen 255 of the portable multifunction device 250 displays one or more graphics within user interface 260 (such as user interface 1800). User interface 1800 may be accessible to a user through a web browser or a mobile application.

As shown in FIG. 18, user interface 1800 includes: a navigation panel 1802 that provides quick access to the different functionalities of the multichannel mass notification system; a monitor dashboard 1804 that summarizes pertinent information for an enterprise or organization; an incoming message panel 1806 that displays incoming messages; and a feed of "threats" and news 1808. Threats, as used herein, refers to information related to events (e.g., events related to security, weather, transportation, environment, etc.) around the world that may affect people or assets of an enterprise or organization. In some embodiments, a user may access the multichannel mass notification system, via user interface 1800, by logging in as an administrator. An administrator account may enable a user to acquire full control over and attain complete access to the functionalities of the multichannel mass notification system. In some embodiments, a user or customer may access the multichannel mass notification system, via user interface 1800, by logging into a standard user account. The standard user account may allow the user limited or restricted access to the functionalities of the multichannel mass notification system. For example, a standard user account may allow a user to receive notifications but not to send notifications.

As depicted in FIG. 18, navigation panel 1802 includes a number of tabs that provide access to the different functionalities of the multichannel mass notification system. For example, a user may select the "New Notification" tab to navigate to a user interface that enables generation of a new notification. As another example, the "Map" tab (described in more detail below) enables a user to access a map providing a geographical view of where threats, and people and assets of an enterprise or organization are located. Navigation panel 1802 further includes the following tabs: the "Incoming Messages" tab which provides access to incoming messages; the "Notification Activity" tab which provides a summary of any activity (e.g., replies to a notification) associated with one or more notifications; the "Events" tab which provides access to any events pertinent to an enterprise or organization; the "Threats & News" tab provides quick access to threats and news pertinent to an enterprise or organization; the "Survey" tab (described in more detail below) provides access to generating a notification including a survey; the "Conference Call" tab allows a user to initiate a conference call with recipients of a notification; the "Templates" tab allows a user to access previously generated templates for notifications for particular events (like a hurricane, a fire, etc.); the "People" tab allows a user to access profiles of people of an enterprise or organization; and the "Groups" tab allows a user to access groupings of people of an enterprise or organization.

Figure 19:
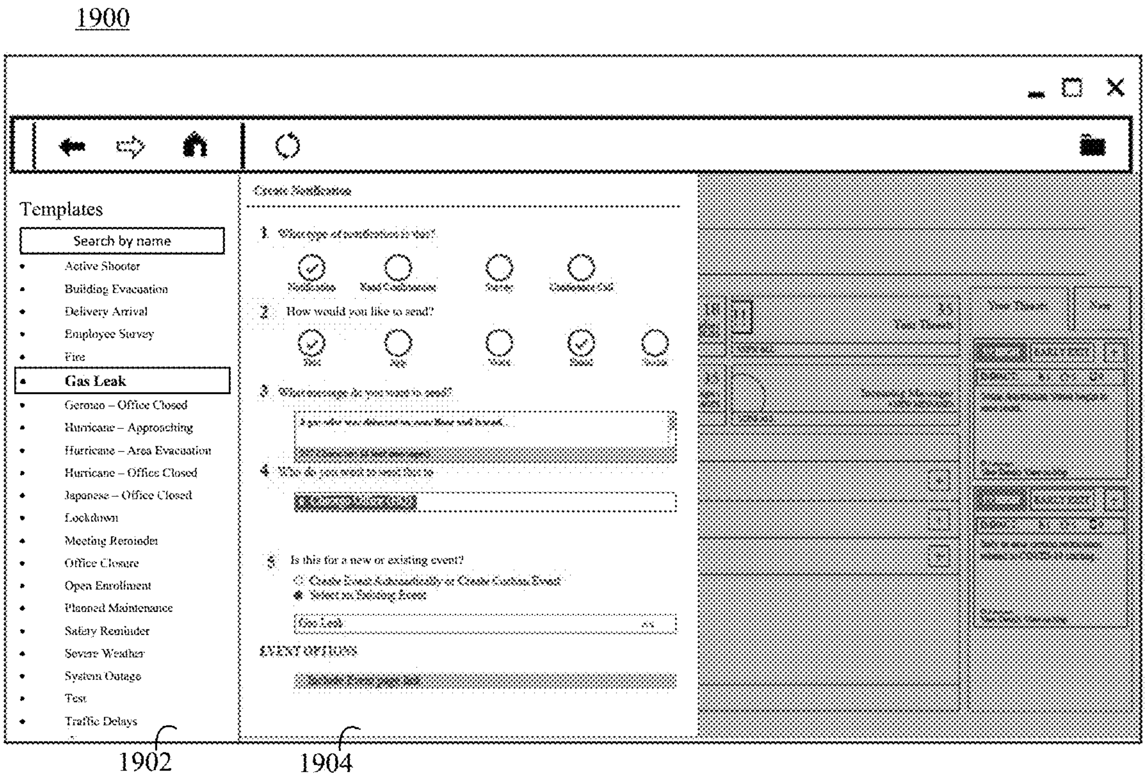
FIG. 19 provides an exemplary embodiment of a user interface that a user may use to engage with a multichannel mass notification system, in accordance with some embodiments.

FIG. 19 provides another exemplary embodiment of a user interface 1900 that a user may use to engage with the multichannel mass notification system (such as event notifying response management module 117 shown in FIGS. 1 and 7). For example, with reference to FIG. 2, touch screen 255 of portable multifunction device 250 displays one or more graphics within user interface 260 (such as user interface 1900).

More specifically, FIG. 19 depicts the user interface 1900 that enables a user to generate a notification. For example, a user, via user interface 1900, may be prompted to step through the following fields 1904 to generate a notification: What type of notification is this? How would you like to send? What message do you want to send? Who do you want to send this to? And is this for a new or existing event? Alternatively, or in addition to, a user can select a template from a list of preexisting templates 1902 to generate a notification. Assume for the sake of illustration, an evacuation of a building is required due to a gas leak. In this situation, a template for a situation involving a gas leak may be selected from list of preexisting templates 1902 and used to auto-populate the fields 1904. To help illustrate, after selection of the template for a gas leak, fields 1904 can be auto-populated as shown in FIG. 19. The user may review the fields 1904 and edit any field as needed before sending the notification related to the gas leak. Additionally, FIG. 19 depicts an example list of preexisting templates. In FIG. 19, list of preexisting templates 1902 includes templates for emergency (e.g., active shooter, fire, gas leak, etc.) and non-emergency situations e.g., delivery arrival, meeting reminder, open enrollment, etc.).

In FIG. 19, a first inquiry of fields 1904 requests what kind of notification the user wants to send. For example, in FIG. 19, a "Notification" selection may involve a standard notification which does not request a response from any recipients of the notification. As another option, the user may want to receive a read confirmation from recipients of the notification and may click a "Read Confirmation" selection. In some embodiments, this selection may confirm that a user received a phone call, a text, and/or an email. For example, a notification may prompt a user to confirm that they observed the notification. Alternatively, or in addition to, a read confirmation may be automatically sent after an email or text including the notification is "opened" or a phone call is answered. Receipt of confirmations from recipients of the notification may be monitored by the user in real time. Another option may include a user using the "Survey" selection to ask one or more questions relevant to an event. With reference to the example above, in a gas leak event, the survey may include questions, such as "Have you vacated the building?" or "Are you in a safe location?" In some embodiments, the one or more questions of a survey may be accompanied by multiple choice response options. Still yet, as another option a user can use a "Conference Call" selection to speak with several recipients simultaneously (such as emergency responders and key executives of an enterprise or organization). For example, after the notification is sent, the recipients of the notification may receive a phone call with an automated message instructing the recipients to press a key or number to join a conference call in progress.

In FIG. 19, a second inquiry of fields 1904 allows a user to indicate what kind of notification the user would like to send. As shown in FIG. 19, a user may send a notification via a number of channels including text, mobile application, voice (e.g., via landlines, cell phones, satellite phone, voiceover IP phone), email, and social media networks (e.g., Twitter®, Facebook®, etc.). In some embodiments, a user may want to provide a public facing message and may post a notification to a social media account of an enterprise or organization. Another channel that may be used to propagate a notification is referred to as "desktop takeover" which enables notifications to pop up on recipients' computer screens and prevents further use of the computing device (e.g., until a response is received from the recipient). In some embodiments, a user may send the notification via a particular channel based on the type of event (e.g., emergency events may be via text rather than email). In some embodiments, notifications can be sent using different channels simultaneously or sent in a cascading manner. For example, an email may be sent first, and if the recipient does not respond to the read confirmation via email within a certain time limit (e.g., five minutes), then a text message may be sent to the recipient. Accordingly, there may be varying levels of notifications that have different severity levels. For example, a first level of notification may have a first severity level and may include sending an email, a second level of notification may have a second severity level (higher than the first severity level) and may include sending a text message to a computing device of the user, a third level of notification may have a third severity level (higher than the first and second severity levels) and may include calling the computing device of the user.

A third inquiry of fields 1904 enables a user to input a message that the user wants to be included in the notification. As shown in FIG. 19, a user may type in the message to be included in the notification. In some embodiments, a user may build templates that include messages that are customized for a particular channel and/or a particular emergency. This is helpful in that a user may not want to send the same message necessarily on every channel. For example, a user may want to send brief message over text and use email to send notification with more detailed information. For example, in the case of a building evacuation, a first notification sent via a text may instruct a recipient to evacuate a building and a second notification sent via an email may include a map indicating one or more relay points that the recipient should go after evacuating the building.

In some embodiments, a text to speech translation may be used to generate a message for a notification (e.g., by using an intelligent virtual assistant). In some embodiments, a user may record a message to be included in a notification. For example, a user may be prompted to click on a link that will allow the user to input a phone number. After the number is inputted, the user may receive a call at that number and be prompted to record a message for the notification. The recorded message may be a voice piece of a notification.

A fourth inquiry of fields 1904 request a user to choose whom to send the notification. In some embodiments, a user can send a notification to a group of recipients (e.g., anyone who works in the Chicago office, anyone who is an administrative assistant, etc.) or to an individual recipient or any combination thereof. In some embodiments, the user may also use a filtering option to find recipients to send the notifications. For example, based on the event, the user may use the filtering option to identify recipients with particular skills that can be useful during an emergency, such as language skills or qualifications to operate particular equipment.

A fifth inquiry of fields 1904 enables the user to indicate if the notification is associated with a new or existing event. This functionality allows for notifications associated with an event to be tracked and easily viewed by the user. For example, during an incident such as a fire in a building, more than one notification may need to be sent. The first notification may be a warning of the fire and instruction to evacuate and avoid the building. Subsequent notifications may include updates on the incident. The user may create a name for the incident and each notification can be tagged with the name of the incident. In some embodiments, a user can schedule a notification to be sent out at a later time (e.g., tomorrow morning at 9:00 AM).

Figure 20:
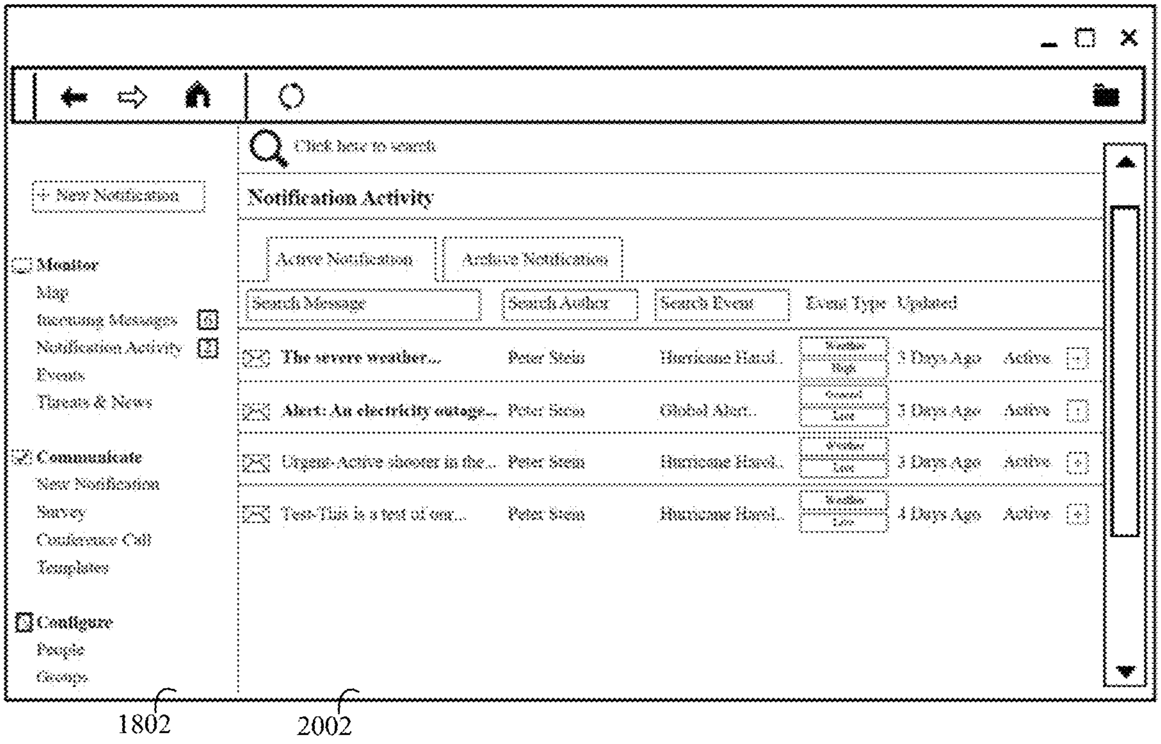
FIG. 20 provides an exemplary embodiment of a user interface which displays an example listing of active notifications and archived notifications for an enterprise or organization, in accordance with some embodiments.

The multichannel mass notification system is configured for providing notification management through sending notifications to recipients to alert them of an event. Additionally, the multichannel mass notification system is configured to receive responses to notifications from recipients and to enable a user to conveniently view the responses from recipients in real time. This helps the user to determine what is happening during an event and to assess how to respond to the event. FIG. 20 provides another exemplary embodiment of a user interface 2000 that a user may use to engage with the multichannel mass notification system (such as event notifying response management module 117 shown in FIGS. 1 and 7). For example, with reference to FIG. 2, touch screen 255 of the portable multifunction device 250 displays one or more graphics within user interface 260 (such as user interface 2000).

More specifically, FIG. 20 depicts the user interface 2000 which displays an example listing of active notifications and archived notifications for an enterprise or organization. As shown in FIG. 20, user interface 2000 displays an active listing of notifications 2002. As further shown in FIG. 20, information associated with a notification may be displayed, such as an author of the notification, a name of an event that the notification is associated with, an event type (e.g., weather, security, etc.), and a priority level (e.g., high, medium, low, etc.). In some embodiments, a user may archive inactive or noncurrent notifications.

Figure 21:
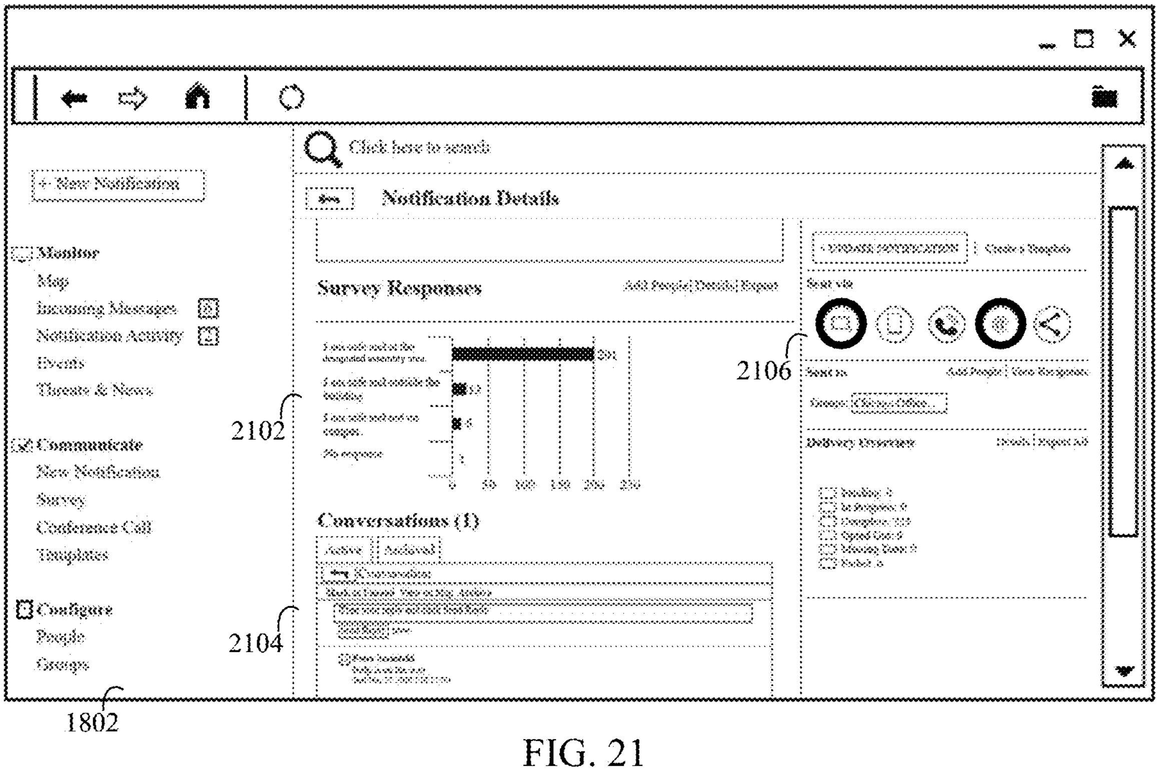
FIG. 21 provides an exemplary embodiment of a user interface displaying results of a survey type notification, in accordance with some embodiments.

FIG. 21 depicts an exemplary embodiment of a user interface 2100 displaying results of a survey type notification. As described, a survey may include one or more questions related to an event. With continued reference to the described above, in a gas leak event, the survey may include a question, such as "Are you in a safe location?" To help further illustrate, as depicted in FIG. 21, the survey may also include the following multiple choice response options for recipients to select: "I am safe and at a designated assembly area"; "I am safe and outside the building"; and "I am safe and not on campus."

In FIG. 21, a panel 2106 of user interface 2100 displays details about a notification. For example, panel 2106 indicates that the notification including the survey was sent via text and email to the "Chicago Office" group (which includes two hundred and twenty-three people) and the "Delivery Overview" section indicates that the notification was successfully received by all recipients of the Chicago Office group. Other statuses for a notification may include pending, in progress, opted out, missing date, and/or failed. As depicted in FIG. 21, results 2102 display that two hundred and one recipients indicated that they were safe and at the designated assembly area, thirteen recipients indicated that they were safe and outside the building, six recipients indicated that there were safe and not on campus, and no response was received from one recipient.

In some embodiments, a user, via user interface 2100, may communicate directly with a recipient. In FIG. 21, a conversation console 2104 may display direct messages between the user and recipients. For example, if a recipient replies to a notification that they are still in need of help, the user may send a reply directly to the recipient that "help is on the way" through conversation console 2104. User interface 2100 enables a user to quickly notify a large population of people about a critical incident and to triage recipients of the notification to understand who is impacted and who is not. The user can effectively ignore the recipients that do not need immediate assistance and focus on recipients who do. And lastly, the user, via user interface 2100, can have direct and private conversations with recipients who need immediate attention. This is all accomplished with a single console that also may refresh in real time.

In some embodiments, multichannel mass notification system may maintain a directory of people who are part of an enterprise or organization. For example, the directory may include fields of information associated with people of an enterprise or organization. For example, the fields may include the following information associated with a person of the enterprise or organization, such as first name, last name, contact details (e.g., email, phone number, home address, office address, etc.), a role or position of the person in the enterprise or organization, and/or characteristics or skills that the person may possess. The user may customize the directory to include additional fields indicating information associated with people of an enterprise or organization (e.g., car color, car license plate number, physical characteristics, etc.).

People of an enterprise or organization may be grouped together in a variety of ways. For example, people may be grouped geographically, such as by their office location, home address, or their mobile location. As another example, people may be grouped by logical groupings, such as by their positions or roles within an enterprise or organization.

In some embodiments, a user may search the directory to identify groups of people who possess characteristics needed to in addressing an event. For example, after identifying that a company's facility storing merchandise may be in a path of a hurricane, a company employee may identify other employees of the company who can move the merchandise from the facility before the hurricane. For instance, the employee may search the directory for other employees who may live nearby the facility, can operate a forklift, and are familiar with the company's logistic software.

Figure 22:
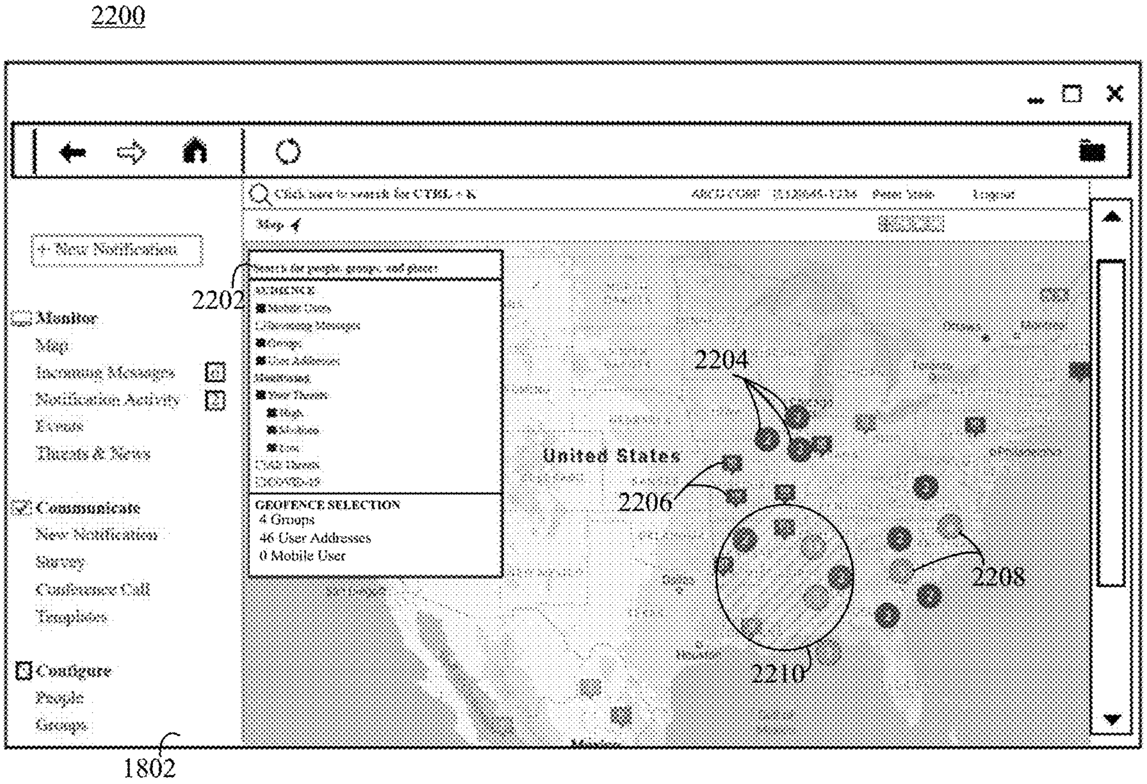
FIG. 22 provides another exemplary embodiment of a user interface that a user may use to engage with a multichannel mass notification system, in accordance with some embodiments.

FIG. 22 provides another exemplary embodiment of a user interface 2200 that a user may use to engage with the multichannel mass notification system (such as event notifying response management module 117 shown in FIGS. 1 and 7). For example, with reference to FIG. 2, touch screen 255 of the portable multifunction device 250 displays one or more graphics within user interface 260 (e.g., user interface 2200). In FIG. 22, user interface 2200 visually displays where threats (e.g., 2206) are in reference to locations of people and assets of an enterprise or an organization. For example, a user may apply a "geofence" 2210 (e.g., by drawing a circle, rectangle, or polygon) to an area on the map to identify people and assets that are in the area that may be affected by a threat. To help illustrate, in FIG. 22, geofence 2210 identifies four groups (e.g., groups 2204), forty-six people (e.g., people 2208), and no mobile users located within the perimeter of the geofence 2210. In some embodiments, a person of an enterprise or organization may download a mobile application and when the mobile application is open, the location of the person may appear on the map. Say for example inclement weather is expected in the area in which geofence 2210 is applied. The user may send a notification warning of the inclement weather to the forty-six people and to people of the four groups identified by geofence 2210.

Moreover, a user can filter the threats that are displayed on the map. For example, the user may select which threats to display based on a severity level (e.g., high, medium, low, etc.) assigned to a threat. Additionally, a user may select to display all threats or only threats impacting an enterprise or organization. Furthermore, a user may select to display threats related to specific event or situation (e.g., COVID-19) or threats of a particular category. For example, threats could fall into the following categories: security, transportation, communication/technology, legal, financial, health, entry/exit, culture, environment, language, and/or weather. In some embodiments, a user may use search bar 2202 to search for people, groups, and places displayed on the map in user interface 2200.

Figure 23:
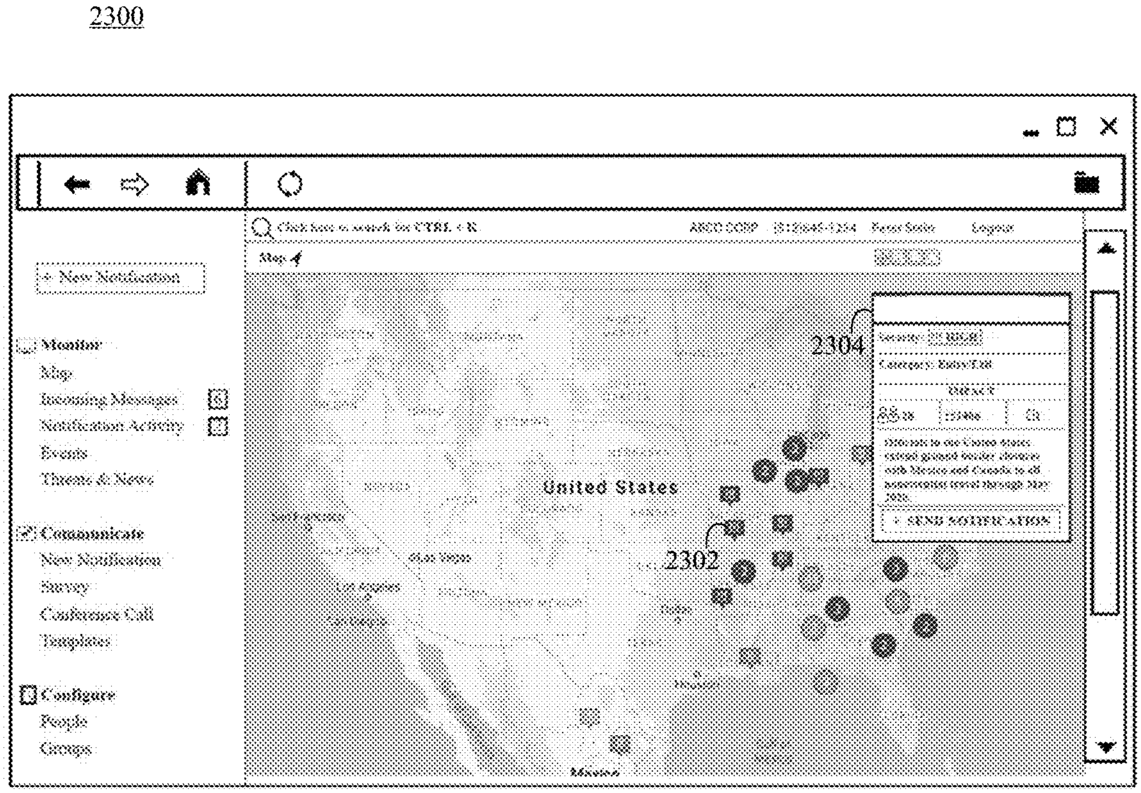
FIG. 23 provides another exemplary embodiment of a user interface that a user may use to engage with a multichannel mass notification system, in accordance with some embodiments.

FIG. 23 provides another exemplary embodiment of a user interface 2300 that a user may use to engage with the multichannel mass notification system (such as event notifying response management module 117 shown in FIGS. 1 and 7). For example, with reference to FIG. 2, touch screen 255 of the portable multifunction device 250 displays one or more graphics within user interface 260 (such as user interface 2300). In FIG. 23, user interface 2300 displays background of a threat and a summary of the impact of the threat. For example, a user may select a threat 2302 and a window 2304 displays the background that "Officials in the United States extend ground border closures with Mexico and Canada to all nonessential travel through May 2020." Furthermore, window 2304 indicates that the threat impacts twenty-eight groups, 1,466 people (e.g., by home address), and one mobile user. The user may decide to send a notification related to the threat to the groups and people identified.

In some embodiments, an event page may be generated for a threat. The event page may include a history of any notifications sent related to the threat. In some embodiments, a user may include an event page link in a notification. For example, a link to an event page may be included on the bottom of a notification sent via text, email, or mobile application push notification. Additionally, a user may post messages directly to the event page, rather than sending out notifications. In some embodiments, recipients may add comments or questions to an event page. An administrator may review the comments and questions before publishing them or the administrator may reply directly to the recipient. In some embodiments, a user or recipients may post resources (like documents, photos, videos, etc.) to the event page. These resources may be useful to people as a particular incident or event unfolds. Moreover, the event page provides up-to-date information in a centralized place that might be useful from an administrative perspective or an emergency responder perspective.

One benefit provided by the embodiments described herein is providing a threat detection system and a notification system under a single platform. Another benefit provided by the embodiments described herein is enabling a user to quickly identify people and assets that are impacted by a threat and quickly notify the people of the threat. Another benefit of the embodiments described herein is the ability to take threat intelligence and filter the threat intelligence against people and assets of an enterprise or organization. In some embodiments, this filtering may be based on any characteristics that a person or asset may possess.

Thus, the disclosure provides, among other things, a system for facilitating automated response to an event notifying signal. Various features and advantages of the disclosure are set forth in the following claims.

What is claimed is:

1. A system for facilitating a response to an event notifying signal, the system comprising:

a network monitoring module configured to monitor signals received over a data network for a presence of one or more event notifying signals indicative of a relevant incident within a geographic area, wherein the one or more event notifying signals comprise a signal indicating detection of articulation of a removable attachment of a mobile computing device by a sensor of the mobile computing device;

an assessment module configured to:

determine that the relevant incident could impact any persons or property of an enterprise or organization within the geographic area, and determine a group of people of the enterprise or organization who could be impacted by the relevant incident; and a resource response module configured to send a response to a computing device associated with each person of the group of people, wherein the response providing an indication of the relevant incident.

2. The system of claim 1, wherein the group of people is a first group of people, wherein the assessment module is further configured to:

determine a specific property of the enterprise or organization that could be impacted by the relevant incident and determine a second group of people of the enterprise or organization who can secure the specific property before the relevant incident impacts the specific property; and wherein the resource response module is further configured to send a second response to a second computing device associated with each person of the second group of people, wherein the second response providing the indication of the relevant incident and an indication of the specific property.

3. The system of claim 2, wherein the property is within a threshold distance from the relevant incident.

4. The system of claim 1, wherein the group of people is within a threshold distance from the relevant incident.

5. The system of claim 1, wherein the resource response module is further configured to:

receive a status update from a person of the group of people, and request a status update from the remaining people of the group of people.

6. The system of claim 1, wherein the resource response module is further configured to send a status update on the relevant incident to the computing device associated with each person of the group of people.

7. The system of claim 1, wherein the relevant incident is a security related issue or an environmental related issue.

8. A method for facilitating a response to an event notifying signal, comprising:

monitoring signals received over a data network for a presence of one or more event notifying signals indicative of a relevant incident within a geographic area, wherein the one or more event notifying signals comprise a signal indicating detection of articulation of a removable attachment of a mobile computing device by a sensor of the mobile computing device;

determining that the relevant incident could impact any persons or property of an enterprise or organization within the geographic area;

determining a group of people of the enterprise or organization who could be impacted by the relevant incident; and sending a response to a computing device associated with each person of the group of people, wherein the response providing an indication of the relevant incident.

9. The method of claim 8, wherein the group of people is a first group of people, and wherein the method further comprising:

determining a specific property of the enterprise or organization that could be impacted by the relevant incident;

determining a second group of people of the enterprise or organization who can secure the specific property before the relevant incident impacts the specific property; and sending a second response to a second computing device associated with each person of the second group of people, wherein the second response providing the indication of the relevant incident and an indication of the specific property.

10. The method of claim 9, wherein the property is within a threshold distance from the relevant incident.

11. The method of claim 8, wherein the group of people is within a threshold distance from the relevant incident.

12. The method of claim 8, further comprising:

receiving a status update from a person of the group of people; and requesting a status update from the remaining people of the group of people.

13. The method of claim 8, further comprising providing a status update on the relevant incident to the computing device associated with each person of the group of people.

14. The method of claim 8, wherein the relevant incident is a security related issue or an environmental related issue.

15. A tangible, non-transitory computer-readable storage medium storing program instructions that, when executed, cause one or more processors to:

monitor signals received over a data network for a presence of one or more event notifying signals indicative of a relevant incident within a geographic area, wherein the one or more event notifying signals comprise a signal indicating detection of articulation of a removable attachment of a mobile computing device by a sensor of the mobile computing device;

determine that the relevant incident could impact any persons or property of an enterprise or organization within the geographic area;

determine a group of people of the enterprise or organization who could be impacted by the relevant incident; and send a response to a computing device associated with each person of the group of people, wherein the response providing an indication of the relevant incident.

16. The non-transitory computer-readable storage medium of claim 15, wherein the group of people is a first group of people, and wherein the program instructions further cause at least one of the one or more processors to:

identify a specific property of the enterprise or organization that could be impacted by the relevant incident;

identify a second group of people of the enterprise or organization who can secure the specific property before the relevant incident impacts the specific property; and send a second response to a second computing device associated with each person of the second group of people, wherein the second response providing the indication of the relevant incident and an indication of the specific property.

17. The non-transitory computer-readable storage medium of claim 16, wherein the property is within a threshold distance from the relevant incident.

18. The non-transitory computer-readable storage medium of claim 15, wherein the group of people is within a threshold distance from the relevant incident.

19. The non-transitory computer-readable storage medium of claim 15, wherein the program instructions further cause at least one of the one or more processors to:

receive a status update from a person of the group of people; and request a status update from the remaining people of the group of people.

20. The non-transitory computer-readable storage medium of claim 15, wherein the program instructions further cause at least one of the one or more processors to provide a status update on the relevant incident to the computing device associated with each person of the group of people.

* * * * *